(12) United States Patent
Klein et al.

(10) Patent No.: US 12,127,118 B2
(45) Date of Patent: *Oct. 22, 2024

(54) DISTRIBUTED RADIOHEAD SYSTEM

(71) Applicant: Intel Corporation, Santa Clara, CA (US)

(72) Inventors: Ofir Klein, Tikwa (IL); Leor Rom, Haifa (IL); Eran Segev, Tel Aviv (IL); Eran Amir, Ada (IL); Nevo Idan, Ya'akov (IL); Chen Kojokaro, Illit (IL)

(73) Assignee: INTEL CORPORATION, Santa Clara, CA (US)

( * ) Notice: Subject to any disclaimer, the term of this patent is extended or adjusted under 35 U.S.C. 154(b) by 317 days.

This patent is subject to a terminal disclaimer.

(21) Appl. No.: 17/472,768

(22) Filed: Sep. 13, 2021

(65) Prior Publication Data

US 2022/0201603 A1 Jun. 23, 2022

(30) Foreign Application Priority Data

Dec. 22, 2020 (EP) .................................... 20216349

(51) Int. Cl.
*H04W 52/02* (2009.01)
*H04L 27/00* (2006.01)

(52) U.S. Cl.
CPC ..... *H04W 52/0216* (2013.01); *H04L 27/0002* (2013.01); *H04W 52/0229* (2013.01)

(58) Field of Classification Search
CPC .. Y02D 30/70; H04W 48/16; H04W 52/0216; H04W 52/0229; H04W 74/0808;

(Continued)

(56) References Cited

U.S. PATENT DOCUMENTS 6,192,238 B1 * 2/2001 Piirainen ................... H04L 1/06
455/422.1
6,873,644 B1 * 3/2005 Barrett ....................... H04B 1/69
375/138

(Continued)

FOREIGN PATENT DOCUMENTS

CN 210294531 U 4/2020
KR 20110115280 A 10/2011

(Continued)

OTHER PUBLICATIONS

European search report issued for the corresponding european patent application No. 20 216 349.9, dated Jun. 9, 2021, 8 pages (for informational purposes only).

*Primary Examiner* — Dung B Huynh
(74) *Attorney, Agent, or Firm* — VIERING, JENTSCHURA & PARTNER mbB

(57) ABSTRACT

Various aspects provide a radiohead circuit and a communication device including the radiohead circuit. In an example, the radiohead circuit includes an antenna interface, a radio frequency front end configured to receive a channel scan information including an information related to a target communication channel to be scanned from a communication device processor, perform an energy scan for detecting an activity of the target communication channel based on the channel scan information, generate an activity information including an information as to whether there is the activity on the target communication channel, and provide the activity information to a communication interface; the communication interface configured to couple the processor to a radiohead circuit-external processor external to the radiohead circuit.

18 Claims, 35 Drawing Sheets

(58) Field of Classification Search
CPC ... H04W 88/085; H04W 24/02; H04W 24/08;
H04W 24/10; H04W 74/0816; H04L
27/0002; H04B 1/18; H04B 17/327
See application file for complete search history.

(56) References Cited

U.S. PATENT DOCUMENTS

| | | | | |
|---|---|---|---|---|
| 7,920,599 B1* | 4/2011 | Subramanian | ...... | H04L 27/2656 370/292 |
| 8,125,988 B1* | 2/2012 | Sullivan | ...... | H04L 69/22 709/219 |
| 8,862,076 B2* | 10/2014 | Whinnett | ...... | H04W 24/10 455/115.2 |
| 8,886,200 B2* | 11/2014 | Gogic | ...... | H04W 36/0085 455/63.2 |
| 9,825,720 B2* | 11/2017 | Österling | ...... | H04B 17/318 |
| 10,085,220 B1* | 9/2018 | Marupaduga | ...... | H04W 36/0069 |
| 10,517,136 B1* | 12/2019 | Chukka | ...... | H04W 76/27 |
| 10,659,178 B2* | 5/2020 | Martel | ...... | G01M 11/3109 |
| 11,337,100 B1* | 5/2022 | Korpi | ...... | H04L 25/0202 |
| 11,647,407 B1* | 5/2023 | McKibben | ...... | H04W 16/02 370/329 |
| 11,812,317 B2* | 11/2023 | Raghothaman | ...... | H04W 36/06 |
| 11,812,467 B2* | 11/2023 | Viger | ...... | H04W 74/0808 |
| 2006/0251025 A1* | 11/2006 | Kwon | ...... | H04B 7/0413 370/334 |
| 2007/0072638 A1* | 3/2007 | Yang | ...... | H04W 52/50 455/522 |
| 2007/0225013 A1* | 9/2007 | Pflum | ...... | H04W 36/18 455/452.2 |
| 2007/0291632 A1* | 12/2007 | Li | ...... | H04L 27/2665 370/203 |
| 2008/0031197 A1* | 2/2008 | Wang | ...... | H04W 72/54 370/329 |
| 2008/0075149 A1* | 3/2008 | Botha | ...... | H04B 1/70735 375/148 |
| 2008/0080466 A1* | 4/2008 | Kang | ...... | H04B 7/2628 370/342 |
| 2009/0119524 A1* | 5/2009 | Hays | ...... | G06F 1/324 713/323 |
| 2010/0013551 A1* | 1/2010 | Reams | ...... | H04N 21/42204 327/544 |
| 2010/0067422 A1* | 3/2010 | Kadous | ...... | H04W 52/0229 455/574 |
| 2010/0069072 A1* | 3/2010 | Gogic | ...... | H04W 36/0085 455/436 |
| 2010/0130210 A1* | 5/2010 | Tokgoz | ...... | H04W 36/04 455/437 |
| 2011/0115680 A1* | 5/2011 | Phan Huy | ...... | H04L 1/0026 343/703 |
| 2011/0237243 A1* | 9/2011 | Guvenc | ...... | H04W 72/542 455/423 |
| 2011/0242999 A1* | 10/2011 | Palanki | ...... | H04W 24/08 370/252 |
| 2011/0274021 A1* | 11/2011 | He | ...... | H04W 52/0238 370/311 |
| 2012/0099451 A1* | 4/2012 | Su | ...... | H04L 27/26035 370/252 |
| 2012/0202552 A1* | 8/2012 | Minemura | ...... | H04W 52/0229 455/522 |
| 2012/0275363 A1* | 11/2012 | Hu | ...... | H04W 52/0206 370/311 |
| 2012/0281554 A1* | 11/2012 | Gao | ...... | H04L 5/0053 370/252 |
| 2012/0281565 A1* | 11/2012 | Sauer | ...... | H04B 7/0413 370/252 |
| 2012/0287914 A1* | 11/2012 | Smith | ...... | H04W 4/06 370/338 |
| 2012/0294162 A1* | 11/2012 | Pajukoski | ...... | H04B 7/0874 370/312 |
| 2013/0033996 A1* | 2/2013 | Song | ...... | H04B 7/0817 370/252 |
| 2013/0040676 A1* | 2/2013 | Kang | ...... | H04B 7/0495 455/562.1 |
| 2013/0070635 A1* | 3/2013 | Suo | ...... | H04W 52/0206 370/252 |
| 2013/0142054 A1* | 6/2013 | Ahmadi | ...... | H04W 60/00 370/252 |
| 2013/0295980 A1* | 11/2013 | Reuven | ...... | H04B 17/345 455/226.3 |
| 2014/0105056 A1* | 4/2014 | Li | ...... | H04W 52/0203 370/252 |
| 2014/0112228 A1* | 4/2014 | Kang | ...... | H04W 52/0206 370/311 |
| 2014/0120947 A1* | 5/2014 | Siomina | ...... | G01S 5/02213 455/456.1 |
| 2014/0126438 A1* | 5/2014 | Zhu | ...... | H04J 11/0093 370/328 |
| 2014/0171073 A1* | 6/2014 | Kim | ...... | H04W 24/10 455/434 |
| 2014/0269322 A1* | 9/2014 | Li | ...... | G06F 9/505 370/236 |
| 2014/0270787 A1* | 9/2014 | Lee | ...... | H04B 10/25753 398/115 |
| 2014/0301259 A1* | 10/2014 | Homchaudhuri | ... | H04W 52/029 370/311 |
| 2014/0364128 A1* | 12/2014 | Lee | ...... | H04W 36/18 455/442 |
| 2015/0003348 A1* | 1/2015 | Ishii | ...... | H04L 5/0048 370/329 |
| 2015/0009924 A1* | 1/2015 | Takano | ...... | H04W 24/10 370/329 |
| 2015/0050962 A1* | 2/2015 | Takashima | ...... | H04W 16/08 370/311 |
| 2015/0087324 A1* | 3/2015 | Ishida | ...... | H04W 16/08 455/452.2 |
| 2015/0131565 A1* | 5/2015 | Nakashima | ...... | H04W 72/21 370/329 |
| 2015/0131606 A1* | 5/2015 | Kobayashi | ...... | H04W 72/542 370/330 |
| 2015/0215903 A1* | 7/2015 | Zhao | ...... | H04W 72/02 370/329 |
| 2015/0244430 A1* | 8/2015 | Shattil | ...... | H04L 41/0816 370/254 |
| 2016/0036403 A1* | 2/2016 | Ashworth | ...... | H03F 3/68 330/284 |
| 2016/0192181 A1* | 6/2016 | Choi | ...... | H04W 8/245 455/422.1 |
| 2016/0197745 A1* | 7/2016 | Yi | ...... | H04L 25/03343 370/329 |
| 2016/0227396 A1* | 8/2016 | Lee | ...... | H04W 8/18 |
| 2016/0234773 A1* | 8/2016 | Choi | ...... | H04W 52/0206 |
| 2016/0242147 A1* | 8/2016 | Tarlazzi | ...... | H04W 88/085 |
| 2016/0249268 A1* | 8/2016 | Usui | ...... | H04W 16/32 |
| 2016/0337057 A1* | 11/2016 | Österling | ...... | H04B 1/109 |
| 2016/0338075 A1* | 11/2016 | McKibben | ...... | H04W 16/02 |
| 2016/0366605 A1* | 12/2016 | Tsui | ...... | H04W 24/08 |
| 2017/0048879 A1* | 2/2017 | Zhang | ...... | H04W 76/27 |
| 2017/0055231 A1* | 2/2017 | Cook | ...... | H04W 52/0229 |
| 2017/0063486 A1* | 3/2017 | Sarashina | ...... | H04B 10/27 |
| 2017/0163391 A1* | 6/2017 | Kimura | ...... | H04W 72/0453 |
| 2017/0214567 A1* | 7/2017 | Salkintzis | ...... | H04L 43/16 |
| 2017/0223603 A1* | 8/2017 | Doi | ...... | H04W 40/22 |
| 2017/0237477 A1* | 8/2017 | Fujio | ...... | H04B 7/0617 370/329 |
| 2017/0245162 A1* | 8/2017 | Beck | ...... | H04L 43/50 |
| 2017/0251380 A1* | 8/2017 | Schabel | ...... | H04W 16/14 |
| 2017/0265104 A1* | 9/2017 | Arslan | ...... | H04W 28/16 |
| 2017/0272180 A1* | 9/2017 | Jitsukawa | ...... | H04B 7/0617 |
| 2017/0331577 A1* | 11/2017 | Parkvall | ...... | H04W 8/18 |
| 2017/0353975 A1* | 12/2017 | Khawer | ...... | H04W 8/005 |
| 2017/0359108 A1* | 12/2017 | Abdel Khalek | ...... | H04B 7/0456 |
| 2017/0359763 A1* | 12/2017 | Pan | ...... | H04B 7/022 |
| 2017/0373737 A1* | 12/2017 | Liang | ...... | H04B 7/0452 |
| 2017/0373890 A1* | 12/2017 | Fertonani | ...... | H04L 9/40 |
| 2018/0007562 A1* | 1/2018 | Auer | ...... | H04W 16/32 |
| 2018/0084511 A1* | 3/2018 | Wu | ...... | H04W 72/23 |
| 2018/0139655 A1* | 5/2018 | Hsu | ...... | H04W 24/04 |
| 2018/0152966 A1* | 5/2018 | Goldhamer | ...... | H04W 74/002 |

(56) References Cited

U.S. PATENT DOCUMENTS

| | | | |
|---|---|---|---|
| 2018/0160416 A1* | 6/2018 | Mitsui | H04W 24/10 |
| 2018/0184454 A1* | 6/2018 | Viger | H04W 74/0808 |
| 2018/0234886 A1* | 8/2018 | Bhorkar | H04W 28/18 |
| 2018/0269921 A1* | 9/2018 | Pawliuk | H04B 1/44 |
| 2018/0332617 A1* | 11/2018 | Zeng | H04W 72/0453 |
| 2018/0343577 A1* | 11/2018 | Takiguchi | H04W 72/542 |
| 2019/0053278 A1* | 2/2019 | Kecicioglu | H04W 74/0808 |
| 2019/0074876 A1* | 3/2019 | Kakishima | H04B 7/0417 |
| 2019/0089562 A1* | 3/2019 | Miyamoto | H04L 25/067 |
| 2019/0097689 A1* | 3/2019 | Noam | H04B 7/0626 |
| 2019/0159066 A1* | 5/2019 | Zhao | H04W 24/00 |
| 2019/0199559 A1* | 6/2019 | Wang | H03M 3/45 |
| 2019/0230707 A1* | 7/2019 | Bergljung | H04L 5/0073 |
| 2019/0254047 A1* | 8/2019 | Ahmed | H04W 28/0231 |
| 2020/0045635 A1* | 2/2020 | Lin | H04W 52/0248 |
| 2020/0119772 A1* | 4/2020 | Interdonato | H04B 7/0452 |
| 2020/0120458 A1* | 4/2020 | Aldana | H04W 72/23 |
| 2020/0204248 A1* | 6/2020 | Lu | H04B 7/0857 |
| 2020/0229022 A1* | 7/2020 | Vargantwar | H04B 17/318 |
| 2020/0235788 A1* | 7/2020 | Rajagopal | H04B 7/0848 |
| 2020/0245173 A1* | 7/2020 | Kusashima | H04B 17/24 |
| 2020/0245412 A1* | 7/2020 | Kumar | H04B 7/0617 |
| 2020/0252100 A1* | 8/2020 | Jacobs | H04W 8/24 |
| 2020/0329382 A1* | 10/2020 | Sahoo | H04W 16/10 |
| 2020/0344618 A1* | 10/2020 | Shetiya | H04W 24/02 |
| 2020/0374079 A1* | 11/2020 | Chervyakov | H04L 27/2657 |
| 2020/0382169 A1* | 12/2020 | Zhao | H04B 7/024 |
| 2020/0389880 A1* | 12/2020 | Lu | H04W 72/541 |
| 2020/0396679 A1* | 12/2020 | Akkarakaran | H04W 72/044 |
| 2021/0045046 A1* | 2/2021 | Mukherjee | H04W 4/029 |
| 2021/0076416 A1* | 3/2021 | Shah | H04W 74/006 |
| 2021/0112536 A1* | 4/2021 | Shah | H04L 5/0048 |
| 2021/0119664 A1* | 4/2021 | Ben-Sinai | H04W 88/06 |
| 2021/0119674 A1* | 4/2021 | Yuan | H04B 7/0456 |
| 2021/0127335 A1* | 4/2021 | Rostami | H04W 52/0229 |
| 2021/0160898 A1* | 5/2021 | Luo | H04B 17/336 |
| 2021/0168008 A1* | 6/2021 | Ohashi | H04L 5/0007 |
| 2021/0194736 A1* | 6/2021 | Wesemann | H04B 7/0617 |
| 2021/0195529 A1* | 6/2021 | Yang | H04W 72/0453 |
| 2021/0204318 A1* | 7/2021 | Babaei | H04W 76/19 |
| 2021/0235384 A1* | 7/2021 | Yang | H04W 52/0248 |
| 2021/0243617 A1* | 8/2021 | Cooper | H04W 72/0453 |
| 2021/0274405 A1* | 9/2021 | Raghothaman | H04B 7/022 |
| 2021/0281283 A1* | 9/2021 | Burra | H04B 1/1607 |
| 2021/0306816 A1* | 9/2021 | Patrikakis | H04W 4/06 |
| 2021/0314935 A1* | 10/2021 | Luo | H04W 72/51 |
| 2021/0352607 A1* | 11/2021 | Miao | H04W 56/0045 |
| 2021/0360530 A1* | 11/2021 | Shahidi | H04W 76/27 |
| 2021/0360654 A1* | 11/2021 | Akkarakaran | H04W 72/02 |
| 2021/0392634 A1* | 12/2021 | Guo | H04B 7/088 |
| 2022/0038849 A1* | 2/2022 | Speidel | H04W 64/006 |
| 2022/0038902 A1* | 2/2022 | Mueck | G06F 21/57 |
| 2022/0045712 A1* | 2/2022 | Berhane | H04B 1/525 |
| 2022/0086624 A1* | 3/2022 | Cui | H04W 74/0808 |
| 2022/0095234 A1* | 3/2022 | Li | H04W 52/0229 |
| 2022/0124622 A1* | 4/2022 | Islam | H04W 72/542 |
| 2022/0167397 A1* | 5/2022 | Thangarasa | H04W 74/08 |
| 2022/0174739 A1* | 6/2022 | Kwak | H04W 72/0446 |
| 2022/0191956 A1* | 6/2022 | Manthrayil Sachidanandan | H04B 5/0062 |
| 2022/0201522 A1* | 6/2022 | Tao | H04W 74/0841 |
| 2022/0201746 A1* | 6/2022 | Kwak | H04L 1/0013 |
| 2022/0214407 A1* | 7/2022 | Hu | H04B 17/14 |
| 2022/0225195 A1* | 7/2022 | Park | H04W 36/0058 |
| 2022/0225234 A1* | 7/2022 | Tie | H04W 72/0453 |
| 2022/0231763 A1* | 7/2022 | Luo | H04B 10/07955 |
| 2022/0255596 A1* | 8/2022 | Lu | H04B 7/0413 |
| 2022/0264349 A1* | 8/2022 | Liu | H04W 24/10 |
| 2022/0322439 A1* | 10/2022 | Baek | H04W 74/0808 |
| 2022/0329289 A1* | 10/2022 | Huang | H04B 7/0617 |
| 2022/0338066 A1* | 10/2022 | Chitrakar | H04W 72/541 |
| 2022/0346004 A1* | 10/2022 | Gong | H04W 52/0206 |
| 2022/0394526 A1* | 12/2022 | Wang | H04W 72/542 |
| 2022/0408482 A1* | 12/2022 | Liu | H04W 74/0808 |
| 2022/0417923 A1* | 12/2022 | Uchiyama | H04W 4/40 |
| 2023/0079334 A1* | 3/2023 | Chitrakar | H04W 74/0816 370/329 |
| 2023/0199782 A1* | 6/2023 | Takeda | H04W 72/1263 370/329 |
| 2023/0224731 A1* | 7/2023 | Ma | H04W 24/02 370/216 |
| 2023/0224739 A1* | 7/2023 | Deixler | H04W 48/16 370/252 |
| 2023/0230489 A1* | 7/2023 | Wilson | G08G 5/0069 342/357.31 |
| 2023/0353984 A1* | 11/2023 | Iun | H04W 4/021 |

FOREIGN PATENT DOCUMENTS

| | | |
|---|---|---|
| WO | 2019069410 A1 | 4/2019 |
| WO | 2020139371 A1 | 7/2020 |

* cited by examiner

| Channel ID | Schedule #1 | Schedule #2 | Band | Threshold |
|---|---|---|---|---|
| #1 | Next idle | 10 ms | 2.412 GHz. | 82 dBm |
| #2 | Second next idle | 10 ms | 2.417 GHz. | 82 dBm |
| #5 | After 200 ms | 20 ms | 2.432 GHz. | 60 dBm |
| #6 | Repeat every 500 ms | 10 ms | 2.437 GHz. | 82 dBm |

FIG. 13

| 0 | 1 | 0 | 0 | 1 | 0 | 0 | 0 | 0 | 0 | 0 | 0 | 0 |
|---|---|---|---|---|---|---|---|---|---|---|---|---|

FIG. 14

| Channel ID | Schedule | Duration | Band | SSID |
|---|---|---|---|---|
| #1 | Immediate | 40 ms | 2.412 GHz. | * |
| #2 | Next idle | 40 ms | 2.417 GHz. | * |
| #6 | After 2000ms | 40 ms | 2.437 GHz. | * |

| Channel ID | Schedule | Duration | Band | SSID |
|---|---|---|---|---|
| #5 | Repeat every 5s | 40ms | 2.432 GHz. | * |
| #9 | Next idle | 40ms | 2.452 GHz. | SSID_1 |

DISTRIBUTED RADIOHEAD SYSTEM

CROSS-REFERENCE TO RELATED APPLICATION

This application claims priority under 35 U.S.C. § 119 to EP Patent Application No. 20216349, filed on Dec. 22, 2020, which is incorporated by reference herein in its entirety.

TECHNICAL FIELD

Various aspects of this disclosure generally relate to compact radiohead circuits and a communication device including at least one compact radiohead circuit.

BACKGROUND

To support increases in wireless data traffic, wireless transceivers need to support wider bandwidths (BW) and higher-order modulations schemes. For example, to increase throughput, wireless transceivers may be configured to implement a Multiple Input Multiple Output (MIMO) scheme, which may require an increased amount of wireless transceivers in the platform. However, the usage of the co-located wireless transceivers may result in cross interference, power consumption limitations, thermal limitations, and other technical problems. Attempts using existing technologies to try to remedy the above problems, such as, by separating the antennas and connecting the antennas to co-located transceivers using coax cable to connect the components results in a substantial increase in costs and degradation in wireless performance. Further the use of coax cables does not easily support many form factors.

Another consideration is that using an increasing number of co-located transceivers is not easily scalable in many cases, and does not allow for modular certification. Many applications or implementations require a complete device or platform certification, e.g., a complete certification from a known bus interface all the way to an antenna connector. However, in increasing the number of transceivers and associated components, the cost per unit of certifying a platform becomes prohibitive.

BRIEF DESCRIPTION OF THE EXEMPLARY DRAWINGS

In the drawings, like reference characters generally refer to the same parts throughout the different views. The drawings are not necessarily to scale, emphasis instead generally being placed upon illustrating the exemplary principles of the disclosure. In the following description, various aspects of the disclosure are described with reference to the following drawings, in which:

FIG. 1 exemplarily shows a block diagram of a wireless communication device including a conventional radiohead system;

FIG. 2A exemplarily shows a radiohead circuit in accordance with various aspects of this disclosure;

FIG. 2B shows an exemplary representation of distributed radiohead system;

FIG. 3 exemplarily shows a distributed radio system in accordance with various aspects of this disclosure;

FIG. 4 exemplarily shows a RF front end portion in accordance with various aspects of this disclosure;

Figure 7:
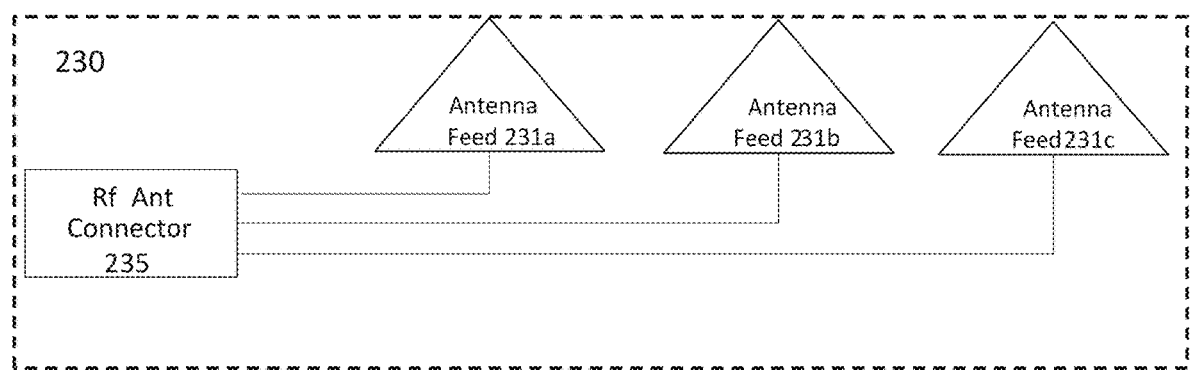
Figure 8:
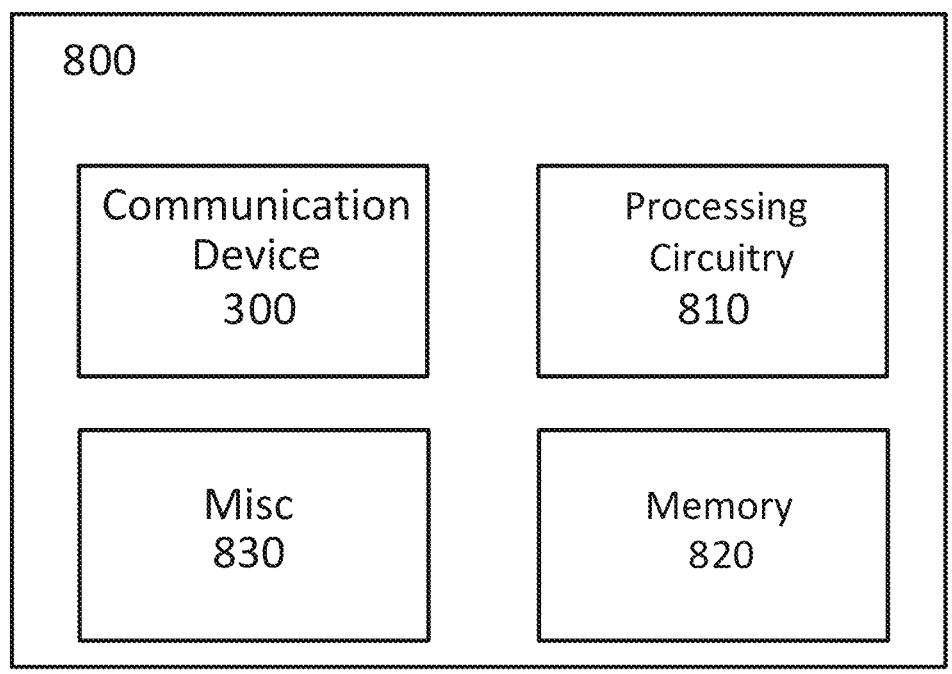
Figure 9:
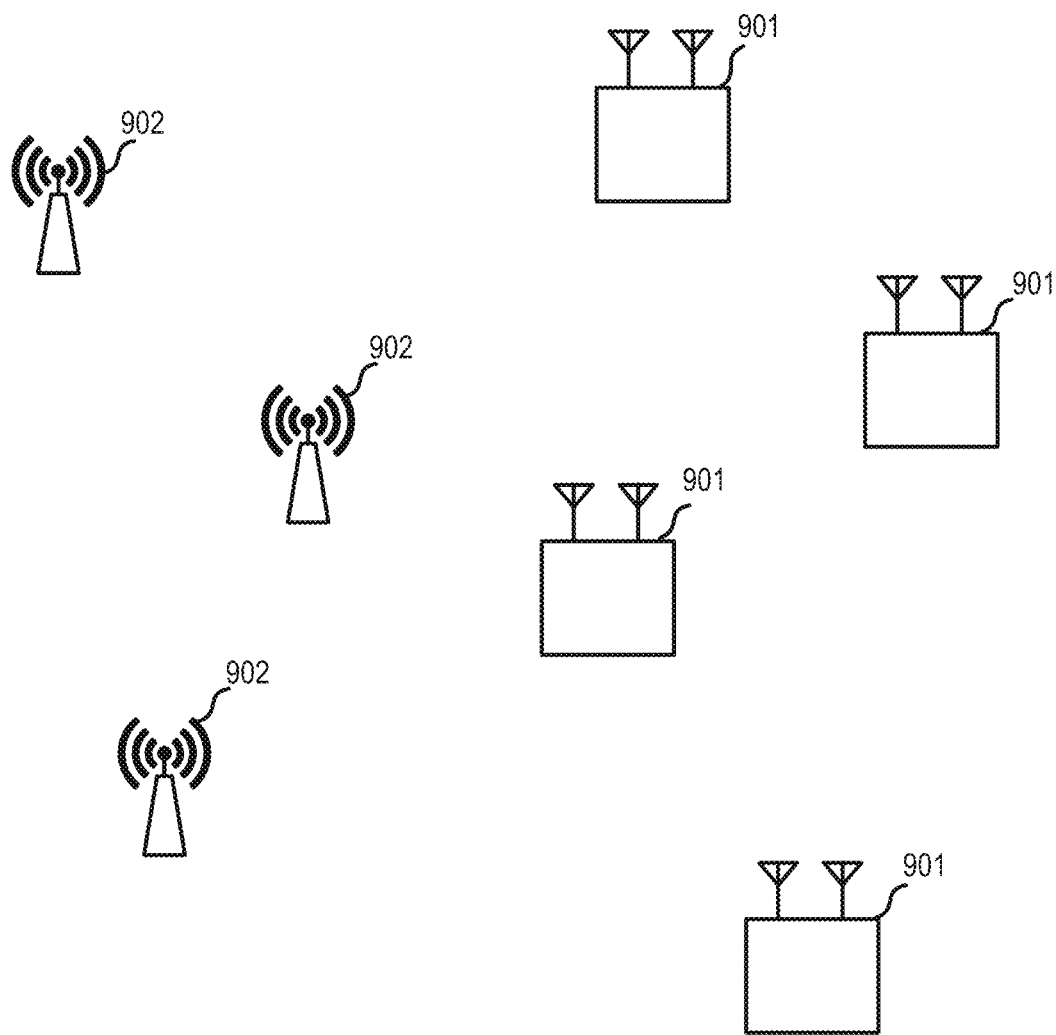
Figure 10:
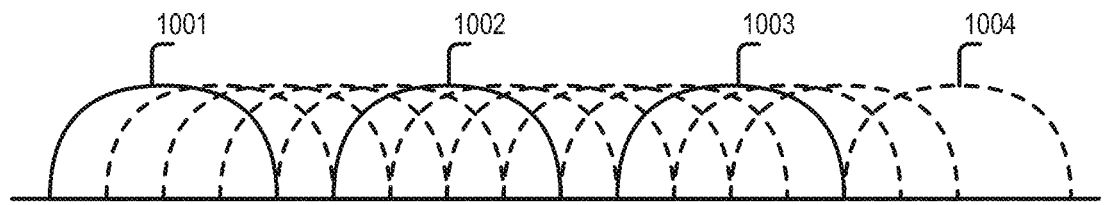
Figure 11:
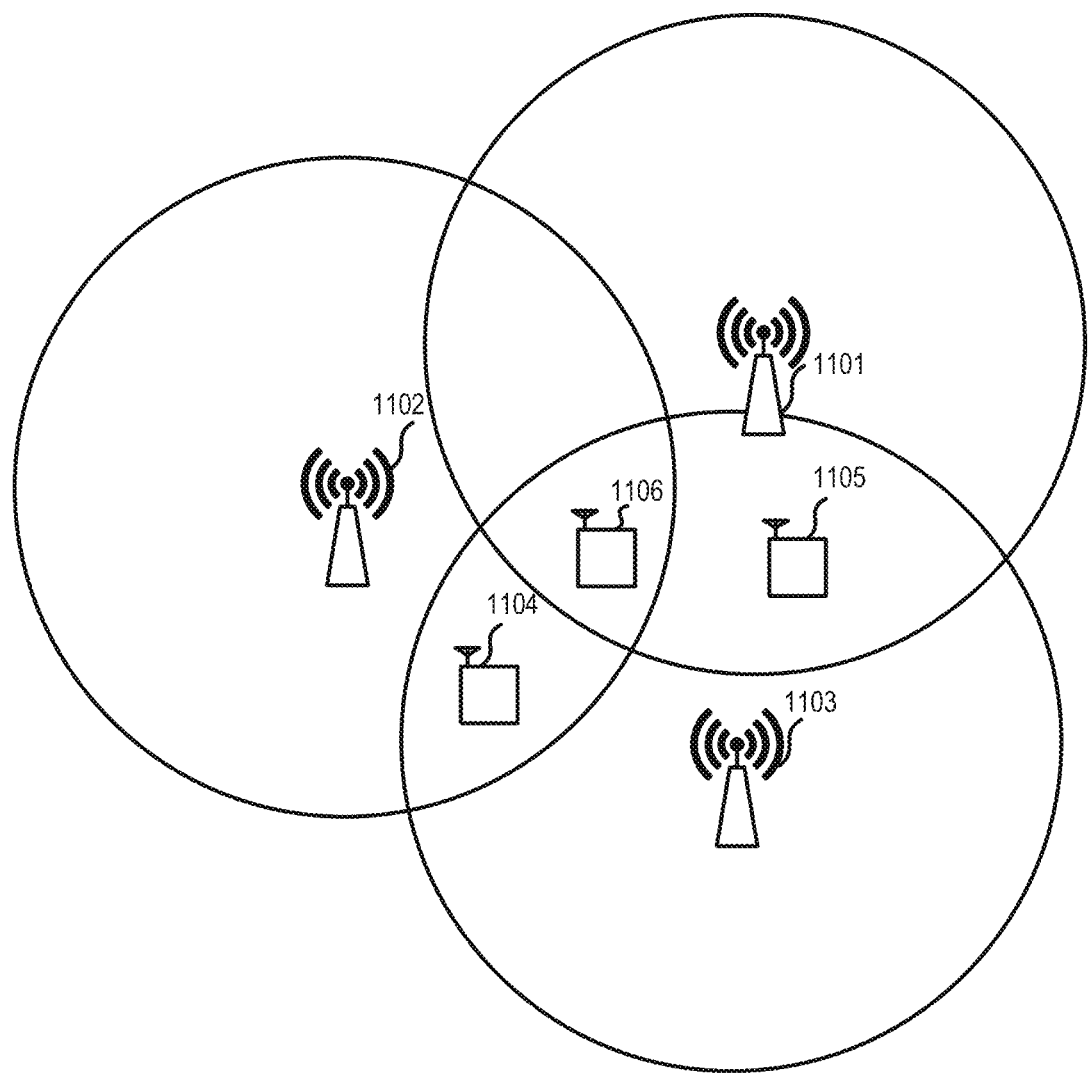
Figure 12:
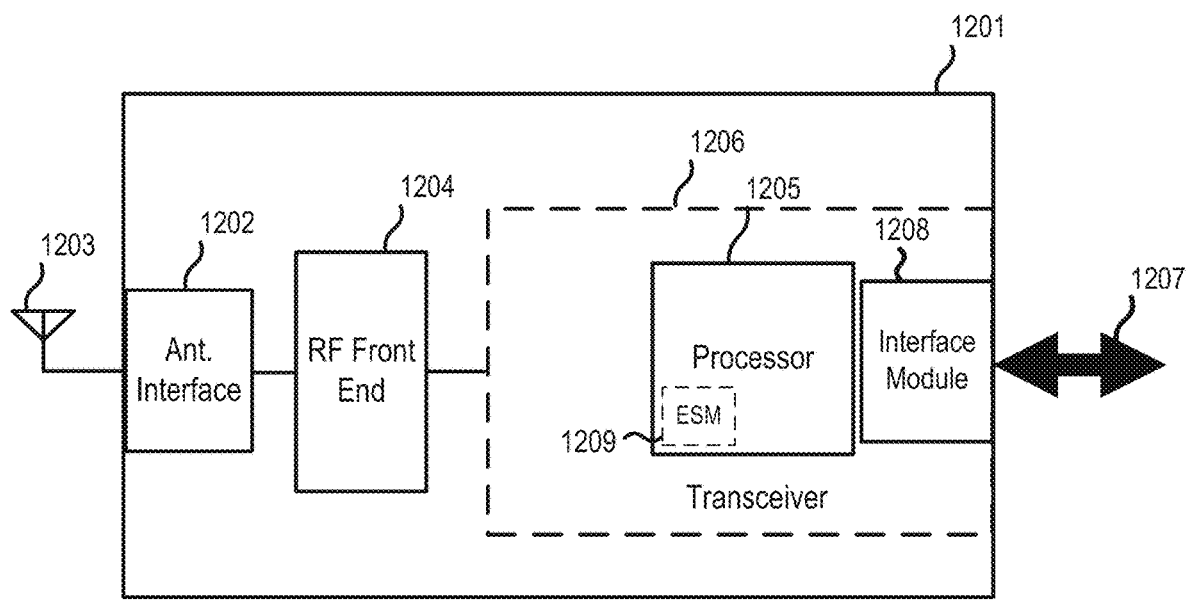
Figure 15:
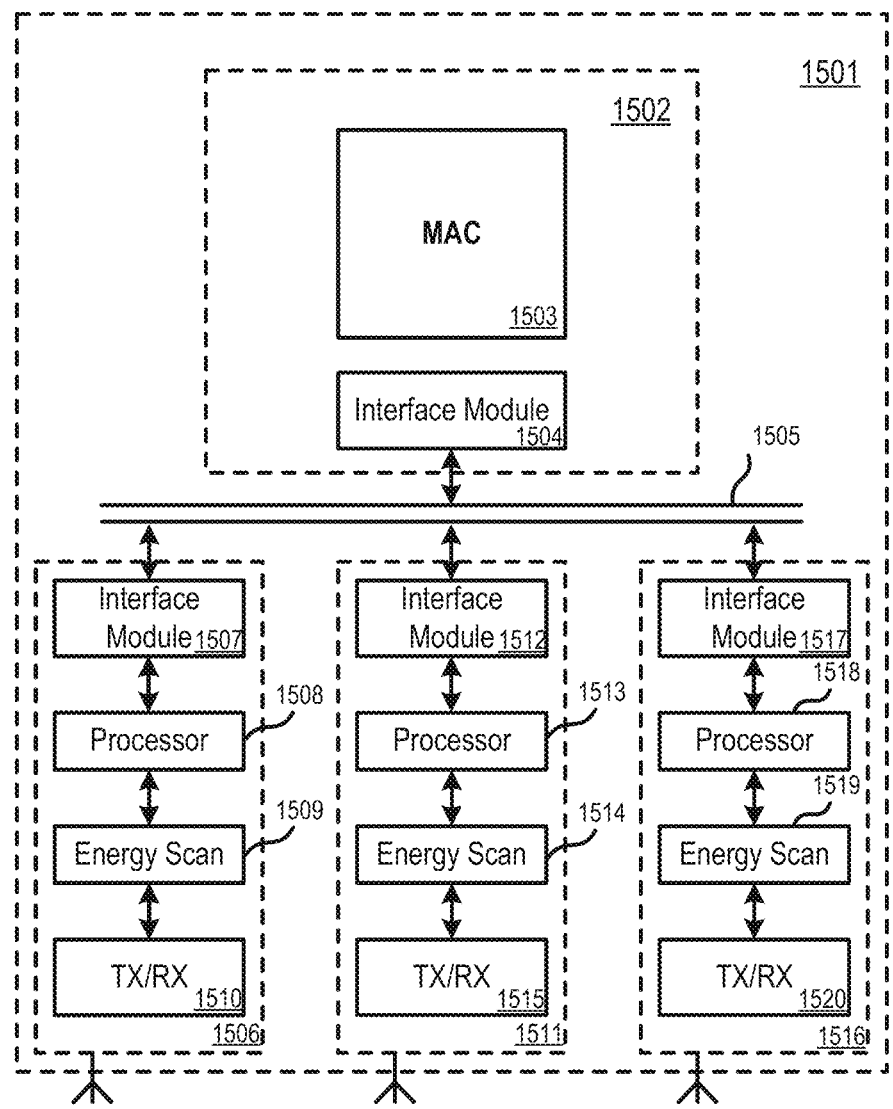
Figure 16:
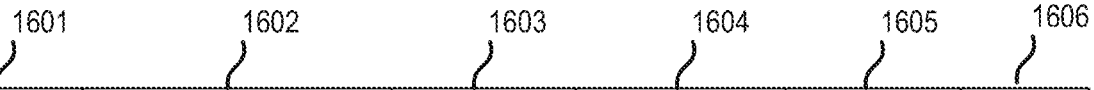
Figure 17:
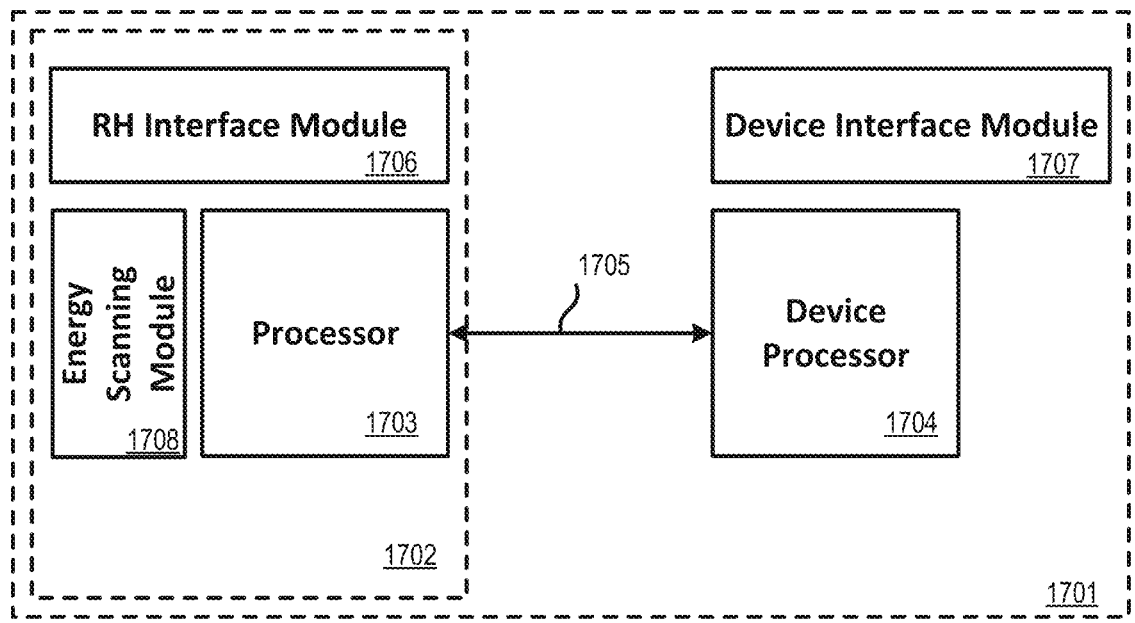
Figure 18:
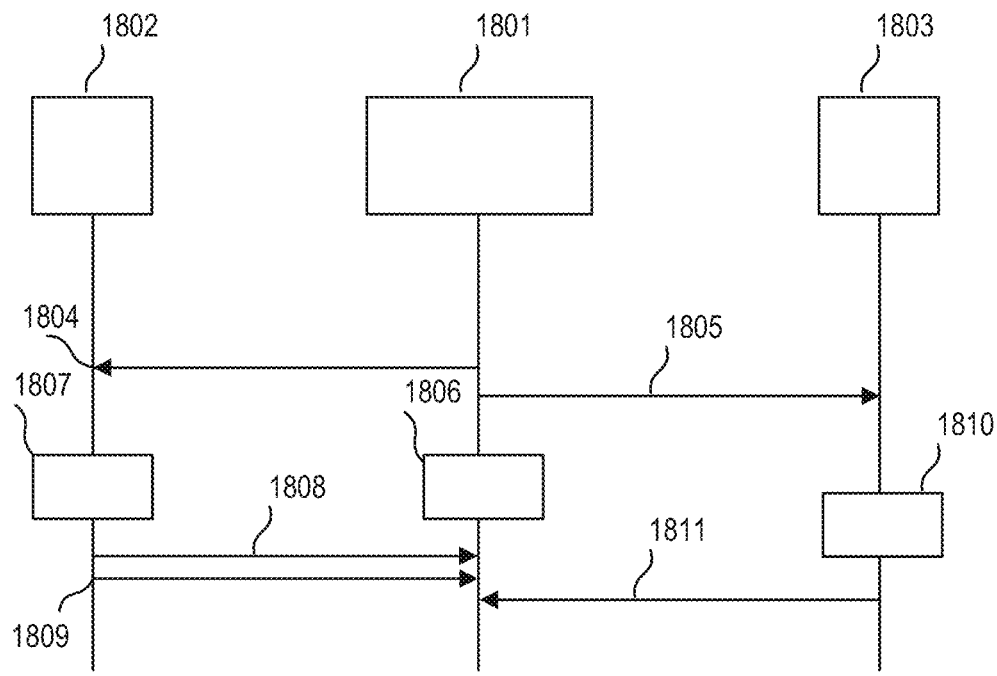
Figure 19:
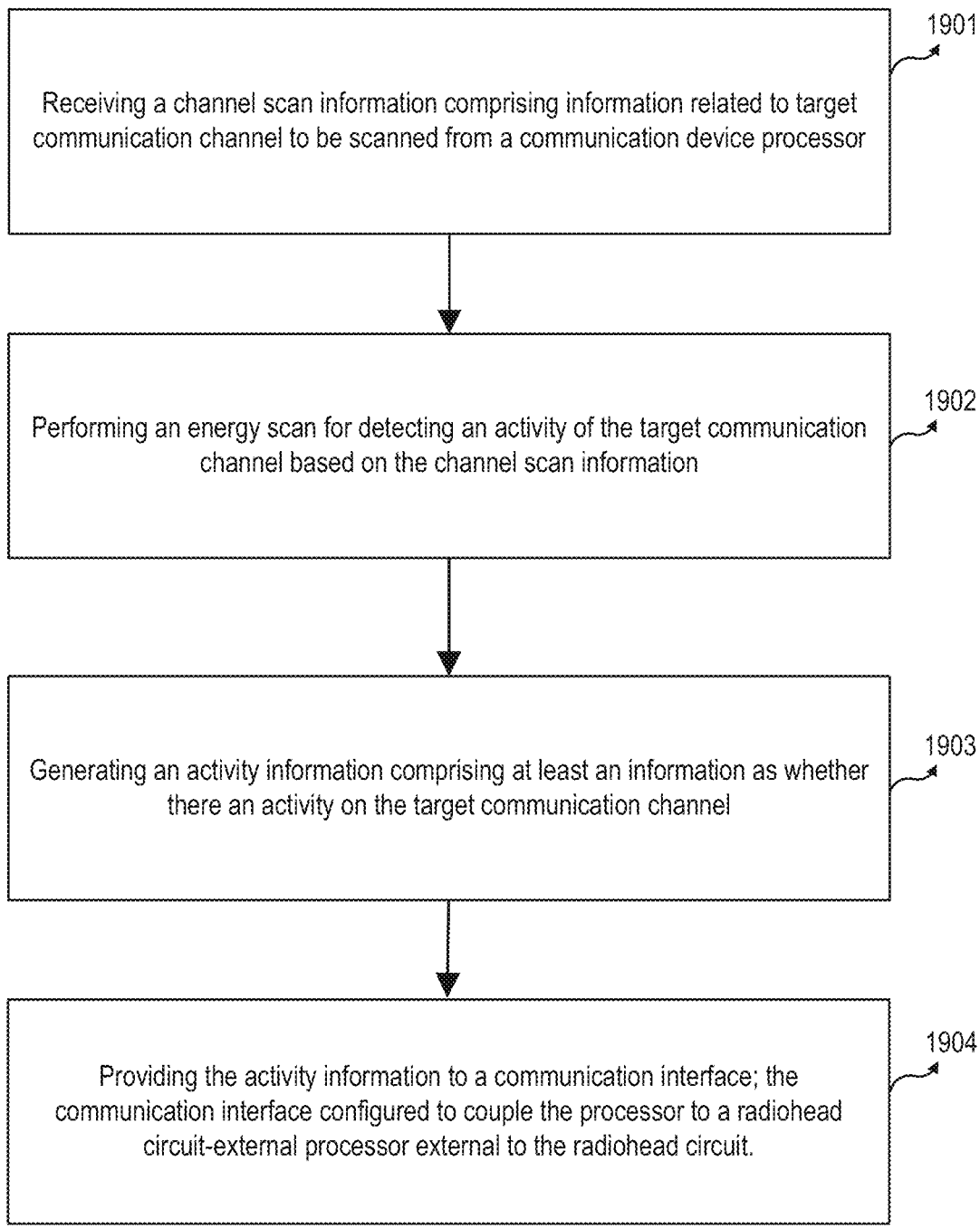
Figure 20:
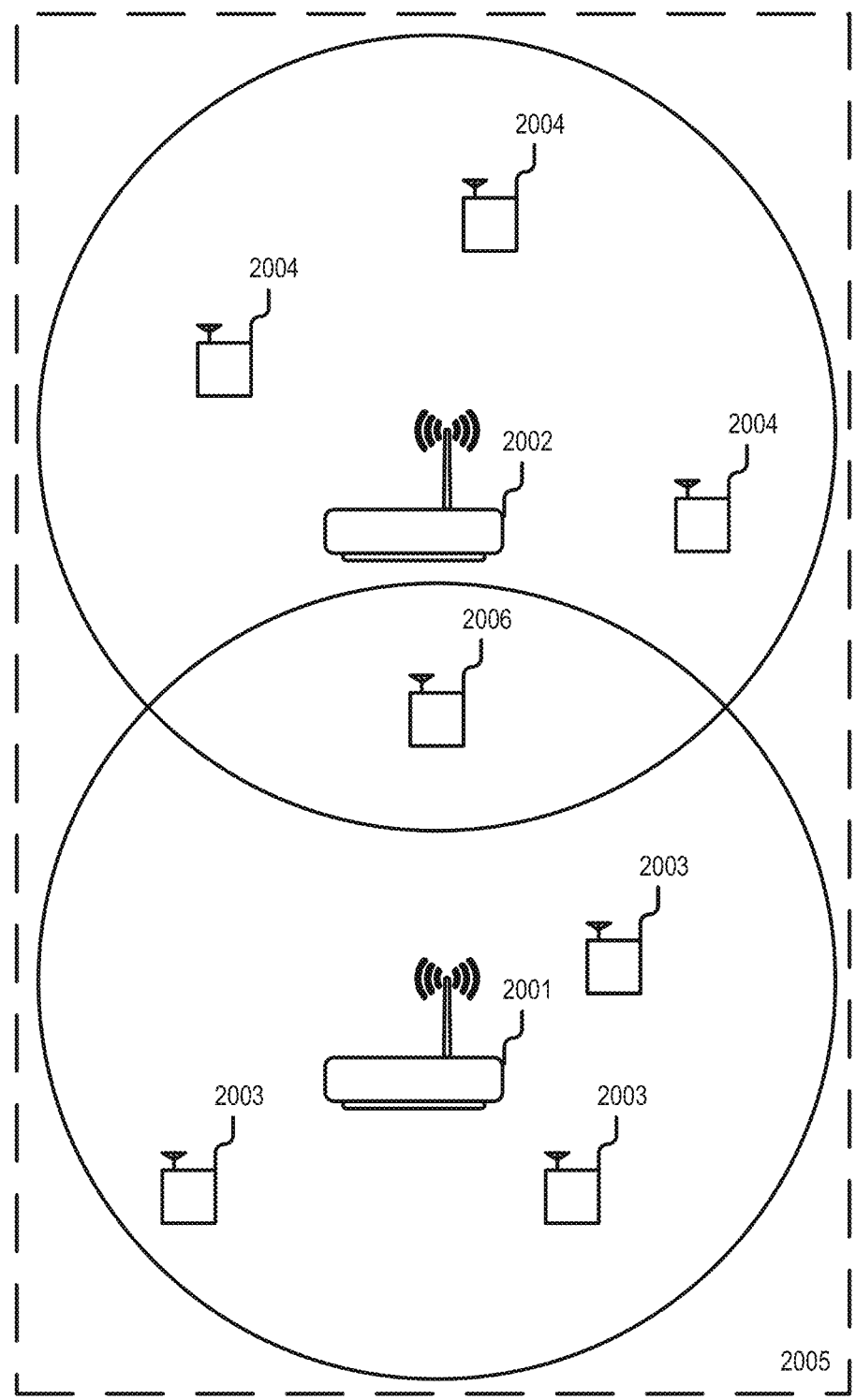
Figure 21:
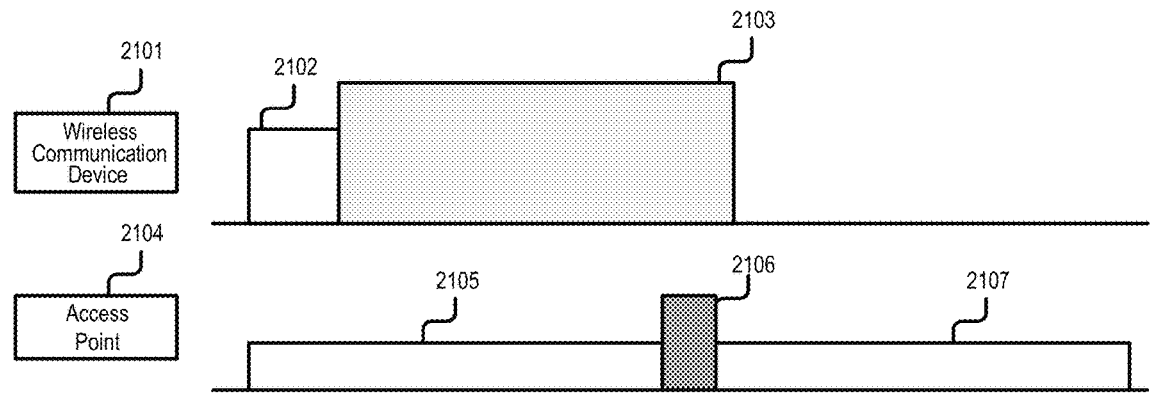
Figure 22:
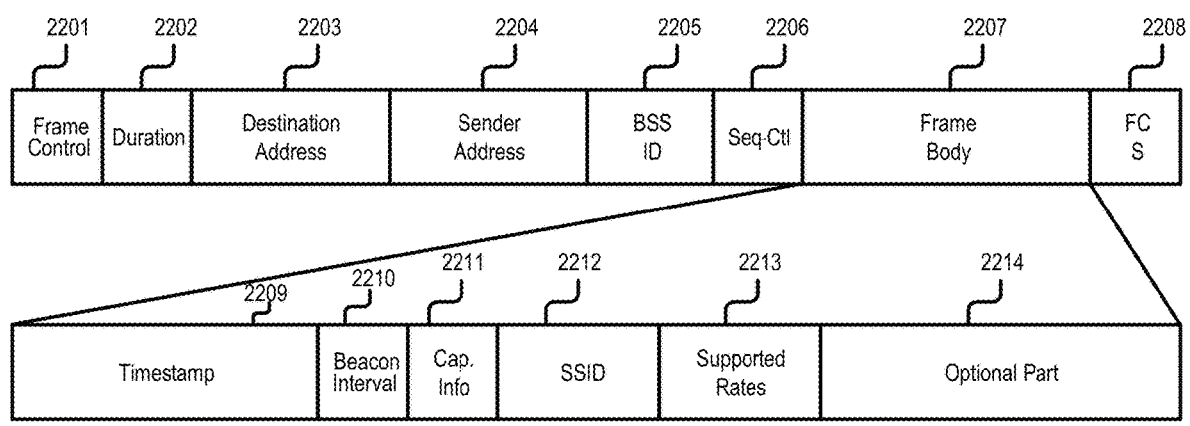
Figure 23:
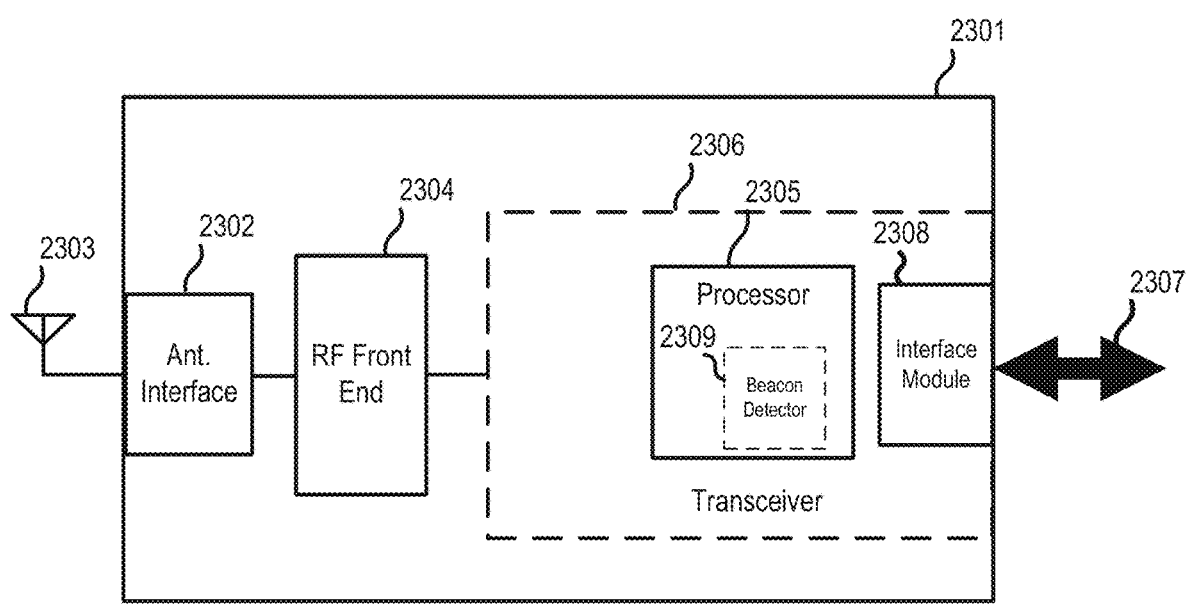
Figure 24:
Figure 25:
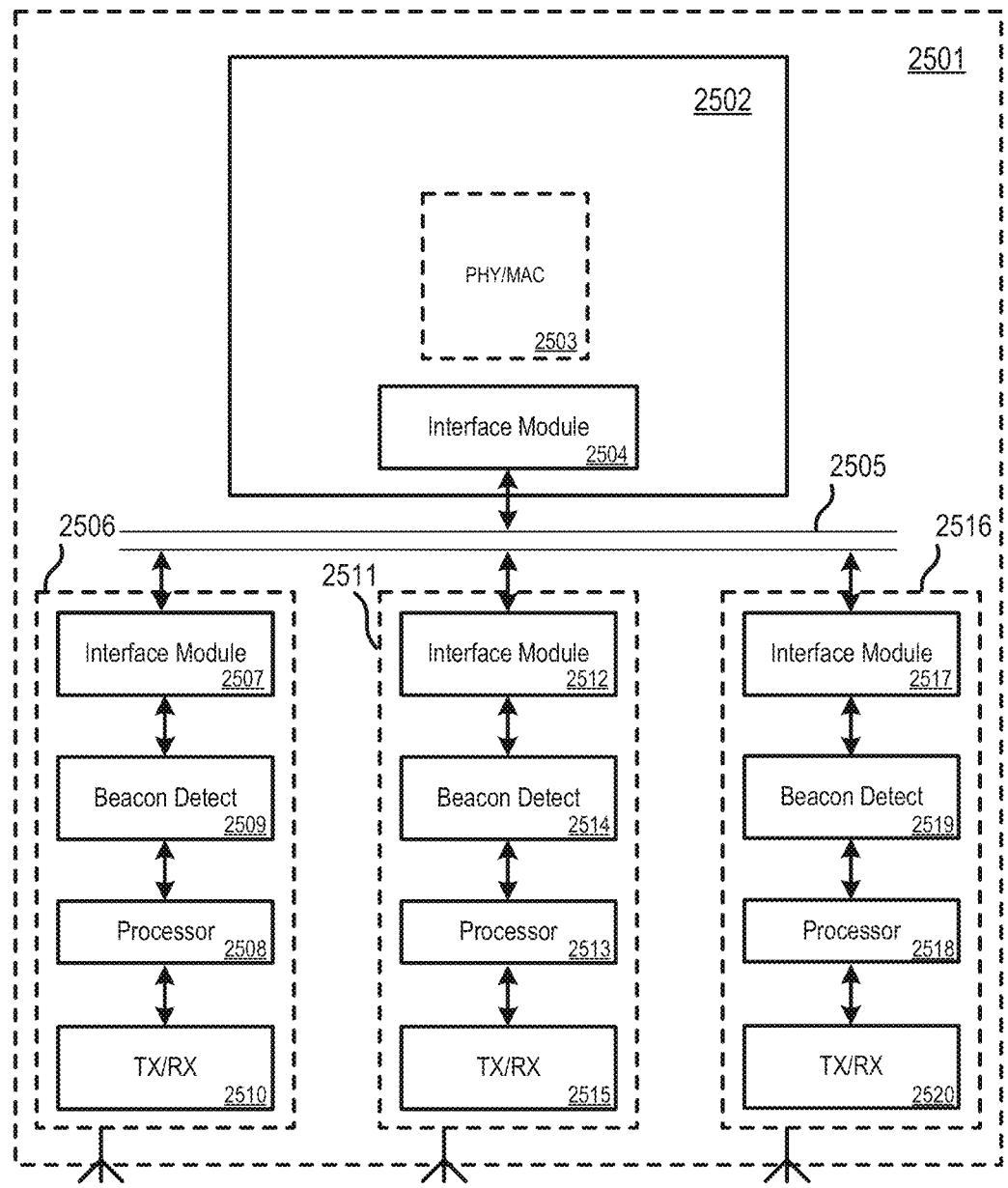
Figure 26A:
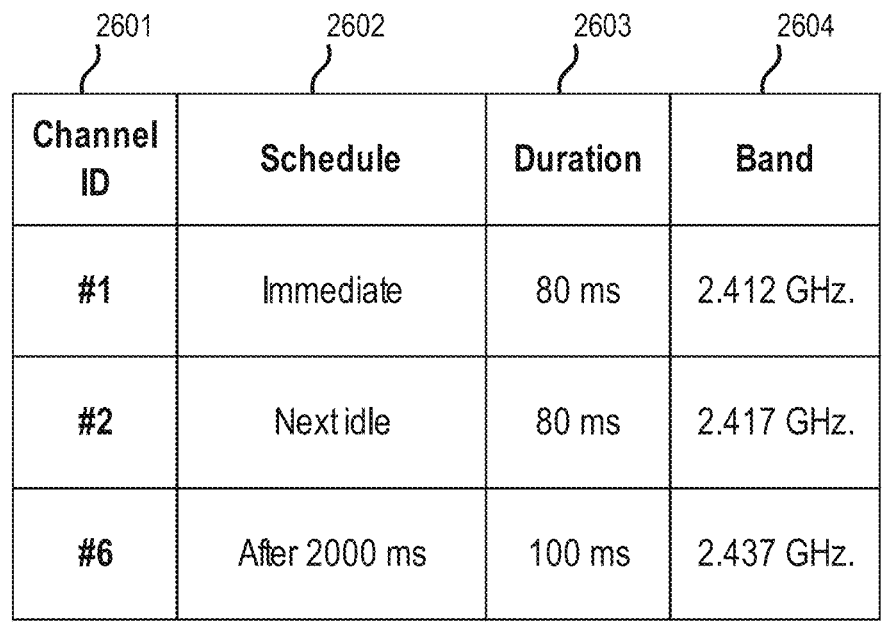
Figure 26B:
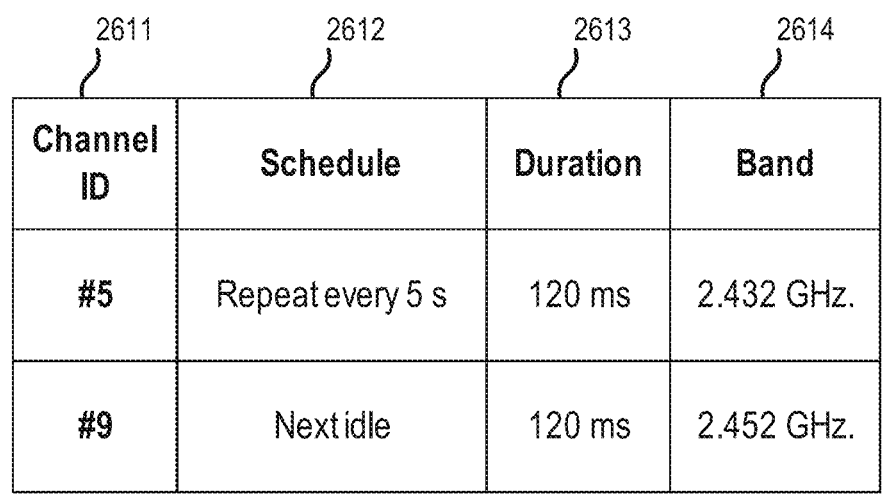
Figure 27:
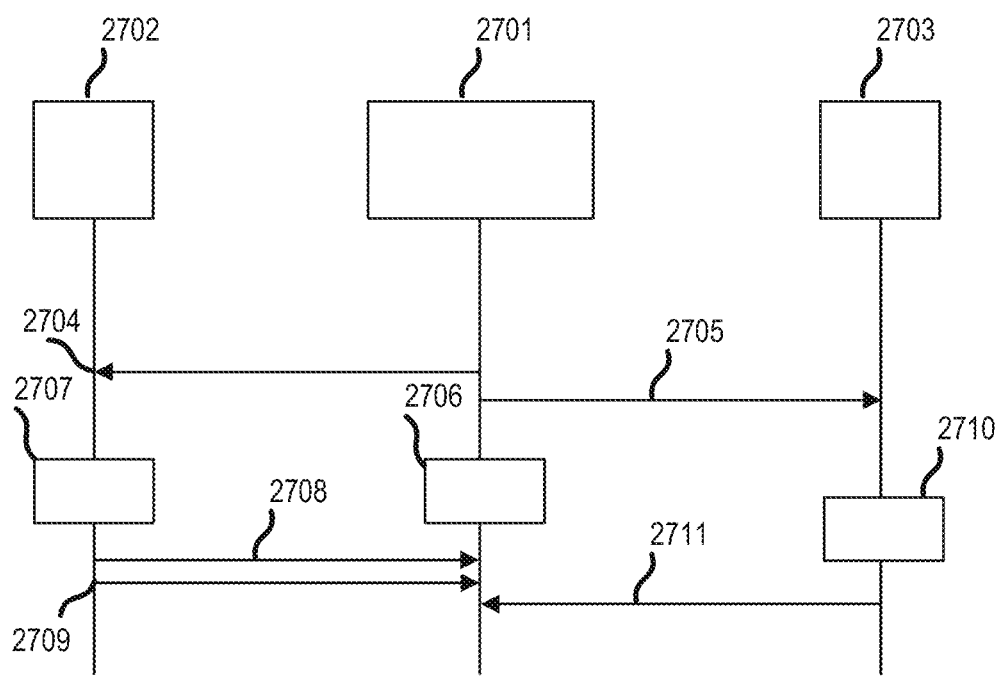
Figure 28:
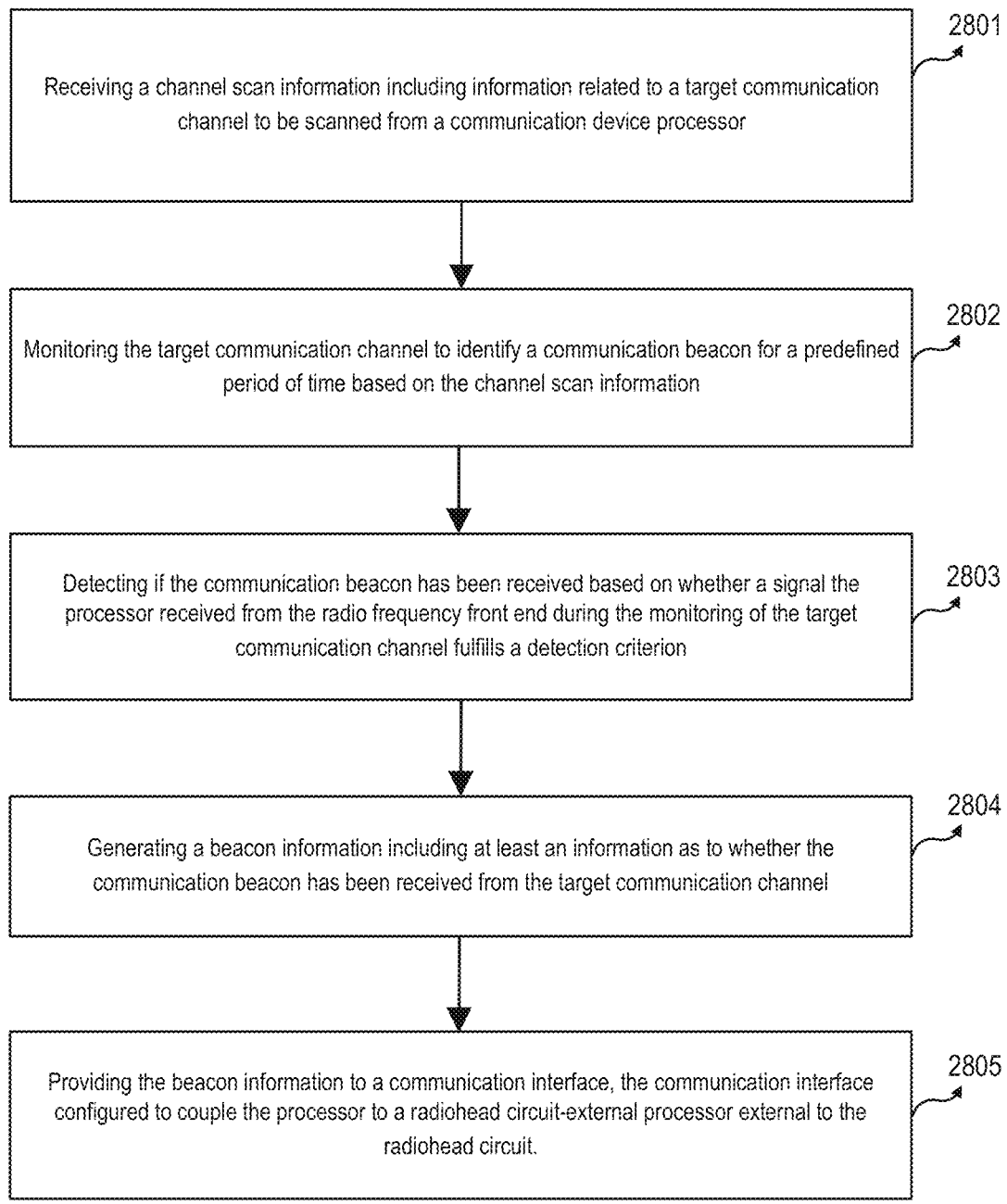
Figure 29:
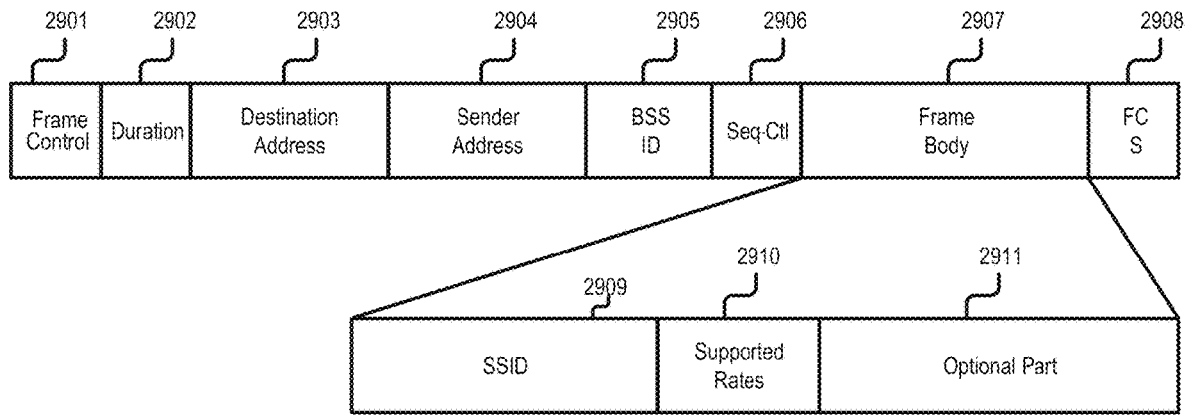
Figure 30:
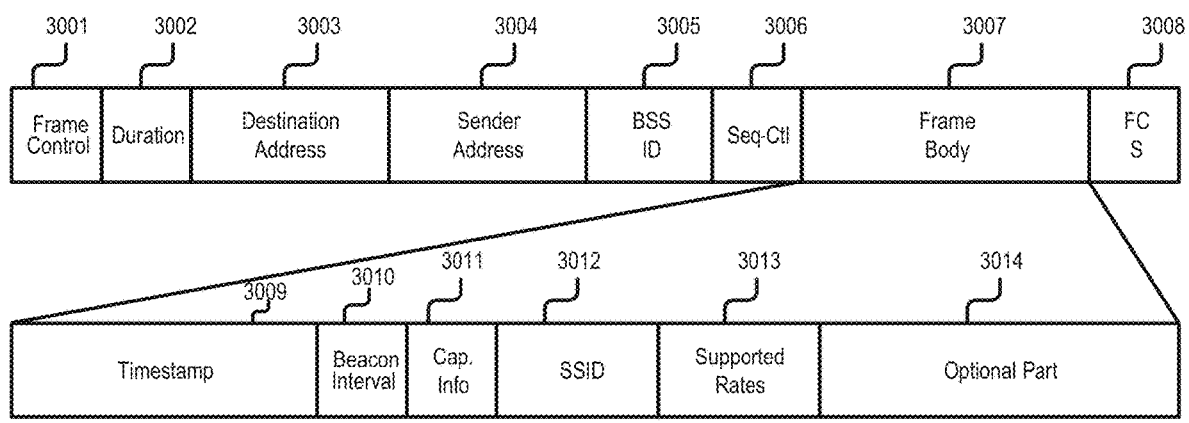
Figure 31:
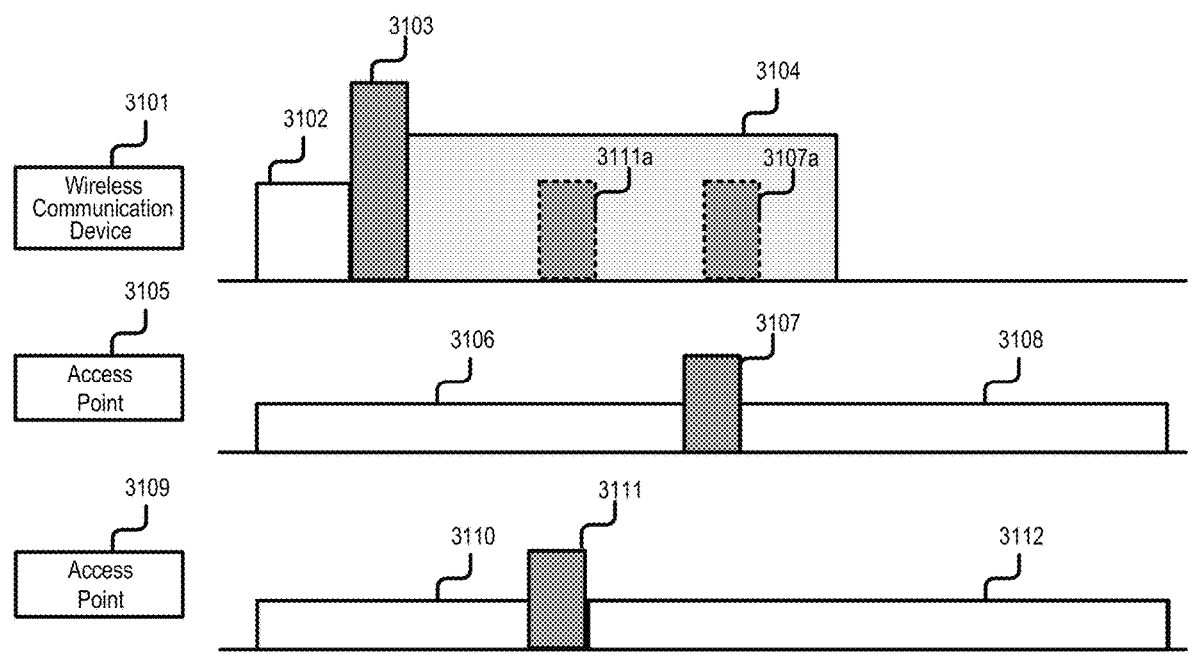
Figure 32:
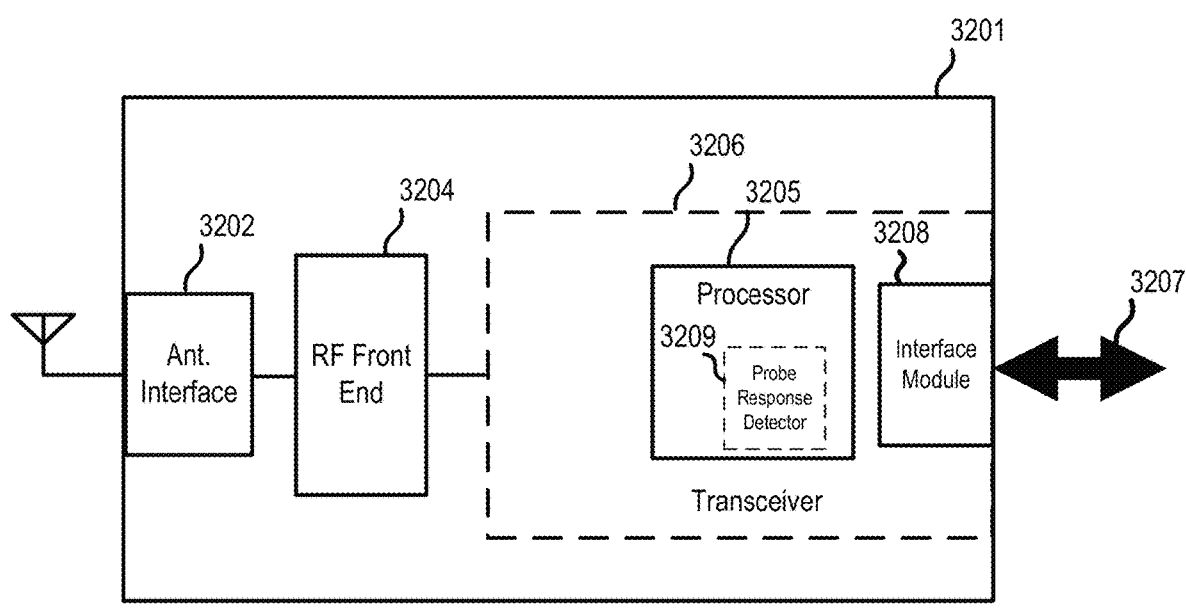
Figure 33:
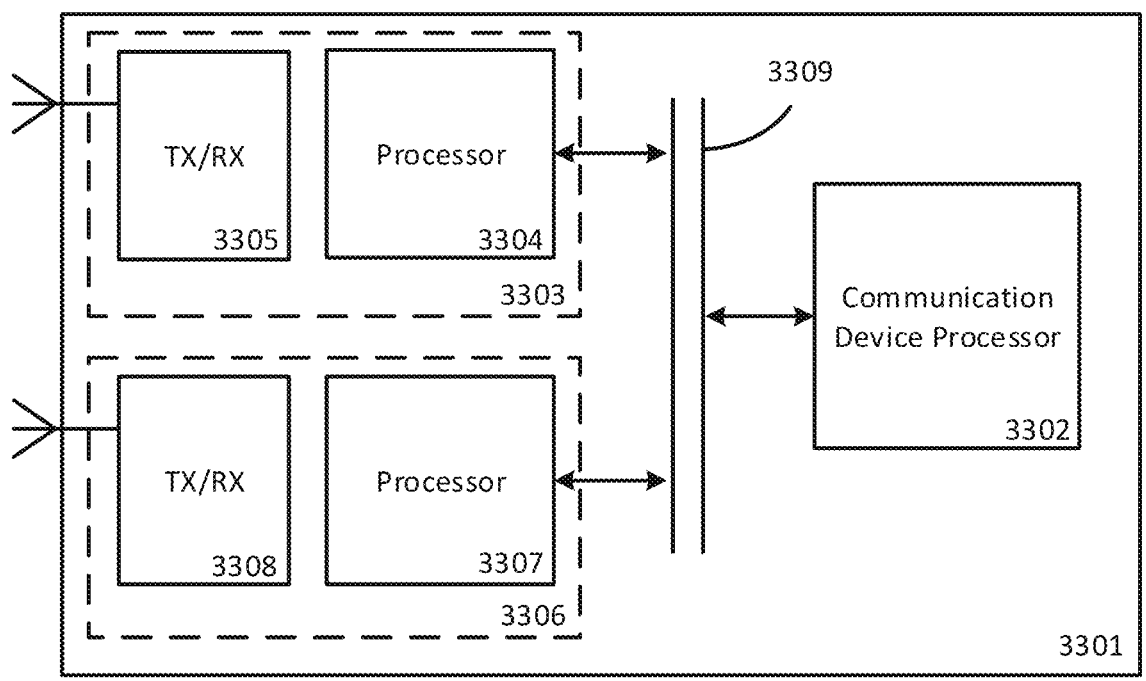
Figure 34:
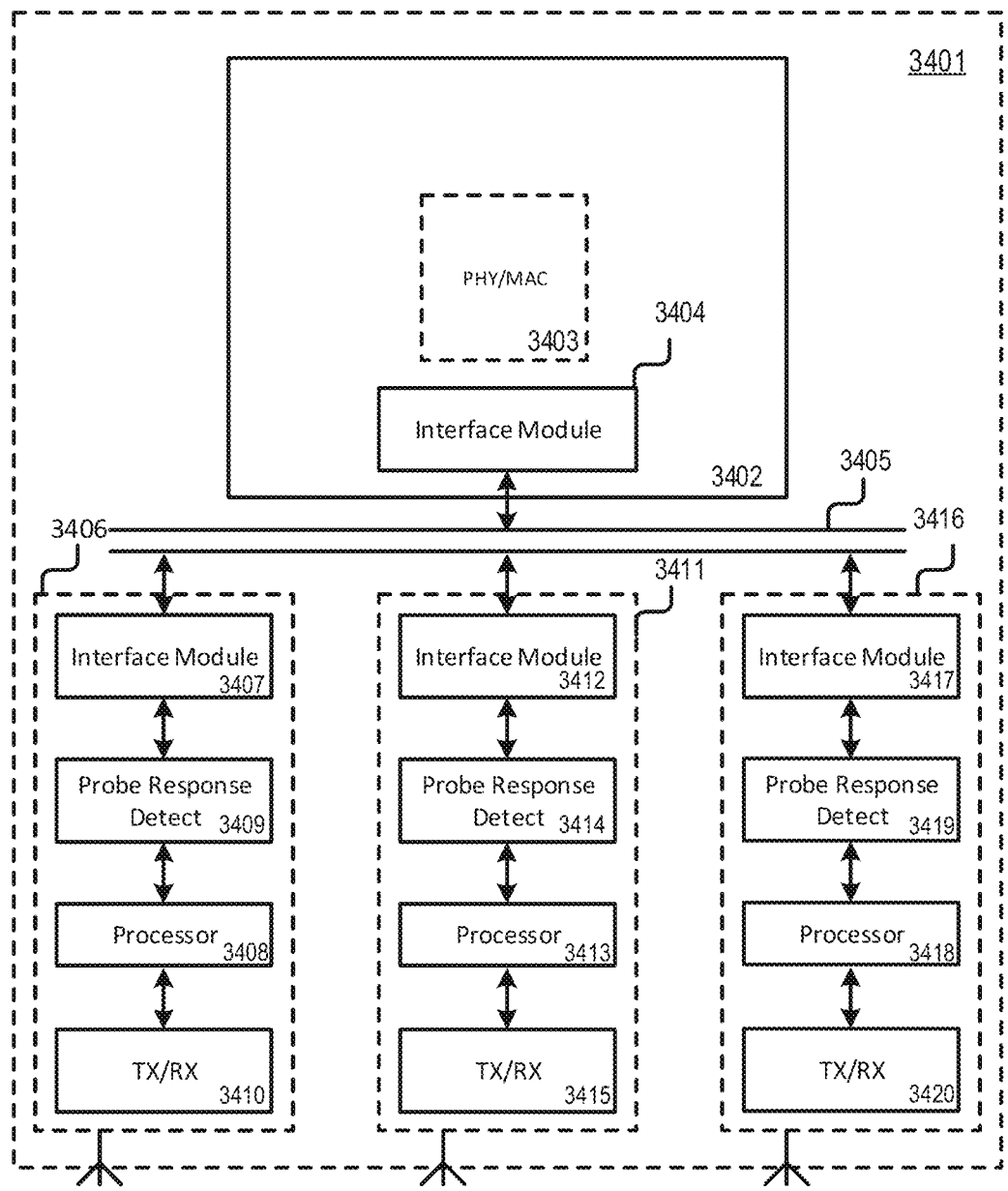
Figure 36:
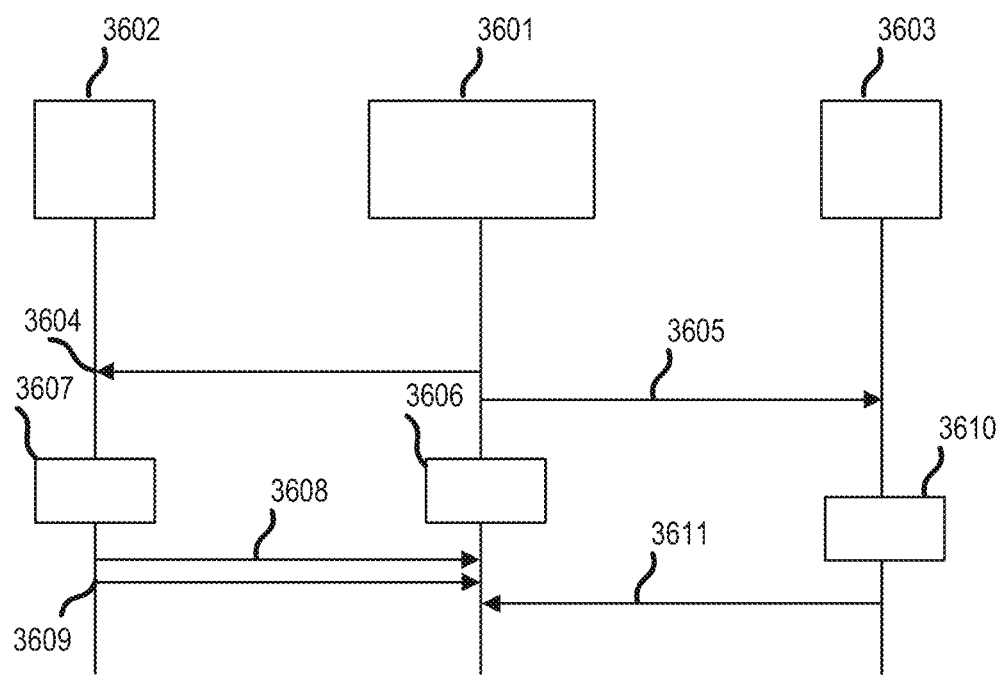
Figure 37:
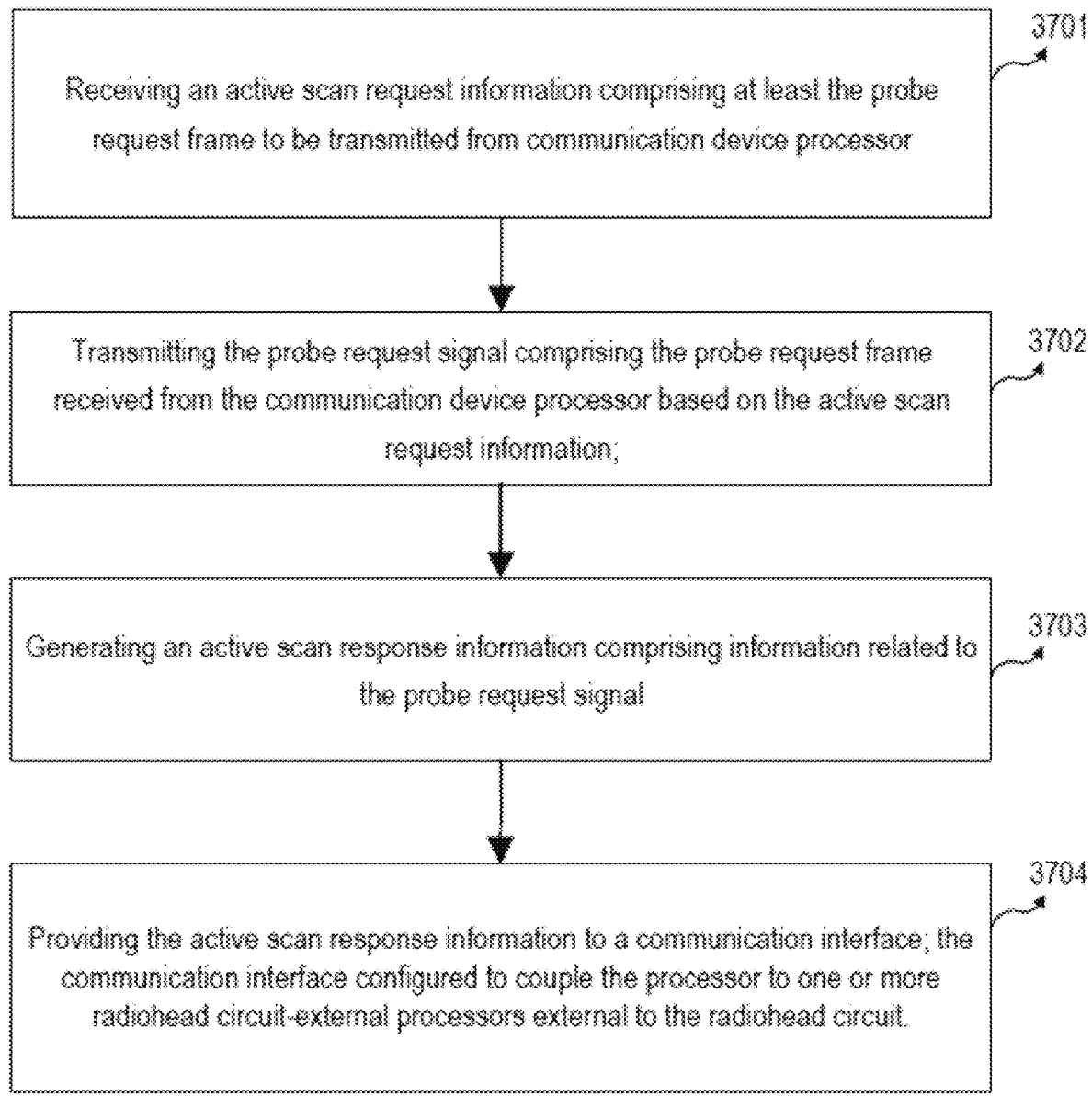
Figure 38:
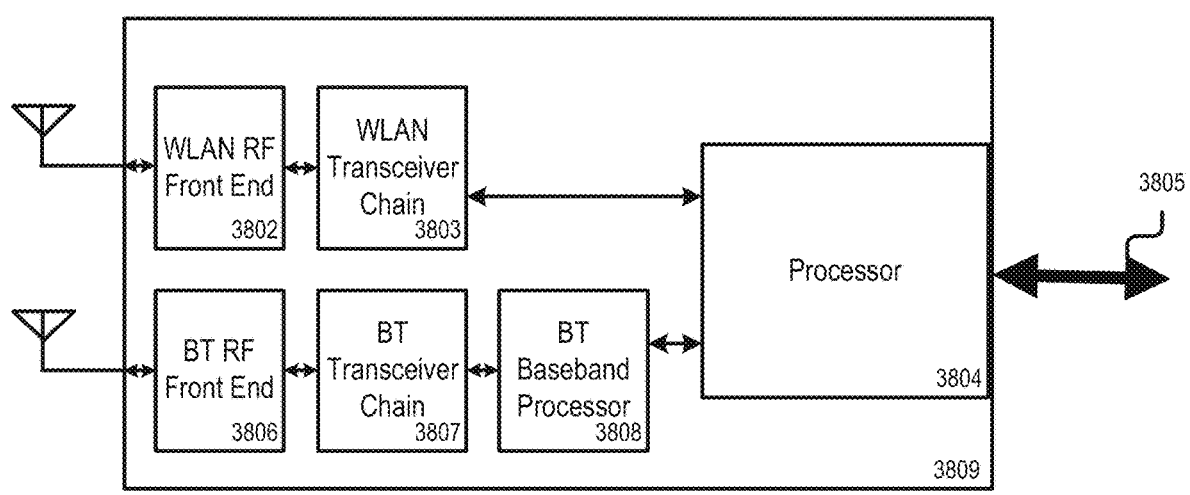
Figure 39:
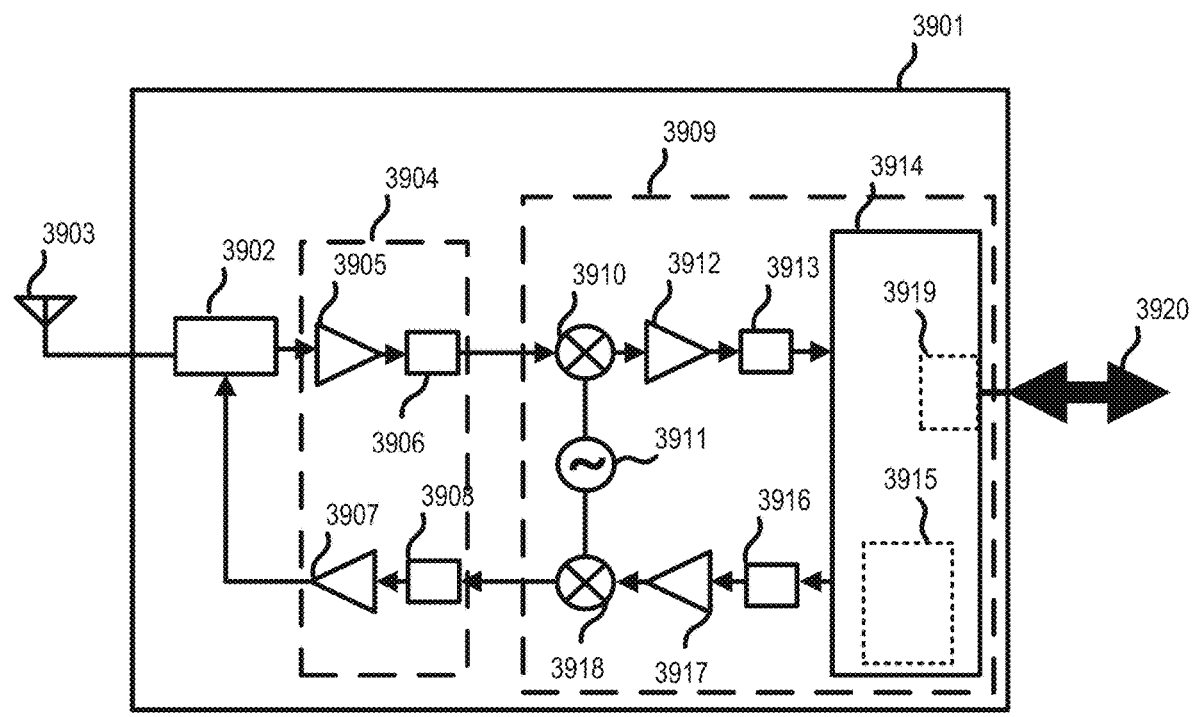
Figure 40:
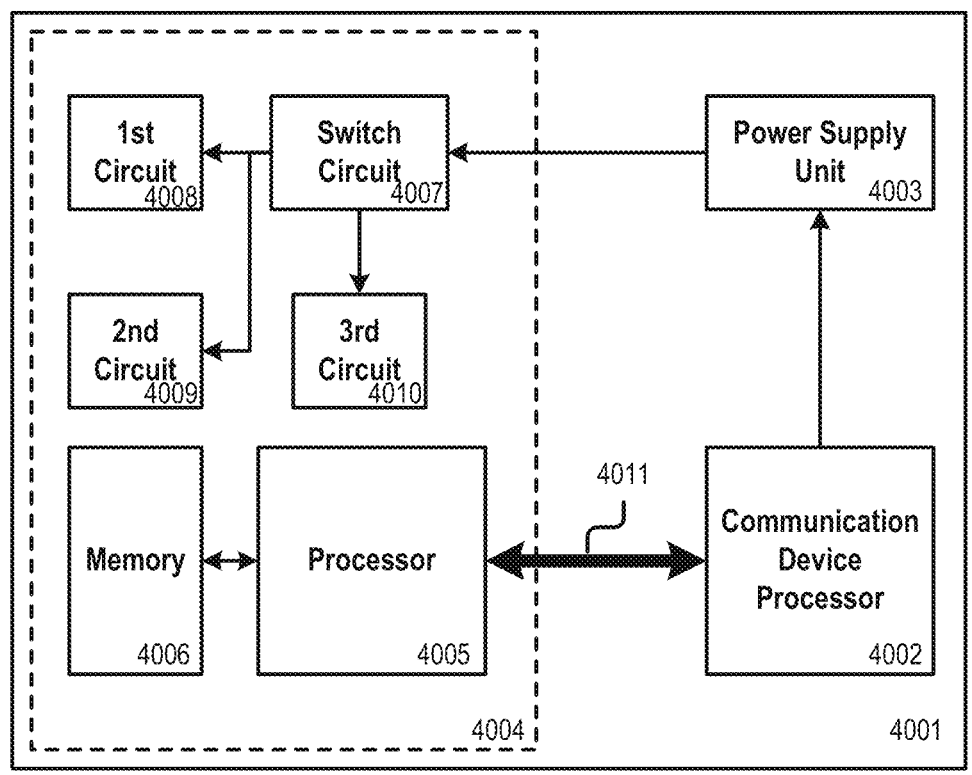
Figure 41:
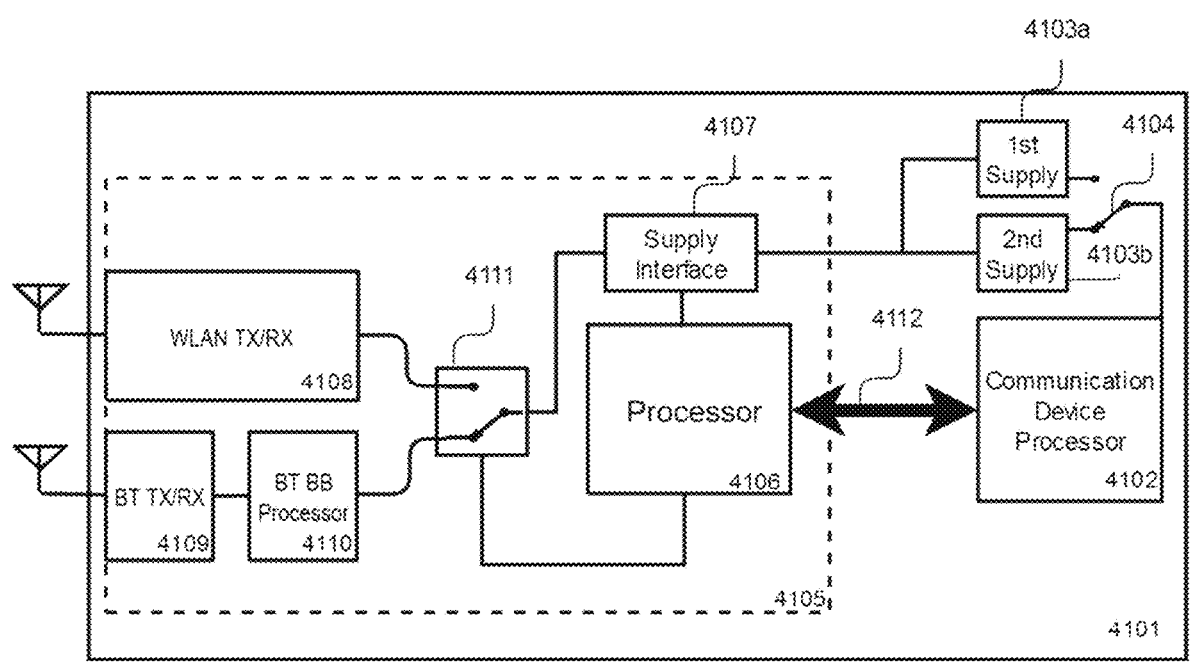
Figure 42:
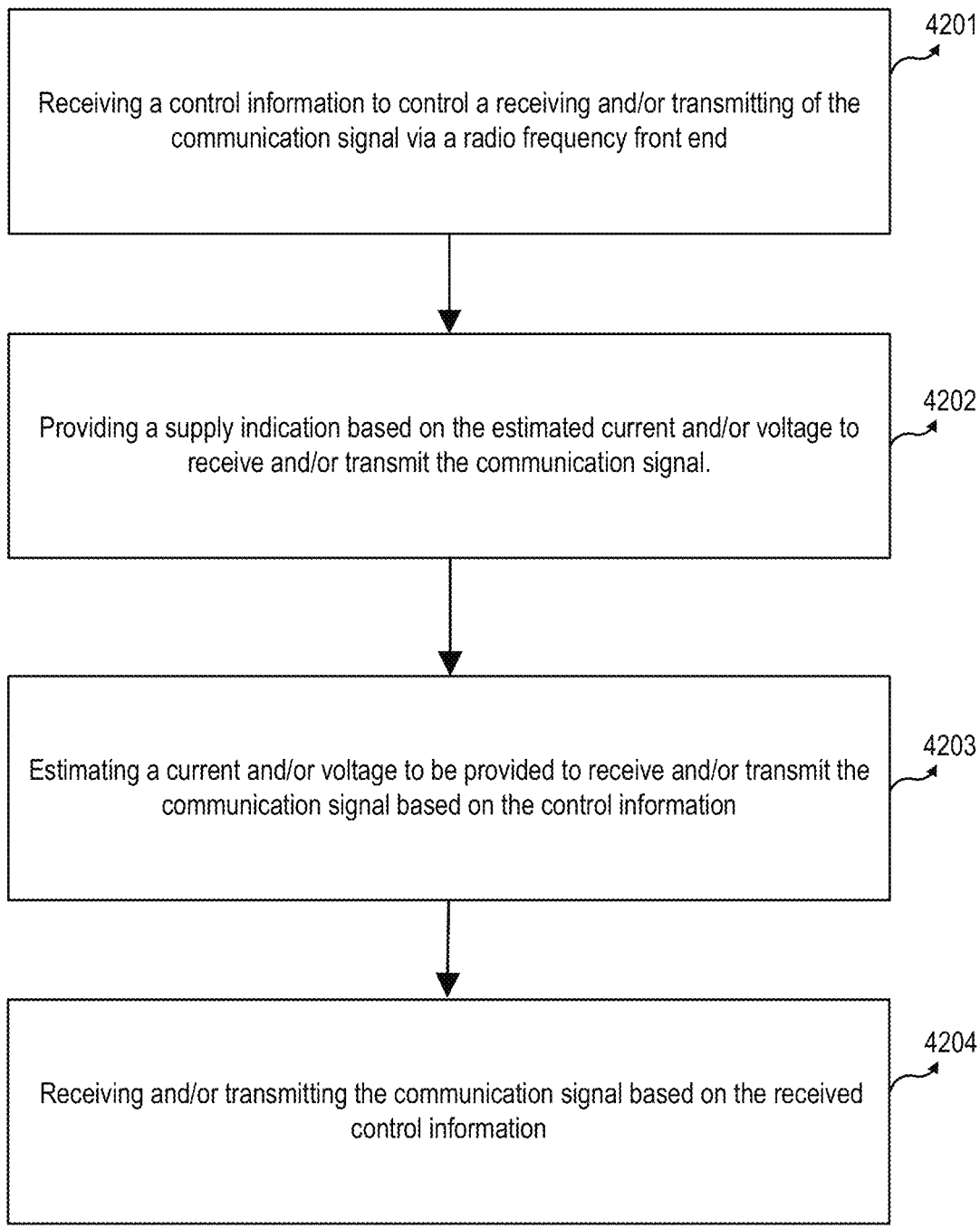

FIG. 7 exemplarily shows an antenna structure in accordance with various aspects of this disclosure;

FIG. 8 exemplarily shows a device in accordance with various aspects of this disclosure;

FIG. 9 shows schematically an example of a wireless communication environment;

FIG. 10 shows schematically an example of a representation of the wireless communication channels in accordance with certain aspects;

FIG. 11 shows schematically an example of a representation of a wireless communication environment;

FIG. 12 shows schematically an example of a radiohead in accordance with various aspects of this disclosure;

FIG. 13 shows schematically an example of an information table which a channel scan information may include in accordance with various aspects of this disclosure;

FIG. 14 shows schematically an example of a generated bitmap information in accordance with various aspects of this disclosure;

FIG. 15 shows schematically an example of a communication device in accordance with various aspects of this disclosure;

FIG. 16 shows schematically an example of an information table which the channel scan information may include in accordance with various aspects of this disclosure;

FIG. 17 shows schematically an example of a representation of a radiohead and a communication device in accordance with various aspects of this disclosure;

FIG. 18 shows schematically an example of a communication flow in accordance with the various aspects of this disclosure;

FIG. 19 shows schematically an example of method steps in accordance with various aspects of this disclosure;

FIG. 20 shows schematically an example of a service set for a wireless communication protocol;

FIG. 21 shows schematically an example of a representation of scanning procedure;

FIG. 22 shows schematically a representation of a beacon frame;

FIG. 23 shows schematically an example of a radiohead in accordance with various aspects of this disclosure;

FIG. 24 shows schematically an example of an information table which a channel scan information may include in accordance with various aspects of this disclosure;

FIG. 25 shows schematically an example of a communication device in accordance with various aspects of this disclosure;

FIG. 26A shows an example of the information which a first channel scan information may include in accordance with various aspects of this disclosure;

FIG. 26B shows an example of the information which a second channel scan information may include in accordance with various aspects of this disclosure;

FIG. 27 shows schematically an example of a communication flow in accordance with the various aspects of this disclosure;

FIG. 28 shows schematically an example of method steps in accordance with various aspects of this disclosure;

FIG. 29 shows schematically a representation of a probe request frame;

FIG. 30 shows schematically a representation of a probe response frame;

FIG. 31 shows schematically an example of a representation of scanning procedure;

FIG. 32 shows schematically an example of a radiohead in accordance with various aspects of this disclosure;

FIG. 33 shows schematically an example of a communication device;

FIG. 34 shows schematically an example of a communication device in accordance with various aspects of this disclosure;

FIG. 35A shows an example of the information which a first active scan request information may include in accordance with various aspects of this disclosure;

FIG. 35B shows an example of the information which a second active scan request information may include in accordance with various aspects of this disclosure;

FIG. 36 shows schematically an example of a communication flow in accordance with the various aspects of this disclosure;

FIG. 37 shows schematically an example of method steps in accordance with various aspects of this disclosure;

FIG. 38 shows schematically an example of a radiohead in accordance with various aspects of this disclosure;

FIG. 39 shows schematically an example of a radiohead in accordance with various aspects of this disclosure;

FIG. 40 shows schematically an example of a communication device in accordance with various aspects of this disclosure;

FIG. 41 shows schematically an example of a communication device in accordance with various aspects of this disclosure;

FIG. 42 shows schematically an example of method steps in accordance with various aspects of this disclosure.

DESCRIPTION

The following detailed description refers to the accompanying drawings that show, by way of illustration, exemplary details and aspects in which aspects of the present disclosure may be practiced.

As demand for wireless data traffic increases, wireless communication devices may require more wireless transceivers (e.g., multiple input multiple output (MIMO) technology, distributed input/distributed output (DIDO) networks, and/or multi-radio systems) to support wider bandwidths (BW), e.g., a BW of 320 MHz or more, and/or higher-order modulations schemes, e.g., 4 k Quadrature Amplitude Modulation (QAM), or higher order modulation schemes. As demand for more efficient wireless communication devices (e.g., smaller size, less power consumption, higher performance, less material, lower costs), wireless communication devices may require greater integration while avoiding interference caused by the greater integration.

However, conventional implementations of the transceiver circuit and antenna and conventional cable connectivity schemes offer limited integration abilities due to cable losses, interference, thermal issues, and power consumption limitations. For example, in current wireless communication devices, such as those devices compliant with WiFi, Bluetooth (BT), GSM, CDMA, UMTS, LTE, or 5G or subsequent communication standards, the transceiver circuit is separate and remote from the antenna. In some cases, the integrated transceiver and front-end module is called a "radiohead" or "radio head".

In general, a radiohead can be considered as the radio equipment or RF circuitry for wirelessly communicating with other devices or networks. A radiohead includes a wireless transceiver for receiving and transmitting RF signals. Further the radiohead, as a transmitter can convert a digital signal to RF analog signal and amplify the converted signal to a desire power level so that an antenna connected to the transmitter radiates the RF signal. As a receiver, the radiohead can receive an RF signal from the antenna and then amplify the RF signal and further convert it back to a digital signal.

Said differently, a radiohead can be considered as the (integrated) RF transceiver combined with a front-end module (FEM) part that is specifically related to a specific antenna, and may include the least amount of signal processing in accordance with various aspects of this disclosure. The FEM, in general, can include circuitry between a receiver's antenna input up to and including the mixer stage. Ideally, a radiohead will be located or placed with the antenna/module or in close proximity to one so that one will be able to see multiple radiohead instances in a design with multiple antennas. This is contrast from the classic partitioning by function where there is a multi-channel transceiver connected to multiple front-end modules (or networks) and multiple antennas.

Although the radiohead may include the least amount of signal processing in accordance with various aspects of this disclosure, that may depend on the communication technology which the radiohead may include. In many examples, the radiohead may include the least amount of signal processing for certain communication technologies, while the radiohead may include more advanced processing blocks for another type of communication technologies. For example, the radiohead may include the least amount of signal processing for a wireless local area network (WLAN) communication, at which the radiohead may depend on the one or more processors of the communication devices to process the communication signals including communication signals according to the wireless local area network (WLAN) communication, while the radiohead may include one or more processors for processing a Bluetooth signal by itself without as much as dependence to the one or more processors of the communication device.

In accordance with various aspects of this disclosure the radiohead may be coupled to one or more processors of a communication device via a communication interface. In many examples, the communication interface may include a digital communication interface. In many examples, the communication interface may include a Serial Time Encoded Protocol (STEP) interface. In examples, the Serial Time Encoded Protocol (STEP) interface may be digitally coupled to a digital interface at one or more processors of the communication device and configured to transmit digital communications over the digital link in between. In examples, this digital link may provide bi-directional digital communications in accordance with an asynchronous time-based protocol, and may therefore provide for communications employing time division multiplexing. Accordingly, the digital link between the digital interfaces may support multiple bits per symbol and a narrow pass-band frequency spectral occupancy, resulting in higher data rates and lower energy per bit signaling. Furthermore, because the digital communication interfaces may have a low exit latency, the system may be turned off during idle times with fast re-acquisition.

Figure 1:
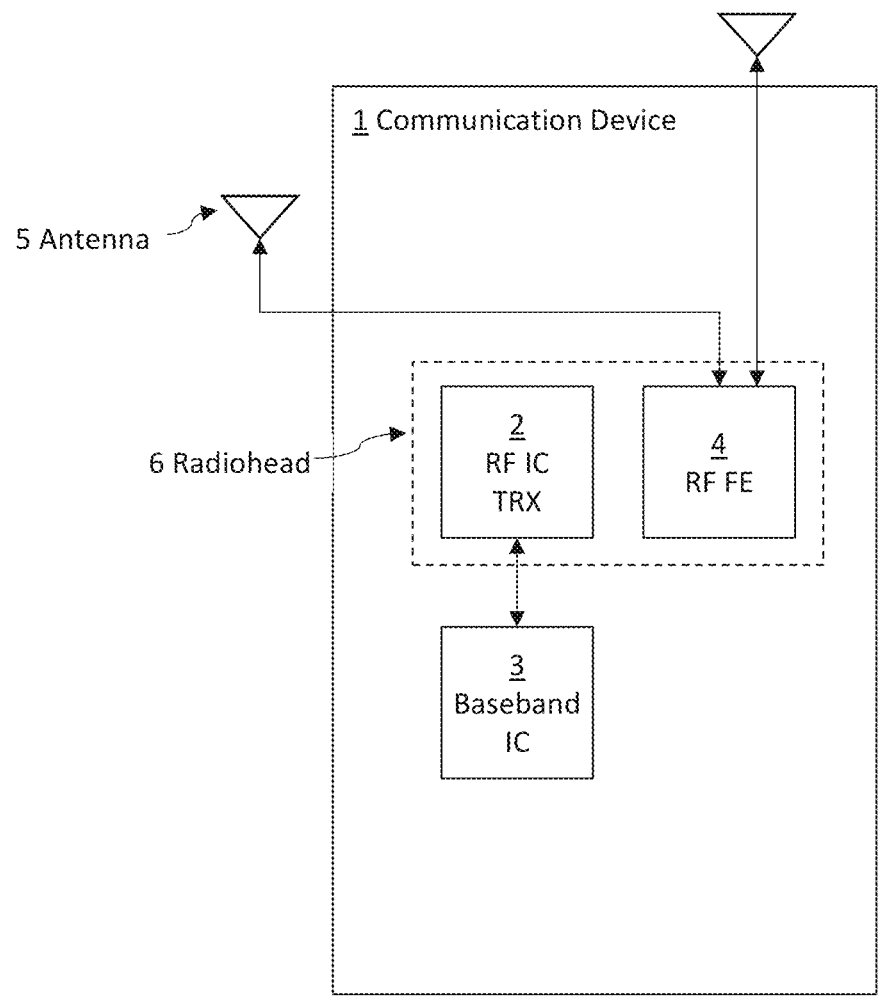

FIG. 1 shows a block diagram of a wireless communication device including a conventional radiohead system. Referring to FIG. 1, the wireless communication device 1 includes a baseband integrated circuit 3 for baseband signal processing, a centralized radiohead circuit 6 for radio frequency signal processing, and one or more discrete antennas 5. The radiohead circuit 6 and antennas 5 may be separate modules that are connected using a specialized radio frequency (RF) cable, e.g., coax cable, as a feed line to communicate RF electrical signals between the radiohead circuit and the antennas. Typically, as high-performance mini coax cables are costly components, only a single mini coax cable to each antenna may be used due to cost and space constraints. Moreover, the RF electrical signals still suffer impedance mismatches and accumulated insertion losses even on a high performance specialized RF cable depending on the cable length.

The radiohead circuit 6 may include an RF integrated circuit (IC) 2 including one or more RF transceivers (TRX) and a common RF front end (FE) 4. The RF IC 2 may receive one or more data and control signals and operate to receive a communication signal from the baseband IC and generate an RF electrical signal from the communication signal for radio transmission from the device 1 or receive an RF electrical signal and generate a communication signal from the RF electrical signal for providing to the baseband IC. The RF FE 4 may convert an RF electrical signal into a format for transmission via the antenna(s) 5 and/or convert a signal received from the antenna(s) 5 into an RF electrical signal for the RF IC.

As the number of antenna elements in a communication device increases, a radiohead circuit may include more co-located RF transceivers. However, the use of co-located RF transceivers and RF transceiver chains based on a conventional centralized radiohead circuit and antennas may present technical inefficiencies, disadvantages and/or technical problems and pose limitations on overall system performance and capabilities that are difficult to overcome.

For example, co-located RF transceivers can cause cross interference problems which may introduce design or physical constraints limiting integration. These size or physical constraints also reduce scalability potential, e.g., increase in transceiver chain footprint which limits the overall radiohead circuit performance and increases cost.

For another example, using a conventional RF coax cable to connect antennas to a radiohead circuit may result in a cable loss, e.g., in excess of 2 dB at 60 cm. The cable size and cable loss may limit system performance and/or antenna placement, and/or may increase system cost. Moreover, the cable loss may limit smart antenna applications, for example, Voltage Standing Wave Ratio (VSWR) correction and/or the like. Accordingly, various technical limitations including cross interference, power consumption limitations, thermal limitations, fanout, and/or RF circuit complexity need to be overcome to efficiently realize the integration of co-located RF transceiver chains.

Further, as the radiohead circuit and antennas are provided in different packages, packaging parasitics may have deleterious effects on the electrical designs of integrated circuits for radio frequencies. As a result, additional processing is needed to mitigate the signal degradations, thereby further increasing costs.

Further, certain combinations of radiohead circuits and antennas may be incompatible or difficult to combine. For example, RF components and antenna components may interfere with each other.

Accordingly, advanced digital Complementary Metal-Oxide-Semiconductor (CMOS) processes or different circuit layout design and arrangement may be needed to facilitate increasing numbers of RF transceiver chains.

Further, there may be a need to control each radiohead in accordance with various applications. In an example, controlling a plurality of radioheads may require from the processor to always be online without getting into a low power mode, because each of the plurality of radioheads may rely on the processing provided by the processor of the communication device.

The need to rely on the processing provided by the processor of the communication device would also make the radioheads susceptible functioning problems, especially when the communication interface between the radiohead and the processor of the communication device is not operable for a reason.

Further, the communication interface between the radioheads and the processor of the communication device may have a limited bandwidth, and it may not provide the required bandwidth for the communication between the radioheads and the processor of the communication device.

Further, various types of partitioning of the processing functions between the radioheads and the processor of the communication device may have certain difficulties.

Further, it may be needed for radioheads to provide compatibility with various common applications related to communication systems.

Further, the radiohead should be able to support certain processes which rely on the processing functions of the processor of the communication device but which are also related to the functioning of the radioheads with an acceptable latency.

Further, it may also be desired to exploit the adaptability of a plurality of radioheads by providing an acceptable controlling for controlling the plurality of radioheads.

Additionally, it may be desired to perform various operations with a plurality of radioheads and schedule each radiohead from a plurality of radioheads to perform an action independent from other radioheads.

Further, it may be desired to centralize the operations from a communication device processor, such a system-on-chip (SOC) while allowing each radiohead to perform operations independent from each other but dependent to the communication device processor.

Further, it may be desired to control a plurality of radioheads via a digital communication interface by providing digital information to provide instructions and receive feedback information, or control commands in response to the provided instructions.

Additionally, it may be desired to schedule certain tasks for a radiohead via the digital communication interface, or alternatively divide a main task to a plurality of sub tasks and control a plurality of radioheads to perform a plurality of sub tasks to achieve the main task via the communication interface.

In an example, such main task may include to perform an energy-based scan for all communication channels or a plurality of communication channels. In an example, such main task may include to perform a passive scan for all communication channels or a plurality of communication channels. In an example, such main task may include to perform an active scan for all communication channels or a plurality of communication channels.

Further, the remote nature of a radiohead may also result to a supply voltage distribution for the radiohead as well, and it may be desired to supply the electrical power and/or current and/or voltage to the radiohead efficiently.

Today, there is a need for RF circuitry that can realize high performance wireless communication, have a compact and flexible form-factor design, be cost-effective, and able to meet modular certification requirements. These demands can be met by the wireless communication devices described herein.

The present disclosure describes various aspects relating to a low-cost, low-power, compact RF transceiver arrangement with increased silicon integration while avoiding or overcoming the various technical limitations associated with integrating co-located transceiver chains and integrating co-locating RF circuit and antenna circuit. For example, in some examples, a System-in-Packages (SIP) approach is used where two or more different dies are placed into a common package either side-by-side or stacked on top of each other. By combining dies of different technology and functionalities (e.g., RF, analog, digital) into one package, SIP provides substantial performance benefits, including, eliminating or reducing packaging parasitics. For another example, the present disclosure describes various aspects facilitating the placement of RF components co-located with or near an antenna while still providing optimized system performance.

The present disclosure relates to a radiohead circuit for a distributed radiohead system, where at least a portion of the radiohead circuit is co-located with an antenna. For example, the radiohead RF circuit and antenna circuit may be coupled to each other within a common enclosure. For another example, the antenna may be integrated with the silicon into a compact radiohead circuit package. That is, the radiohead RF circuit and antenna circuit may be formed on separate silicon dies/boards that are positioned near each other. The radiohead RF circuit and antenna circuit may be coupled to each other within a common module or system package. The present disclosure describes various ways of integrating the antenna and at least a portion of the radiohead circuit. Various aspects of the present disclosure describe interconnection structures and partitioning arrangements to simplify manufacturing, reduce manufacturing costs, improve transmission and reception quality, and/or improve energy efficiency. For example, each of these improvements derived from co-locating the RF circuit and the antenna circuit can incrementally reduce manufacturing cost by $0.5-$1.5/improvement (depending on SISO vs MIMO etc.) (eliminating lengthy specialized RF cables), improve key performance indicators (KPIs), and enable new use cases and experiences in wireless communication that are impossible to realize without a distributed radiohead system. The improvements to KPIs include eliminating insertion loss of 2-4 dB to provide higher power/range, better reception sensitivity, and/or reduced current for improved battery life.

In a distributed radiohead circuit arrangement according to various aspects of the present disclosure, the transceiver chain may be divided into a time-domain processing physical (TD PHY) portion and a frequency-domain processing physical (FD PHY) portion. The TD PHY portion can be co-located with one or more antennas. The TD PHY portion and the one or more antennas may be integrated. The TD PHY portion and the FD PHY portion may be separate and remotely located. The TD PHY portion and the FD PHY portion can be connected to each other through a digital interface to communicate digitized baseband RF signals. In one example, a Serially Time-Encoded Protocol (STEP) interface (developed by Intel Corporation) may be an optical or electrical signal interface.

The TD PHY portion may contain the radiohead RF circuit, the analog-to-digital/digital-to-analog (AD/DA) converters, the up/down converters, and line conditioning or impedance matching circuit. The TD PHY portion includes an optical/electrical interface circuit. The TD PHY portion may also have circuit for operation and management processing capabilities.

The TD PHY portion may include a transmitter chain that is configured to convert a digital baseband RF signal to an RF electrical signal and amplify the RF electrical signal to the desired power level for radiation. The TD PHY portion may include a receiver chain that is configured to receive the desired band of an induced RF electrical signal from an antenna and amplify the RF electrical signal and convert it into a digital baseband RF signal.

In some devices, there may be multiple TD PHY portions. Each TD PHY portion may be connected to a respective FD PHY portion. Alternatively, one or more TD PHY portions may be connected to an FD PHY portion.

Further in some aspects of the disclosure, there may not be a clear TD/FD split. For example, a single DSP part may be implemented or included for processing a sampled RF/analog signal on a per-transceiver basis and another DSP part is implemented or included to operatively implement equalization, demodulation, and other suitable multi-chain functions.

The digital front ends (DFEs) described herein may be considered, the TD portion and the DSP part responsible for the modulation/demodulation (modem) may be considered as the FD portion.

Figure 2A:
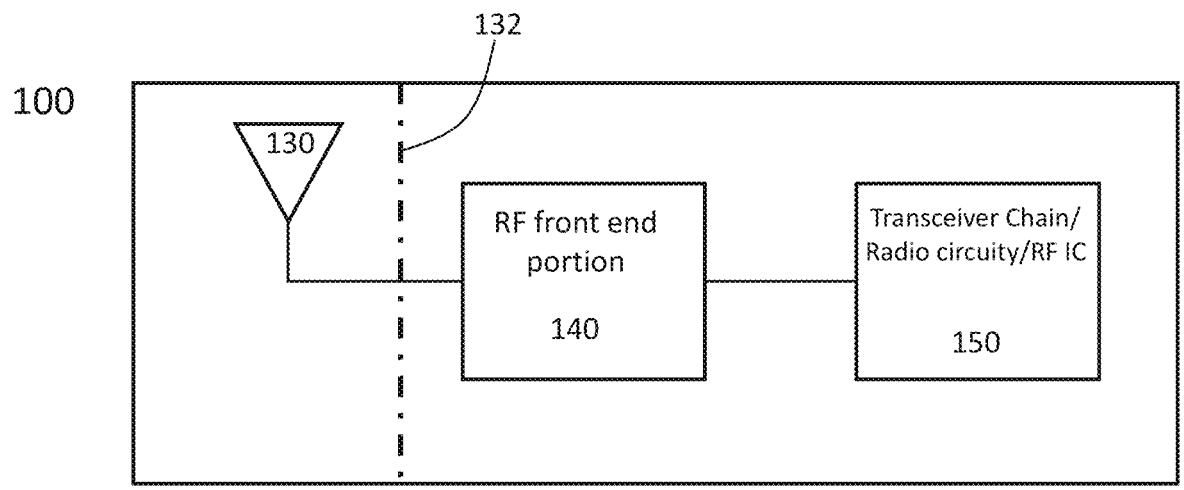

FIG. 2A illustrates a radiohead (RH) circuit 100 in accordance with various aspects of the present disclosure. The radioheads 100 of FIG. 2A, can avoid the above-noted problems. As shown, the radiohead circuit 100 includes a separate or individual transceiver chain, among other things incorporated into a compact design.

Figure 2B:
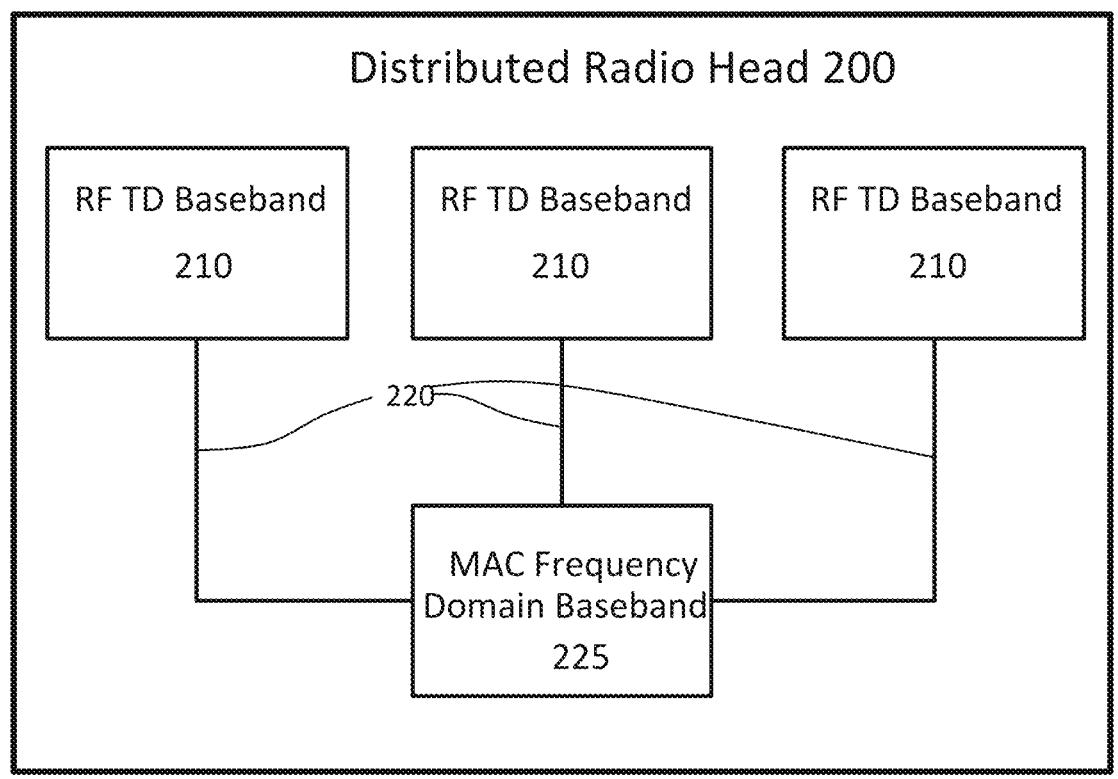

FIG. 2B shows an exemplary representation of distributed radiohead system 200. For wireless communication, the distributed radiohead system or distributed radio system may include two main aspects or functionalities, represented as RF TD Baseband 210 and MAC Frequency Domain Baseband 225.

The RF TD Baseband 210 functionalities include transmitting, receiving, filtering, and amplifying RF signals. Each RF TD Baseband 210 may be integrated, co-located, or in the proximity of a respective antenna or antenna structure. The RF TD Baseband 210 functionalities are performed in the time domain. The RF TD Baseband 210 may further include frequency locking means to accurately or precisely generate analog signals at a desired frequency.

In addition, the RF TD Baseband 210 can perform analog-to-digital and digital-to-analog conversions and up/down conversions. Up/down conversion includes shifting the frequency of a signal between from baseband (low frequencies) to RF (high frequencies) or vice versa. The RF TD Baseband 210 can transform a digital signal into an analog signal or produce a digital signal from an analog signal. As such, the RF TD Baseband 210 can include a digital interface.

Each of the RF TD Baseband 210 may be integrated with an antenna and independently distributed. The individual nature of each RF TD Baseband 210 can allow for easy modular certification approval.

The second main functional aspect of the distributed radiohead system 200 is provided by the MAC Frequency Domain Baseband 225. The MAC Frequency Domain Baseband 225 is responsible for controlling the flow of signals the transmission medium and provide radio controls. The provided radio controls can include modulation/demodulation and encoding/decoding of signals. The signal processing performed by the MAC Frequency Domain Baseband 225 can be done in the frequency domain. For example, the MAC Frequency Domain Baseband 225 can perform FD processing based on a combination of two or more receive signals from the RF TD Basebands 210 as well generate two or more transmit signals for the two or more RF TD Basebands 210.

In the distributed radiohead system 200, the MAC Frequency Domain Baseband 225 is physically separated from the RF TD Baseband 210 or is located on a platform physically separate from the RF TD Basebands 210. The digital signals between the RF TD Baseband 210 and the MAC Frequency Domain 225 can be transmitted by means of a digital interface or digital links 220. The signals between the RF TD Baseband 210 and the MAC Frequency Domain 225 may be in a phase alignment but not necessarily in frequency alignment with each other.

The radiohead 100 or radiohead circuit 100 may form part of radio or radio system, such a distributed radio system (DRS). A DRS generally can include a plurality or large number of antennas (or radioheads) distributed widely across a large coverage area and connected to an access point. A DRS implemented with the radiohead circuits 100 can have or implement several enhanced functionalities as well as performance capabilities with respect to wireless communications. This includes MIMO, digital beamforming, and multi-band operation. Further, a DRS implemented with the radiohead circuits 100 can realize higher robustness due to redundancy and flexibility of data reception and transmission, provide higher data transfer rates, have lower latencies, and provide an increased bandwidth. Further, the DRS can more easily be expanded or upscaled with additional radiohead circuits 100.

The increased bandwidth that may be provided by the distributed radio system is of key importance for applications that require the exchange of large quantities of data. The low latency ensured by the DRS and the radiohead circuit 100 can open the way for implementations in time-sensitive or time-critical scenarios, which require fast and reliable responses, such as the control of self-driving vehicles, the execution of medical procedures, or the realization of industrial processes.

Figure 3:
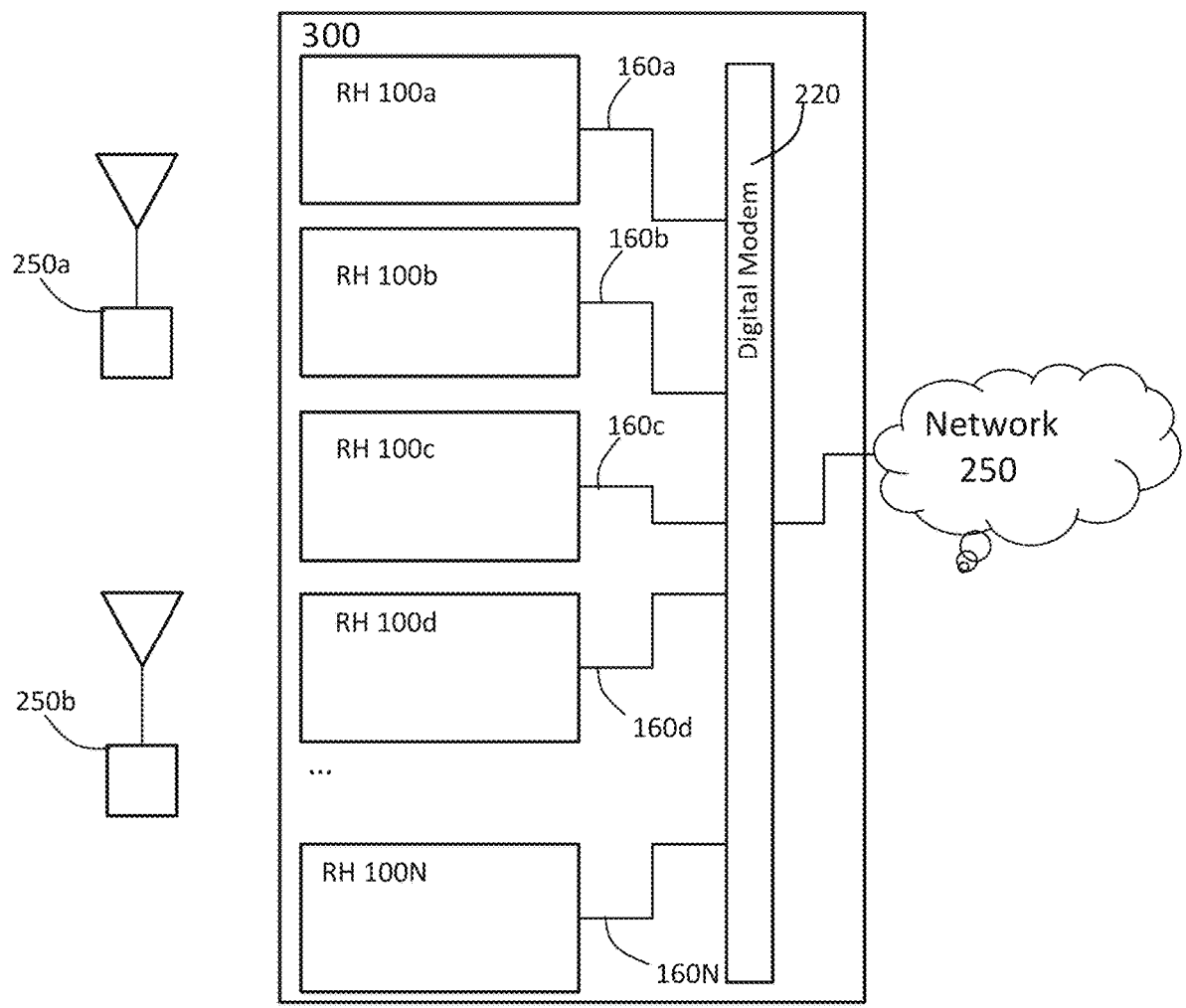

In the example of FIG. 3, wireless communication device 300 includes a plurality of radiohead circuits 100 (e.g., radiohead circuits 100*a*-100N, also collectively radiohead circuits 100) which are each coupled to a modem 220, which may also be a system-on-chip (SoC). The modem 220 may include a digital interface (e.g., a digital baseband interface) for communicating with the radiohead circuits 100. The communication device 300 can include a distribution of separate or independent radiohead circuits 100*a*-N, where N can be used to represent any suitable number of radiohead circuits. In other words, at least some of the radioheads 100 may be non-collocated. The radiohead circuits 100 enable wireless communication using modulated electromagnetic radiation through a non-solid medium. The communication device 300 may be configured to implement or may be considered as a Distributed Radio System (DRS) or distributed radiohead system.

As shown in the example of FIG. 3, the DRS architecture of communication device 300 can support the connection of multiple radioheads 100, e.g., more than two radioheads, to a single modem or modem 220, and can include dynamic selection of active radioheads. This capability may be valuable, for example, for "transformer" and/or "detachable" form-factors, where at a first system configuration it may be better to have antennas at a first location, and at a second system configuration, e.g., different from the first system configuration, it may be better to have the antennas at a different location.

The communication device 300 can support high order MIMO (Multiple Input Multiple Output) systems, for example, by adding more radioheads 100 as needed and connecting such radioheads 100 to the modem 220, which can create a distributed system rather than prevalent collocated radio system. The DRS scheme implemented by the communication device 300 may support improved thermal and RF interference, for example, as the radioheads 230 may be separated and/or remote, which may allow more flexibility and/or ease in multi-antenna MIMO systems, e.g., 4×4 MIMO and 8×8 MIMO systems.

The wireless communication device 300 implemented as DRS, can be used in several contexts, including, without limitation, 5G, Next Generation Wifi. In addition, the DRS may also be used in automotive contexts, including for self-driving cars and vehicle networks (e.g., V2X).

Referring back to FIG. 2A, an individual integrated radiohead (RH) or radiohead circuit 100, may include at least one antenna or antenna structure 130. The dashed line 132 indicates that the antenna may be connected or part of the radiohead 100 by a connection means, such as a detachable connector. In other cases, the antenna may be integrated within the radiohead 100 by other means.

The radiohead circuit 100 includes a RF front end or RF front end portion 140 and a transceiver chain or radio circuit or radio circuit portion 150.

The radiohead 100 can have a compact design by integrating various of its components on a single platform, e.g., die or structure. More cost savings can be realized by the reduction or elimination of cable connections (e.g., coax cables). This advantageously can help realize a lower bill of materials cost, a reduction in production costs, and thus allowing for more lower cost devices.

In addition to physical costs, elimination or reduction of physical components (e.g., cables and cable connections) in the radioheads 100 can provide power savings. These power savings or lower energy consumption further leads to an increase in the life time of the components, a longer battery life, and overall lower operational and maintenance costs.

In the example of FIG. 2A, the radiohead circuit 100 may include collocation of the antenna 130, the RF front end portion 140, and the transceiver chain 150. In other words, the antenna 130, the RF front end 140, and the transceiver chain/radio circuit 150 may be placed or integrated together to create the radiohead 100. The RF front end 140 and the radio circuit 150 or transceiver (TRx) chain, (e.g. a 1×1 TRx chain) can be configured with components and/or logic to transmit an RF transmit signal via the antenna 130, and/or to receive an RF receive signal via the antenna 130. The integrated radiohead circuit 100 can be configured for concurrent operation over a plurality of wireless communication frequency bands. For example, the radiohead 100 may be configured to communicate over a first frequency band, e.g., the 2.4 GHZ band, and to communicate over a second frequency band, e.g., the 5 GHZ and/or 6-7 GHz bands.

As shown, for each radiohead 100, the antenna 130 is coupled to the RF front end 140, and the RF front end 140 is coupled to the radio circuit 150 or transceiver (TRx) chain. The RF front 140 may be configured to amplify signals received from or provided to the antenna 130 and can support the radiohead 100 operating in a transmit and in a receive mode. In some aspects, the RF front end 140 may include a transmit/receive switch to switch between transmit mode and receive mode operations. The radiohead 100 can include in some cases a separate receive signal path and transmit signal path. The RF front end 140 may include RF components such as, but not limited to, a power amplifier (PA), a low-noise amplifier (LNA), switches, etc.

Figure 4:
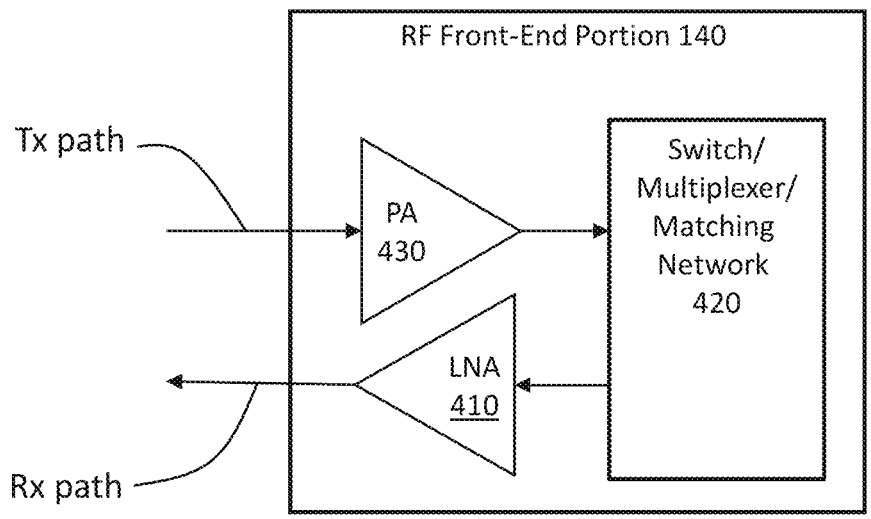

FIG. 4 shows an RF front end portion 140 that may be implemented in the radiohead circuit 100. A receive signal path (Rx path) of the RF front end 140 of FIG. 4 includes an LNA (low noise amplifier) 410 for amplifying received RF signals and provides the amplified received RF signals as an output. A transmit signal path (Tx path) of the RF front end 140 of FIG. 4 includes a PA (power amplifier) 430 for amplifying input RF signals. One or more filters may be included for generating suitable RF signals for transmission and reception. In addition, the RF front ends 140 of FIG. 4 may include other components 420 or circuit, such as, for example, a tuner or matching network, switches, multiplexers, and/or other circuit for coupling the RF front end 140 to the antenna 130. In addition, other components may be included to support both transmit and receive modes.

The RF front end 140 may include a millimeter wave and/or one or more sub-millimeter wave radio frequency integrated circuits (RFICs). In some implementations, the one or more sub-millimeter wave RFICs may be physically separated from the millimeter wave RFICs.

The RF front end 140 of at least FIG. 2A can provide signals obtained from the antenna 100 to the transceiver chain/radio circuit 150. The transceiver chain or radio circuit 150 can interface between the RF front end 140 and one or more other components. In the communication device 300 of FIG. 3, each radiohead circuit 100 may interface with the modem 220 to enable or facilitate the wireless communication.

Figure 5:
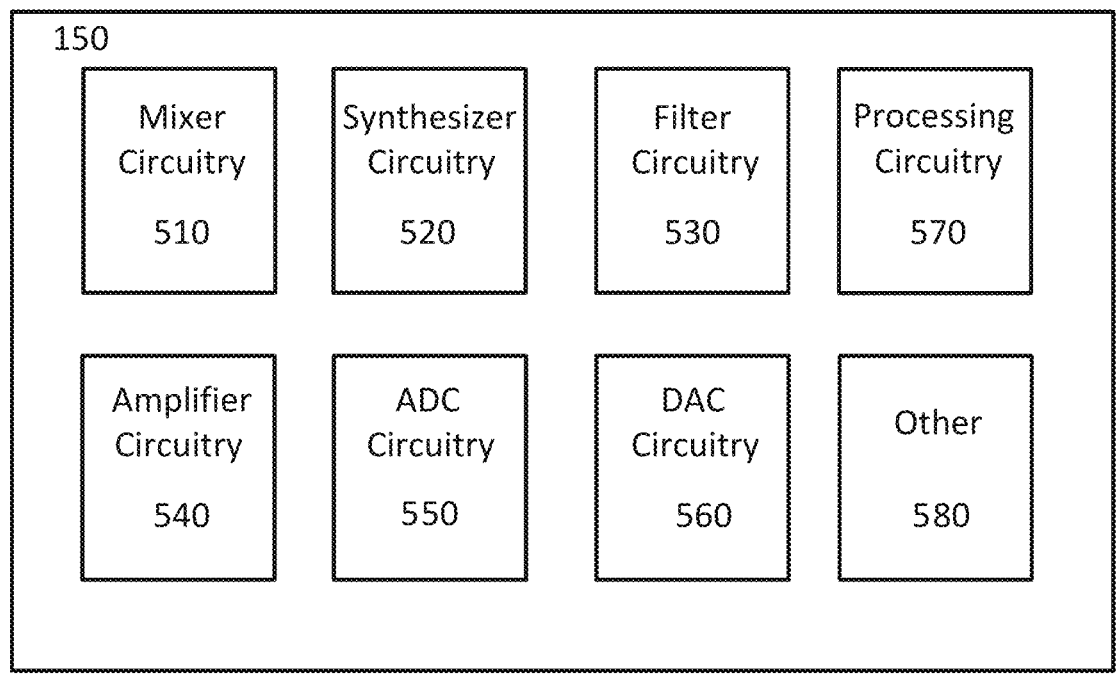
FIG. 5 shows an example of a radio circuit or transceiver circuit.

FIG. 5 shows one example of the radio circuit or transceiver circuit 150. As shown, the transceiver chain/radio circuit can include components such as a mixer circuit 510, synthesizer circuit 520 (e.g., local oscillator), filter circuit 530 (e.g., baseband filter), amplifier circuit 540, analog-to-digital converter (ADC) circuit 550, digital-to-analog (DAC) circuit 560, processing circuit 570, and other suitable digital front end (DFE) components 580, to name a few. The processing circuit may include a processor, such as a time-domain and/or frequency domain processor(s)/components in at least one example.

The other components 580 may include logic components, modulation/demodulation elements, and an interface circuit for interfacing with another component, e.g., a SoC, or the modem 220 in the example of FIG. 3. In at least one example, such an interface may be a digital interface, such as, e.g., a Common Public Radio Interface (CPRI).

DFE (digital front end) components may include any suitable number and/or type of components configured to perform functions known to be associated with digital front ends. This may include digital processing circuit, portions of processing circuitry, one or more portions of an on-board chip having dedicated digital front end functionality (e.g., a digital signal processor), etc. The DFE components may selectively perform specific functions based upon the operating mode of the radiohead circuit 100 and, for example, may facilitate beamforming. Digital front end components may also include other components associated with data transmission such as, for instance, transmitter impairment correction such as LO correction, DC offset correction, IQ imbalance correction, and ADC skew, digital pre-distortion (DPD) calculation, correction factor (CF) calculation, and pre-emphasis (pre. emp.) calculation. To provide additional examples, the digital front end components may facilitate or perform receiver or transmitter digital gain control (DGC), up-sampling, down-sampling, zero crossing detection algorithms, phase modulation, perform beam management, digital blocker cancellation, received signal strength indicator (RSSI) measurements, DPD and calibration accelerators, test signal generation, etc.

In at least one example, the transceiver chain 150 can include a receive signal path which may include mixer circuit 510, amplifier circuit 540 and filter circuit 530. In some aspects, the transmit signal path of the transceiver chain 150 may include filter circuit 530 and mixer circuit 510. The transceiver chain 150 may also include synthesizer circuit 520 for synthesizing a frequency signal for use by the mixer circuit 510 of the receive signal path and the transmit signal path. In some aspects, the mixer circuit 510 of the receive signal path may be configured to down-convert RF signals received from the RF front end 140 based on the synthesized frequency provided by synthesizer circuit 520.

In some aspects, the output baseband signals and the input baseband signals may be digital baseband signals. In such aspects, the radio circuit 150 may include analog-to-digital converter (ADC) 550 and digital-to-analog converter (DAC) circuit 560.

In at least one example, the transceiver chain 150 may also include a transmit signal path (Tx path) which may include circuit to up-convert baseband signals provided by the modem 220 and provide RF output signals to the RF front end 140 for transmission. In some aspects, the receive signal path of the radio circuit 150 may include mixer circuit 510, amplifier circuit 540 and filter circuit 530. In some aspects, the transmit signal path of the radio circuit 150 may include filter circuit 530 and mixer circuit 510. The radio circuit 150 may include synthesizer circuit 520 for synthesizing a frequency signal for use by the mixer circuit 510 of the receive signal path and the transmit signal path. The mixer circuit 510 of the receive signal path may be configured to down-convert RF signals received from the RF front end 140 based on the synthesized frequency provided by synthesizer circuit 520.

In various aspects, amplifier circuit 540 may be configured to amplify the down-converted signals and filter circuit may be a low-pass filter (LPF) or band-pass filter (BPF) configured to remove unwanted signals from the down-converted signals to generate output baseband signals. Output baseband signals may be provided to another component, e.g., a modem 220, for further processing. In some aspects, the output baseband signals may be zero-frequency baseband signals, although this is not a requirement.

The mixer circuit 510 for a receive signal path may include passive mixers, although the scope of this disclosure is not limited in this respect. In some aspects, the mixer circuit 510 for a transmit signal path may be configured to up-convert input baseband signals based on the synthesized frequency provided by the synthesizer circuit 520 to generate RF output signals for the RF front end 140. The modem 120 may provide the baseband signals and the filter circuit 540 may filter the baseband signals.

In some aspects, the mixer circuit 510 of the receive signal path and the mixer circuit 510 of the transmit signal path may include two or more mixers and may be arranged for quadrature down conversion and up conversion, respectively. In some aspects, the mixer circuit 510 of the receive signal path and the mixer circuit 510 of the transmit signal path may include two or more mixers and may be arranged for image rejection (e.g., Hartley image rejection). In some aspects, the mixer circuit 510 of the receive signal path and the mixer circuit 510 may be arranged for direct down conversion and direct up conversion, respectively. In some aspects, the mixer circuit 510 of the receive signal path and the mixer circuit 510 of the transmit signal path may be configured for super-heterodyne operation.

In some dual-mode aspects, a separate radio IC circuit may be provided for processing signals for each spectrum, although the scope of this disclosure is not limited in this respect.

In some aspects, the synthesizer circuit 520 may be a fractional-N synthesizer or a fractional N/N+1 synthesizer, although the scope of the aspects is not limited in this respect as other types of frequency synthesizers may be suitable. For example, synthesizer circuit 520 may be a delta-sigma synthesizer, a frequency multiplier, or a synthesizer including a phase-locked loop with a frequency divider.

The synthesizer circuit 520 may be configured to synthesize an output frequency for use by the mixer circuit 510 of the radio circuit 150 based on a frequency input and a divider control input. In some aspects, the synthesizer circuit 520 may be a fractional N/N+1 synthesizer.

In some aspects, frequency input may be provided by a voltage-controlled oscillator (VCO), although that is not a requirement. In various aspects, divider control input may be provided by a processing component of the radio circuit 150, or may be provided by any suitable component, such as an external component like the modem 220 in the case of FIG. 3. For example, the modem 220 may provide a divider control input depending on the desired output frequency. In some aspects, a divider control input (e.g., N) may be determined from a look-up table based on a channel indicated by external component.

In some aspects, synthesizer circuit 520 of the radio circuit 150 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some aspects, the DLL may include a set of cascaded, tunable, delay elements, a phase detector, a charge pump and a D-type flip-flop. The delay elements may be configured to break a VCO period up into No equal packets of phase, where Nd is the number of delay elements in the delay line. In this way, the DLL provides negative feedback to help ensure that the total delay through the delay line is one VCO cycle.

In some aspects, synthesizer circuit 520 may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuit to generate multiple signals at the carrier frequency with multiple different phases with respect to each other. In some aspects, the output frequency may be a LO frequency (fLO). In some aspects, the RF circuit 506 may include an IQ/polar converter.

While the transceivers described herein include traditional super-heterodyning schemes or architectures, other type of transceiver or transmitter architectures and schemes may be used. In some aspects, the transceiver chain 150 may include components so as to implement a near zero IF scheme, a Direct Conversion scheme, or a digital transmission schemes, such as, for example, a Digital IQ transmission, a Digital Polar transmission, and the like.

In one example, the transceiver chain 150 may include a transmit path that includes or implements a direct digital transmitter (DDT). That is, in one simple example, a DDT may include a digital signal processor, a RF digital-to-analog converter (RFDAC), a RF filter/antenna coupler. Further, a DDT may be implemented with or without an IQ-mixer. In general, a RF-DAC may be included on a RFIC to convert digital input into a RF signal. A DDT may include other digital components such as numerically controlled oscillator (NCO) and digital mixers for shifting an input signal to desired frequency.

The use of a DDT can reduce the number of analog components needed in the transmitter or transmit path. For example, an analog LOs, analog filters, analog mixers, and etc., may be eliminated from the RFIC when a direct digital transmitter such as DDT is employed. Further, the use of a digital transmitter or digital transmission schemes such may bring energy savings and efficiencies.

Figure 6:
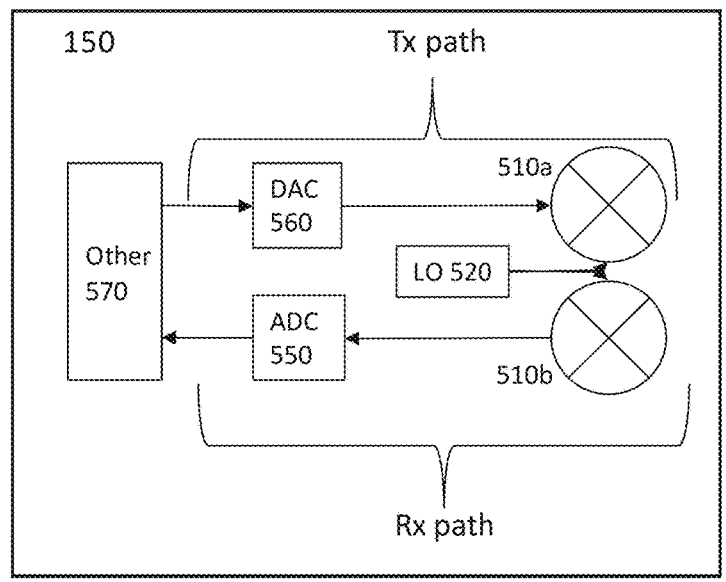
FIG. 6 shows an example of a transceiver chain/radio circuit.

FIG. 6 shows one example of a transceiver chain/radio circuit 150 that may be implemented in the radiohead circuit 100. The receive signal path (Rx path) circuit down-converts RF signals received from the RF front end 140 and provides baseband signals. Specifically, the receive signal path may include a mixer 510*b* and an ADC 550. The transmit signal path (Tx path) circuitry up-converts baseband signals provided by, e.g., a modem 220 and provides RF output signals to the RF front end 140 for transmission. Specifically, the transmit signal path may include a DAC 560 and a mixer 510*a*. The transceiver chain shown in FIG. 6 includes a synthesizer circuit, specifically, at least one local oscillator (LO) 520 to generate reference signals for the mixers 510*a* and 510*b*.

The antenna 130 for each radiohead circuit 100 may include a single antenna for transmission and reception. In other cases, the antenna or antenna structure 130 may include multiple transmit antennas in the form of a transmit antenna array and multiple receive antennas in the form of a receive antenna array.

In other cases, the antenna 130 may be one or more antennas to be used as transmit and receive antennas. In such cases, the RF front end 140 may include, for example, a duplexer, to separate transmitted signals from received signals. For example, as shown in FIG. 7, the antenna or antenna structure 230 may include an RF antenna connector 135 that interfaces between the radiator of the antenna 230 and the RF front end. Further, FIG. 7 shows a multiple antenna feed (e.g., 231*a*, 231*b*, . . . 231N) from the RF antenna connector 135 to the antenna radiator.

Referring back to FIG. 3, the modem 220 (or SoC) may include components, for receiving signals (e.g., digital baseband signals) from each of the radiohead circuits. In at least one example, the modem 220 may include, or may be implemented, partially or entirely, by circuit and/or logic, e.g., one or more processors including circuit and/or logic, memory circuit and/or logic, Media-Access Control (MAC) circuit and/or logic, Physical Layer (PHY) circuit and/or logic, baseband (BB) circuit and/or logic, a BB processor, a BB memory, Application Processor (AP) circuit and/or logic, an AP processor, an AP memory, and/or any other circuit and/or logic. For example, the modem 220 can perform baseband processing on the digital baseband to recover data included in wireless data transmissions. The modem 220, for example may include processor circuit for controlling and/or arbitrating transmit and/or receive functions of the radiohead circuit 100, performing one or more baseband processing functions (e.g., media access control (MAC), encoding/decoding, modulation/demodulation, data symbol mapping, error correction, etc.). In one or more aspects, the modem may include one or more processors to perform PHY frequency domain (FD) and/or PHY time domain (TD) processing, e.g., of signals.

In aspects, functions of the modem 220 can be implemented in software and/or firmware executing on one or more suitable programmable processors, and may be implemented, for example, in a field programmable gate array (FPGA), application specific integrated circuit (ASIC), etc.

In one example, the modem 220 may include a processor configured to generate a message, for example, in the form of a frame, field, information element and/or protocol data unit, for example, a MAC Protocol Data Unit (MPDU); and/or configured to convert the message into a PHY Protocol Data Unit (PPDU), e.g., a PHY Layer Convergence Procedure (PLCP) PDU, for example, by processing the message generated, e.g., by encoding the message, modulating the message and/or performing any other additional or alternative processing of the message. In other aspects, a processor of the modem 220 may be configured to perform any other additional or alternative functionality and/or may include any other additional or alternative components to generate and/or process a message to be transmitted.

As described before, the modem 220 as shown in FIG. 3 may be coupled to each respective radiohead circuit 100a-N via any suitable type of communication link or links (160a-160N). In at least one aspect, the communications links 160a-160N are digital links. The use of digital links can reduce expenses by eliminating the need for cable and connectors while performance can also be improved. Cables and connectors can add cost to designs and can impose physical design constraints in devices. The use of digital links or a digital link interface between the modem 220 and one or more radiohead circuits 100 can facilitate high data transfer rates. That is, the digital links 160a-160N may include a high speed digital I/O, e.g., a STEP interface or any other interface. The cable or link for the digital links 160a-160N may be much less sensitive to length, e.g., cost and performance wise, and, accordingly, the radioheads 100 may be placed at practically any distance from the modem 220, for example, at lower cost. Further of importance is that the use or inclusion of a digital signal and control interface to the radiohead allows fulfillment of a key requirement for modular regulatory certification.

In some cases, the modem 220 and the radioheads 100 of the communication device 300 may be placed closed together or integrated compactly. This may be necessary to optimize performance for certain classes of devices, such as IoT 4.0 type devices.

In some cases, as shown in FIG. 3, the modem 220 may communicate with a network 250, such as, a core network. Further, as shown, the communication device 300 can wireless communicate with the nodes 250 (e.g., nodes 250a and 250b) which may be an access point, base station, or the like.

FIG. 8 illustrates a block diagram of an exemplary device or system in accordance with an aspect of the disclosure. The components of the device 800 are provided for ease of explanation, and in other cases, the device 800 can include additional, less, or alternative components as those shown in FIG. 8.

As shown in the example of FIG. 8, the device 800 can include processing circuit 810, a memory 820, and can include a communication device, such as the communication device 300, including a plurality of radiohead circuits 100, e.g., radiohead circuits such as radiohead circuit 100 having integrated transceiver chain/radio circuit 150, RF front end 140, antenna(s) 130. As explained, the communication device 300 can implement or support a DRS. The device 800 can also include a modem or SoC connected to the radiohead circuits. For example, device 800 may include one or more power sources, display interfaces, peripheral devices, ports (e.g., input, output), etc.

The device 800 may be used for products involving 5G, Wifi, BT, UWB, or any suitable wireless network products. The device 800 may also be used for any device supporting data-intensive applications, including streaming video (e.g., 4K, 8K video) or augmented/virtual reality (ARNR) devices. The device 800 may also be used for vehicles, e.g., to help support a self-driving car and/or to be used as vehicle network. For example, the device 800 may be used for Vehicle-to-everything (V2X) which includes vehicle-to-vehicle (V2V) and vehicle-to-infrastructure (V2I). The global automotive V2X market size is expected to reach USD 10,318.3 Million by 2027.

The processing circuit 810 may include any suitable number and/or type of computer processors, such as, for facilitating control of the device/system 800. In some cases, the processing circuit 810 may include a baseband processor (or suitable portions thereof) implemented by the device 800. In other cases, the processing circuit 800 may be one or more processors that are separate from the baseband processor (e.g., one or more digital signal processors. Additionally, or alternatively, other examples may include various functions discussed herein by the processing circuit 800.

The processing circuit 810 may be configured to carry out instructions to perform arithmetical, logical, and/or input/output (I/O) operations, and/or to control the operation of one or more components of the device. For example, the processing circuit 810 can include one or more microprocessors, memory registers, buffers, clocks, etc. Moreover, aspects include processing circuit 810 communicating with and/or controlling functions associated with the memory 820 and/or functions of the radio.

The memory 820 may store data and/or instructions such that, when the instructions are executed by the processing circuit 810, the processing circuit 810 performs the various functions described herein. The memory 820 may be implemented as a non-transitory computer-readable medium storing one or more executable instructions such as, for example, logic, algorithms, code, etc. Instructions, logic, code, etc., stored in the memory 820 may enable the aspects disclosed herein to be functionally realized.

In various aspects, the device 800 may be implemented as any suitable type of device configured to transmit and/or receive wireless signals in accordance with any suitable number and/or type of communication protocols. Further, the device 800 may be implemented as a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet-of-Things (IoT) device, a wearable device, a handheld device an off-board device, a hybrid device, a vehicular device, a non-vehicular device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like. In other examples, the device 800 may be implemented as an access point or base station. The device 800 may implement one or more aspects as described herein to facilitate transmitting wireless signals in accordance with a particular frequency or band of frequencies, such as mm-wave frequencies, for example, as further described herein. The prolonged lifetime (e.g., the extended battery life) that is associated with the reduced power consumption, in combination with the high data rate, make the radiohead circuits 100 particularly attractive for portable devices (e.g., smartphones, tablets, laptops) and also for installation in electrical vehicles (e.g., self-driving cars or remotely controllable drones).

The radioheads 100 provide flexibility in terms of antennas to be implemented with vendor specific antennas. For example, this flexibility can be advantageous for cases where the wireless devices 800 are being made for with a large number different types of laptops, which each can include different constraints on antenna design and antenna placement.

In other cases, other devices may have form-factor constraints that are suitable for radioheads 100 or the communication device 300 including such radioheads. For example, the antenna area of some PCs can more design, physical, and other constraints than even smartphones, such as PCs having 5 mm think display side. By contrast current smartphones are rarely thinner than 7 mm. As such, the use of the communication device 300 with the flexibility of radioheads 100 in terms of scalability and placement location is advantageous to work with such PC constraints.

In wireless communication, it is common to support multiple communication channels to be able to convey information using different communication channels. Each communication channel has a certain capacity in terms of bandwidth or data rate, and as the traffic of the communication channel increases, the wireless communication devices which use the communication channel may face bandwidth or interference problems.

Further, due to the nature of the wireless communication, the wireless communication channels may be arranged to be close to each other, therefore a wireless communication channel may be affected by the traffic of other wireless communication channels, especially from the traffic of the neighboring wireless communication channels. Generally, at least a part of the spectrum of the neighboring wireless communication channels may interfere with the wireless communication channel and the traffic of the neighboring wireless communication channels may occupy a portion of the bandwidth of the wireless communication channel.

Additionally, it may be desired to have some activity for a wireless communication channel, especially for the wireless communication devices which are looking for the access points which may provide wireless communication for the wireless communication devices. An activity in a predefined wireless communication channel generally implies a presence of an access point, which the wireless communication device may receive wireless communication services through the access point. Accordingly, it may be desired for the wireless communication devices to have a means to detect the activity of a wireless communication channel.

FIG. 9 shows schematically an example of a wireless communication environment. In the wireless communication environment, there may be a plurality of wireless communication devices 901, and a plurality of wireless access points 902. Each of the entities may be in communication with each other via a wireless communication channel. In an example, each of the plurality of wireless access points 902 occupy one of the available wireless communication channels in order to provide communication services to the wireless communication devices 901. Accordingly, each of the wireless communication devices 901 may be transmitting or receiving signals to one of the wireless access points 902 at the wireless communication channel which the wireless access points 902 provide their services.

In an example, each of the wireless communication devices 901 may include a plurality of transceivers in order to receive and/or transmit wireless communication signals over the plurality of wireless communication channels. There may also be other devices that may emit signals at the frequency band of the wireless communication channel, which may increase the interference, or occupy at least a portion of the bandwidth of the wireless communication channel.

FIG. 10 shows schematically an example of a representation of the wireless communication channels in accordance with certain aspects. The representation refers to 2.4 GHz band of the 802.11 wireless communication standard. There are thirteen wireless communication channels for the 2.4 GHz band, which are available for data communication, and each wireless communication channel occupies multiple neighboring wireless communication channels.

Accordingly, especially for non-MIMO systems, it is generally preferred to use the wireless communication channel 1 1001, the wireless communication channel 6 1002, and the wireless communication channel 11 1003, in order to have minimum interference between the wireless communication channels, as the interference between these wireless communication channels 1001, 1002, 1003, is minimum. The wireless communication channel 14 1004 stands further to the wireless communication channels that are used for data communication and it may be used for the carrier frequency.

FIG. 11 shows schematically an example of a representation of a wireless communication environment. Another consideration with respect to the energy levels of the wireless communication channels may be the distance and the location of the wireless access points 1101, 1102, 1103 relative to the wireless communication devices 1104, 1105, 1106. In an example, the first wireless access point 1101, the second wireless access point 1102, and the third wireless access point 1103 may be communicating at the same wireless communication channel.

A first communication device 1104 which is in the coverage of the second wireless access point 1102 and the third wireless access point 1103, may not receive a considerable interference from the channel traffic of the first wireless access point 1101 much, as the wireless communication signals of the first wireless access point 1101 may not reach to the first communication device 1104. Similarly, a second communication device 1105, which is in the coverage of the first wireless access point 1101 and the third wireless access point 1103, may not receive a considerable interference from the channel traffic of the second wireless access point 1102.

A third communication device 1106, which is in the coverage of all of the wireless access points 1101, 1102, 1103 may receive interference from the channel traffic of all of the wireless access points 1101, 1102, 1103. It is right that this may affect the bandwidth due to the interference, however accordingly, the third communication device 1106 may also detect the presence of all of the wireless access points 1101, 1102, 1103, and the third communication device may use all of the wireless access points 1101, 1102, 1103.

FIG. 12 shows schematically an example of a radiohead in accordance with various aspects of this disclosure. The radiohead 1201 may include an antenna interface 1202. The antenna interface 1202 is coupled to an antenna 1203. The radiohead 1201 further includes a radio frequency front end 1204. In this example, the radio frequency front end 1204 is coupled to one or more processors 1205. In an example, the radio frequency front end 1204 may be coupled to a transceiver chain 1206 in between which includes the one or more processors 1205.

The radiohead 1201 receives a wireless communication signal via the antenna 1203. The antenna 1203 provides the wireless communication signal to the antenna interface 1202. The antenna interface 1202 receives the wireless communication signal from the antenna 1203 and provides the wireless communication signal to the radio frequency front end 1204. In an example, the radio frequency front end 1204 may provide the signal to the transceiver chain 1206.

The transceiver chain 1206 may include a down-converter to down-convert the signal. In an example, the transceiver chain 1206 may include a signal converter to convert the wireless communication signal to a digital signal. In an example, the signal converter may provide the wireless communication signal which is converted to the digital signal to the one or more processors 1205. In an example, the signal converter includes an analog-to-digital converter.

In an example, the one or more processors 1205 may include at least one TD PHY processing functions. In an example, the one or more processors 1205 may perform the at least one TD PHY processing functions, and provide its output to one or more external processors external to the radiohead 1201 for at least one FD PHY processing functions. In an example, the one or more processors 1205 may perform at least one of PHY processing functions, and the one or more processors 1205 may provide its output to one or more external processors external to the radiohead 1201 for at least one MAC processing functions.

In an example, the one or more processors 1205 are coupled to a communication interface 1207. In an example, the communication interface 1207 couples the one or more processors 1205, to the one or more external processors external to the radiohead 1201. In an example, the one or more external processors external to the radiohead 1201 may include one or more communication device processors of the communication device which the radiohead 1201 is coupled to.

In an example, the communication interface 1207 may include a digital interface. In an example, the communication interface 1207 includes a serial digital interface. In an example, the communication interface 1207 may include a serial time encoded protocol (STEP) interface. In an example, the radiohead 1201 may include one or more processors 1205 to control the communication interface 1207. In an example, the one or more processors 1205 to control the communication interface 1207 include a communication interface module 1208.

In an example, the communication interface 1207 may provide communication between the radiohead 1201 and the one or more communication device processors. In an example, the communication interface module 1208 controls the communication for the radiohead 1201. In an example, the communication interface module 1208 may control the communication interface 1207 based on instructions received from the one or more processors 1205. In an example, the one or more processors 1205 may include the communication interface module 1208.

Accordingly, the one or more processors 1205 may perform at least one processing function in accordance with various aspects of this disclosure, and provide the output signal to the communication interface 1207 to be provided to the one or more communication device processors for further processing of the output signal of the one or more processors 1205. In an example, the output signal of the one or more processors 1205 may include a baseband signal, and the one or more communication device processors may perform one or more processing functions for the baseband signal. In an example, the output signal of the one or more processors 1205 may include a data frame, and the one or more communication device processors may perform one or more processing functions for the data frame.

In an example, the one or more processors 1205 may receive a channel scan information from the communication interface 1207. In an example, the one or more radiohead external processors external to the radiohead 1201 may send the channel scan information to the one or more processors 1205 via the communication interface 1207. In an example, the one or more communication device processors may send the channel scan information to the one or more processors 1205 via the communication interface 1207.

In an example, the channel scan information may include an information related to a target wireless communication channel to be scanned. In an example, the target wireless communication channel may include a plurality of wireless communication channels. In an example, the one or more processors 1205 may receive the channel scan information and select the at least one target wireless communication channel based on the information related to the target channel in the channel scan information.

FIG. 13 shows schematically an example of an information table which a channel scan information may include in accordance with various aspects of this disclosure. In an example, the information related to the at least one target wireless communication channel includes an identifier 1301, 1304 for the at least one target wireless communication channel to identify the at least one target wireless communication channel. In an example, the identifier 1301, 1304 for each of the at least one target wireless communication channel may include an indication for the identification of the at least one target wireless communication channel, such as channel 1 1301. In an example, the identifier 1301, 1304 for each of the at least one target wireless communication channel may include channel frequency information 1304, or a channel band identifier 1301, 1304.

In an example, the channel scan information may include a schedule information 1302, 1303 for the energy scan to be performed. In an example, the schedule information 1302, 1303 may relate to a time period to perform the energy scan for detecting an activity of the at least one target wireless communication channel. In an example, the schedule information 1302, 1303 may include a time information indicating the time to perform the energy scan 1302.

In an example, the time information indicating the time to perform the energy scan 1302 may refer to an absolute time. In an example, the time information may refer to a time relative to an event. In an example, the event may be the receiving of the channel scan information, performing a scan, receiving and or transmitting a wireless communication signal, and such. In an example, the time information may refer to a repeating event, as in repeat every 500 ms.

In an example, the schedule information 1302, 1303 may include a time information indicating a duration of the energy scan to be performed 1303. In an example, the time information indicating the duration of the energy scan to be performed 1303 for at least one target wireless communication channel. In an example, the time information indicating the duration of the energy scan to be performed 1303 may include a range.

In an example, the channel scan information may include an information related to how the energy scan should be performed. In an example, the channel scan information may include a threshold information 1305 which refers to the threshold level to be used for the energy scan. In an example, the threshold information 1305 may refer to a dB or dBm metric.

Referring back to FIG. 12, in an example, the radiohead 1201 may perform an energy scan for detecting an activity of a wireless communication channel. In an example, the radiohead 1201 may perform the energy scan for detecting the activity of the wireless communication channel based on the channel scan information. In an example, the radiohead 1201 may include an energy scanning circuit or an energy scanning module 1209 to perform the energy scan for detecting an activity of the wireless communication channel.

In an example, the energy scanning module 1209 may receive the wireless communication signal which the radio frequency front end 1204 provides to the transceiver 1206. In an example, the energy scanning module 1209 receives the digital signal which the signal converter of the transceiver 1206 provides. In an example, the one or more processors 1205 include the energy scanning module 1209. In an example, the energy scanning module 1209 may include an energy detector circuit and/or an accumulator to detect the activity of a wireless communication channel.

The energy scanning module 1209 receives the signal and performs an energy scan to detect an activity of a wireless communication channel. In an example, the energy scanning module 1209 selects a wireless communication channel to perform the energy scan based on the channel scan information. In an example, the energy scanning module 1209 may measure average energy for the selected wireless communication channel to detect an activity of the selected wireless communication channel. In an example, the energy scanning module 1209 may perform an energy-based scan (EBS) procedure to detect an activity of the selected wireless communication channel.

In an example, the energy scanning module 1209 may measure the total energy which the radiohead 1201 receives from the selected wireless communication channel. In an example, the energy scanning module 1209 may perform a clear channel assessment (CCA) function. In an example, the energy scanning module 1209 may perform energy detection (ED).

In an example, the energy scanning module 1209 may measure the energy level of the selected wireless communication channel and may compare the measured energy level with an energy detection threshold to determine whether there is an activity on the selected wireless communication channel. In an example, the energy detection module may detect an activity on a plurality of wireless communication channels. In an example, the energy detection module may detect the energy level of the selected wireless communication channel for a predefined time period, and the energy detection module may compare the detected energy level with a predefined energy detection threshold for the selected wireless communication channel. In an example, the predefined energy detection threshold is 82 dBm. In an example, the channel scan information may include the information which relates to the predefined energy detection threshold.

In an example, the energy scanning module 1209 may generate an activity information based on the performed energy scan on the selected wireless communication channel. In an example, the activity information may include an information indicating whether there is the activity on the selected wireless communication channel. In an example, the energy scanning module 1209 may select a plurality of wireless communication channels to perform the energy scan, and the energy scanning module 1209 may generate the activity information whether there is the activity on the plurality of the selected wireless communication channels.

In an example, the energy scanning module 1209 may generate the activity information based on the performed scan, and the activity information may include information related to the measured energy levels of the one or more selected wireless communication channels. In an example, the activity information may include a bitmap information for the one or more selected wireless communication channels. In an example, the activity information may include a time information indicating the time and/or duration of the performed energy scan.

In an example, the bitmap information may include any time of mapping of the energy level to the one or more selected wireless communication channels. In an example, the bitmap information may include whether there is an activity on the one or more selected wireless communication channels. In an example, the bitmap information may include an array. In an example, the bitmap information may include a list. In an example, the bitmap information may include a table.

FIG. 14 shows schematically an example of a generated bitmap information in accordance with various aspects of this disclosure. In an example, the bitmap information may be generated based on the channel scan information which has been exemplified in FIG. 13. In an example, a radiohead may receive the channel scan information including information provided in FIG. 13, may perform an energy scan based on the channel scan information, and may generate an activity information including a bitmap information 1401.

In an example, the bitmap information 1401 represents whether there is an activity on a wireless communication channel which one or more processors performed the energy scan. In this example, the one or more processors may have performed the energy scan for detecting activity of channel #1, channel #2, channel #5, and channel #6, and may have detected an activity for channel #2 and channel #5. Accordingly, the bitmap information indicates the activity of channel #2 1402, and the activity of channel #5 with 1-bit at the bit locations for channel #2 1402 and channel #5.

Further, the bitmap information may indicate that there is no activity for channel #1, and channel #6 based on the performed energy scan based on the channel scan information. In an example, the bitmap information may also place 0-bits for the channels in which the one or more processors 1205 have not performed an energy scan.

Referring back to FIG. 12, the one or more processors 1205 receive the channel scan information and perform the energy scan based on the channel scan information. In an example, the one or more processors 1205 receive the channel scan information and control the energy scanning module 1209 based on the information in the channel scan information. In an example, the one or more processors 1205 may store the channel scan information to a memory.

In an example, the one or more processors 1205 may include a radio frequency sequencer. In an example, the one or more processors 1205 may control the radio frequency sequencer based on the schedule information in the channel scan information to perform the energy scan according to the schedule information in the channel scan information. In an example, the one or more processors 1205 control the radio frequency front end 1204 based on the channel scan information. In an example, the one or more processors 1205 may control other components of the transceiver chain 1206 based on the channel scan information.

In an example, the one or more processors 1205 may identify that the radio frequency front end 1204 is in an idle mode, at which the radio frequency front end 1204 does not receive wireless communication signals. In an example, the one or more processors 1205 may identify that based on an information that is related to the tasks which the one or more processors 1205 may schedule for the radio frequency front end 1204. In an example, the one or more processors 1205 may detect that the radio frequency front end 1204 is in the idle mode.

In an example, the one or more processors 1205 may perform the energy scan based on the channel scan information when the radio frequency front end 1204 is in the idle mode. In an example, the channel scan information may include a schedule information indicating to perform the energy scan at the next idle time, and the one or more processors 1205 may perform the energy scan at the next idle time for the radio frequency front end 1204, which the radio frequency front end 1204 is in the idle mode.

In an example, the one or more processors 1205 may provide the activity information for the performed energy scan based on the channel scan information to the one or more communication device processors of the communication device. In an example, the one or more processors 1205 may control the communication interface module 1208 to provide the activity information to the one or more radiohead external processors. In an example, the one or more radiohead external processors may include the one or more communication device processors which the one or more radiohead processors are coupled to via the communication interface 1207.

In an example, the communication interface 1207 may operate in a low power mode. In an example, the low power mode may include a sleep mode. In this example, the one or more processors 1205 may send an indication to the communication interface 1207 to wake up the communication interface 1207 from the low power mode. In an example, the indication includes a wake-up signal. In an example, the one or more processors 1205 may send the indication after the energy detection module generates the activity information to provide the activity information to the one or more communication device processors.

In an example, the one or more radiohead external processors may operate in a low power mode. In an example, the low power mode may include a sleep mode. In this example, the one or more processors 1205 may send an indication to the communication interface 1207 to wake up the one or more radiohead external processors from the low power mode. In an example, the indication may include a wake-up signal. In an example, the one or more processors 1205 may send the indication after the energy detection module generates the activity information to provide the activity information to the one or more communication device processors. In an example, the one or more radiohead external processors include the one or more communication device processors which the one or more radiohead processors are coupled to via the communication interface 1207.

FIG. 15 shows schematically an example of a communication device in accordance with various aspects of this disclosure. The communication device 1501 includes one or more communication device processors 1502. The one or more communication device processors 1502 may include a medium access control (MAC) layer unit 1503 which implements one or more medium access control (MAC) layer functions in accordance with various aspects of this disclosure. In an example, the one or more medium access control (MAC) layer functions provide and/or receive services to/from one or more physical (PHY) layer functions. The medium access control (MAC) layer unit 1503 may provide services to a physical (PHY) layer unit. In an example, the one or more communication device processors 1502 may include a portion of the physical layer (PHY) unit.

The one or more communication device processors 1502 is connected to a communication interface 1505. In an example, the communication interface 1505 may include a digital interface. In an example, the communication interface 1505 includes a serial digital interface. In an example, the communication interface 1505 may include a serial time encoded protocol (STEP) interface. In an example, the one or more communication device processors 1502 may control the communication interface 1505 via an interface module 1504.

Further, the communication device 1501 includes a plurality of radioheads 1506, 1511, 1516. In an example, the plurality of radioheads 1506, 1511, 1516 may include a plurality of radioheads in accordance with various aspects of this disclosure. In particular, the plurality of radioheads 1506, 1511, 1516 may include a plurality of radiohead in accordance with one of the examples of the radiohead in FIG. 12.

The communication device 1501 includes a first radiohead 1506 which includes an interface module 1507 to control the communication between the first radiohead 1506 and the one or more communication device processors 1502 via the communication interface 1505. The first radiohead 1506 further includes a first processor 1508 and a first energy scanning module 1509 in accordance with various aspects of this disclosure. In an example, the first processor 1508 may also include at least a portion of the first energy scanning module 1509. In an example, the first processor 1508 may control the first energy scanning module.

The first radiohead 1506 may further include a first transmit/receive (TX/RX) module 1510 to receive and/or transmit wireless communication signals. In an example, the first TX/RX module 1510 may include an antenna interface and a radio frequency front end. In an example, the first TX/RX module 1510 may also include at least a portion of a transceiver chain. In an example, the first processor 1508 may provide one or more physical (PHY) layer functions to the one or more medium access control (MAC) layer functions which the medium access control (MAC) layer unit 1503 provides.

The first radiohead 1506 may be connected to the communication interface 1505, which couples the first processor 1508 to the one or more communication device processors 1502. In an example, the communication interface 1505 couples the first processor 1508 to the medium access control (MAC) layer unit 1503. In an example the first radiohead 1506 includes a radiohead in accordance with various aspects of this disclosure. In an example, the first radiohead 1506 may include a memory to store digital communication signals or the data related to the communication signals. In an example, the first radiohead 1506 may include an interface module in accordance with various aspects of this disclosure to control the communication interface 1505.

In an example, the first radiohead 1506 receives a first channel scan information from the one or more communication device processors 1502. The first channel scan information may include an information related to a first at least one target communication channels. The first processor 1508 may control the first energy scanning module 1509 to perform a first energy scan for detecting activity of the first at least one target communication channels based on the first channel scan information. The first energy scanning module 1509 may generate a first activity information including an information as to whether there is an activity on the first at least one target communication channels, and the first processor 1508 may provide the first activity information to the communication interface 1505.

The communication device 1501 may further include a second radiohead 1511 which includes an interface module 1512 to control the communication between the second radiohead 1511 and the one or more communication device processors 1502 via the communication interface 1505. The second radiohead 1511 further includes a second processor 1513 and a second energy scanning module 1514 in accordance with various aspects of this disclosure. In an example, the second processor 1513 may also include at least a portion of the second energy scanning module 1514. In an example, the second processor 1513 may control the second energy scanning module 1514.

The second radiohead 1511 may further include a second transmit/receive (TX/RX) module 1515 to receive and/or transmit wireless communication signals. In an example, the second TX/RX module 1515 may include an antenna interface, and a radio frequency front end. In an example, the second TX/RX module 1515 may also include at least a portion of a transceiver chain. In an example, the second processor 1513 may provide one or more physical (PHY) layer functions to the one or more medium access control (MAC) layer functions which the medium access control (MAC) layer unit 1503 provides.

The second radiohead 1511 may be connected to the communication interface 1505, which couples the second processor 1513 to the one or more communication device processors 1502. In an example, the communication interface 1505 couples the second processor 1513 to the medium access control (MAC) layer unit 1503. In an example the second radiohead 1511 includes a radiohead in accordance with various aspects of this disclosure. In an example, the second radiohead 1511 may include a memory to store digital communication signals or the data related to the communication signals. In an example, the second radiohead 1511 may include an interface module in accordance with various aspects of this disclosure to control the communication interface 1505.

In an example, the second radiohead 1511 receives a second channel scan information from the one or more communication device processors 1502. The second channel scan information may include an information related to a second at least one target communication channels. The second processor 1513 may control the second energy scanning module 1514 to perform a second energy scan for detecting activity of the second at least one target communication channels based on the second channel scan information. The second energy scanning module 1514 may generate a second activity information including an information as to whether there is an activity on the second at least one target communication channels, and the second processor 1513 may provide the second activity information to the communication interface 1505.

The communication device 1501 may further include a third radiohead 1516 which includes an interface module 1517 to control the communication between the third radiohead 1516 and the one or more communication device processors 1502 via the communication interface 1505. The third radiohead 1516 further includes a third processor 1518 and a third energy scanning module 1519 in accordance with various aspects of this disclosure. In an example, the third processor 1518 may also include at least a portion of the third energy scanning module 1519. In an example, the third processor 1518 may control the third energy scanning module 1519.

The third radiohead 1516 may further include a third transmit/receive (TX/RX) module 1520 to receive and/or transmit wireless communication signals. In an example, the third TX/RX module 1520 may include an antenna interface, and a radio frequency front end. In an example, the third TX/RX module 1520 may also include at least a portion of a transceiver chain. In an example, the third processor 1518 may provide one or more physical (PHY) layer functions to the one or more medium access control (MAC) layer functions which the medium access control (MAC) layer unit 1503 provides.

The third radiohead 1516 may be connected to the communication interface 1505, which couples the third processor 1518 to the one or more communication device processors 1502. In an example, the communication interface 1505 couples the third processor 1518 to the medium access control (MAC) layer unit 1503. In an example the third radiohead 1516 includes a radiohead in accordance with various aspects of this disclosure. In an example, the third radiohead 1516 may include a memory to store digital communication signals or the data related to the communication signals. In an example, the third radiohead 1516 may include an interface module in accordance with various aspects of this disclosure to control the communication interface 1505.

In an example, the third radiohead 1516 receives a third channel scan information from the one or more communication device processors 1502. The third channel scan information may include an information related to a third at least one target communication channels. The third processor 1518 may control the third energy scanning module 1519 to perform a third energy scan for detecting activity of the third at least one target communication channels based on the third channel scan information. The third energy scanning module 1519 may generate a third activity information including an information as to whether there is an activity on the third at least one target communication channels, and the third processor 1518 may provide the third activity information to the communication interface 1505.

In an example, the one or more communication device processors 1502 generates the first channel scan information, and the first channel scan information may include indication for the first radiohead 1506 to perform an energy scan on the first at least one target communication channels. Further, the one or more communication device processors 1502 may generate the second channel scan information, and the second channel scan information may include indication for the second radiohead 1511 to perform an energy scan on the second at least one target communication channels. In an example, the one or more communication device processors 1502 may generate the third channel scan information, and the third channel scan information may include indication for the third radiohead 1516 to perform an energy scan on the third at least one target communication channels.

FIG. 16 shows schematically an example of an information table which the channel scan information may include in accordance with various aspects of this disclosure. In an example, the information table may include at least an identifier 1601, 1604 for the at least one target communication channels to identify the at least one target communication channels. In an example, the channel scan information may include a schedule information 1602, 1603 for the energy scans to be performed. In an example, the channel scan information may include an information related to how the energy scan should be performed. In an example, the channel scan information may include a threshold information 1605 which refers to the threshold level to be used for the energy scan.

Further in this example, the channel scan information may include radiohead identifier information 1606 indicating which a radiohead is assigned for the energy scan. In an example, the first channel scan information, the second channel scan information and the third channel scan information may include the same information table, and the first processor 1506, the second processor 15011 and the third processor 1516 may select respective target communication channels based on a further ID information. In an example, the one or more processors of the communication device 1501 may distribute the respective channel scan information in accordance with the radiohead identifier information 1606.

Referring back to FIG. 15, in an example, the medium access control (MAC) unit 1503 may perform operations for the medium access control (MAC) layer, and provide services to the first radiohead 1506, the second radiohead 1511, and the third radiohead 1516. In an example, the operations of the medium access control (MAC) unit 1503 may include scheduling an energy scan for the communication device 1501. In an example, the operations of the medium access control (MAC) unit 1503 may include scheduling energy scans for different channels for each of the first radiohead 1506, the second radiohead 1511, and the third radiohead 1516 in accordance with various aspects of this disclosure.

In an example, the one or more communication device processors 1502 may generate the channel scan information based on the idle status of each of the first radiohead 1506, the second radiohead 1511, and the third radiohead 1516. In an example, the one or more communication device processors 1502 may generate the first channel scan information, the second channel scan information, and the third channel scan information, and send the generated channel scan information to the respective radioheads.

In an example, after providing a generated channel scan information to the respective radiohead, the one or more communication device processors 1502 may operate in a low power mode. In an example, the one or more communication device processors 1502 may instruct the communication interface 1505 to operate in a low power mode to reduce power consumption.

In an example, the medium access control (MAC) layer unit 1503 may not provide services to the radiohead in the low power mode. In an example, the medium access control (MAC) layer unit 1503 may operate in the low power mode based on the scheduled energy scans for the first radiohead 1506, the second radiohead 1511 and the third radiohead 1516. In an example, operating in the low power mode may include providing a control signal to a circuit to power gate the one or more communication device processors 1502, or to power gate the medium access control (MAC) layer unit 1503.

Accordingly, in this example, the one or more communication device processors 1502 may generate the first channel scan information, the second channel scan information, and the third channel scan information, and send the generated channel scan information to the respective radioheads, and provide a power signal to a power gating circuit to power gate the one or more communication device processors 1502 into the low power mode. In an example, the first radiohead 1506, the second radiohead 1511, and the third radiohead 1516 include the processing functions to perform the functions required to perform an energy scan and provide the activity information in accordance with various aspects of this disclosure without the one or more communication device processors 1502.

The rest of the examples related to the FIG. 15 may be provided by referring to the first radiohead 1506, but it should also be considered that the references for the first radiohead 1506 with respect to the FIG. 15 may also apply to the second radiohead 1511 and the third radiohead 1516 at their broadest extent. The first radiohead 1506 receives the first channel scan information and performs the energy scan for channel ID #1, channel ID #2, and channel ID #6 based on the first channel scan information, and generates the first activity information, which includes a bitmap information for the performed energy scan for the channels.

In an example, in response to the generation of the first activity information, the first processor provides a wake-up signal to the one or more communication device processors 1502 in order to wake up the one or more communication device processors 1502. In an example, the interface module 1507 may provide the wake-up signal to the communication interface 1505 in order to wake up the one or more communication device processors 1502. In an example, the interface module 1507 may control the communication interface 1505, and interface module 1507 may wake up the communication interface 1505 in response to the generation of the first activity information. In an example, the first processor may provide the activity information after the one or more communication device processors 1502 receives the wake-up signal.

FIG. 17 shows schematically an example of a representation of a radiohead and a communication device in accordance with various aspects of this disclosure. The communication device 1701 includes a radiohead 1702, and the radiohead 1702 includes a processor 1703. The radiohead is coupled to a device processor 1704 of the communication device 1701 via a communication interface 1705. The radiohead 1702 further includes a radiohead interface module 1706 which controls the communication interface 1705 between the processor 1703 and the device processor 1704. The communication device 1701 may also include a device interface module 1707 which controls the communication interface 1705 between the processor 1703 and the device processor 1704. The radiohead 1702 may further include an energy scanning module 1708 to perform the energy scan based on the channel scan information.

In accordance with various aspects of this disclosure, the radiohead 1702 may include the first radiohead referred in FIG. 15. In this example, the radiohead 1702 receives the channel scan information, and the energy scanning module 1708 performs the energy scan based on the channel scan information and generates the activity information in accordance with various aspects of this disclosure. After the processor 1703 determines to send the activity information to the device processor 1704, the processor 1703 may send an indication signal to the radiohead interface module 1706 to send a wake-up signal.

In an example, the processor 1703 may determine to send the activity information based on the channel scan information. In an example, the radiohead 1702 may have performed all of the scans provided with the channel scan information. In an example, the channel scan information may include a plurality of scan tasks for the radiohead 1702, and the radiohead 1702 may have performed the plurality of the scan tasks. In an example, each scan task may include an energy scan of a communication channel.

In an example, the radiohead 1702 may have performed a portion of the plurality of the scan tasks, and a predefined wake-up condition may be met. In an example, the predefined wake-up condition may include a detection of an activity on the one of the communication channels provided in the channel scan information. In an example, the radiohead 1702 may determine to send the activity information periodically. In an example, the radiohead 1702 may determine to send the activity information based on an information in the channel scan information. In this example, the channel scan information may include an information indicating the time period to send the activity information to the device processor 1704.

The radiohead interface module 1706 may receive the indication signal from the processor 1703 indicating providing the activity information to the device processor 1704. In an example, the radiohead interface module 1706 may detect that the communication interface 1705 operates in normal mode, which is not the low power mode. In an example, the radiohead module 1706 may detect that the communication interface 1705 operates in the low power mode.

In an example, the radiohead interface module 1706 sends a wake-up signal to the communication interface 1705 to wake up the communication interface 1705 or the device processor 1704 coupled to the communication interface 1705. In an example, the radiohead interface module 1706 may detect that the wake-up condition is met, and sends the wake-up signal to the communication interface 1705. In an example, the radiohead interface module 1706 may detect that the wake-up condition is met, and sends the wake-up signal directly to the device processor 1704.

Further, the processor 1703 may send the activity information after the wake-up signal is sent. In an example, the processor 1703 may send the activity information based on the wake-up condition. In an example, the radiohead interface module 1706 may detect whether the wake-up condition is met, and sends the activity information based on the wake-up condition. In an example, the radiohead interface module 1706 may send the wake-up signal to the device interface module 1707.

In an example, the device processor 1704 may operate in the low power mode. In an example, the device processor 1704 may operate in the low power mode, and the device processor 1704 may detect a wake-up signal in the low power mode. Accordingly, the device processor 1704 may start operating in normal mode, which is not the low power mode. In an example, the device processor 1704 may wake up the medium access control (MAC) layer unit in response to the wake-up signal. In an example, the device processor 1704 may include the device interface module 1707 and the device interface module 1707 may receive the wake-up signal, and wake up the device processor 1704. In an example, the device processor 1704 may control a power gating circuit to disable the power gating of the device processor 1704 in response to the wake-up signal.

FIG. 18 shows schematically an example of a communication flow in accordance with the various aspects of this disclosure. The communication flow shows a communication flow between a communication device processor 1801, a first radiohead 1802, and a second radiohead 1803. In an example, the first radiohead 1802 includes a first radiohead processor, and a second radiohead 1803 includes a second radiohead 1803 processor. The first radiohead 1802, and the second radiohead 1803 includes a radiohead in accordance with various aspects of this disclosure, especially the first radiohead 1802 and the second radiohead 1803 referred in FIG. 17.

In an example, the communication device processor 1801 determines to schedule an energy scan. Based on the determination, the communication device processor 1801 sends a first channel scan information 1804 to the first radiohead 1802. The first channel scan information 1804 includes a channel scan information in accordance with various aspects of this disclosure. In an example, the first channel scan information 1804 may include an indication for the first radiohead 1802 to schedule an energy scan for channel #1, channel #2, and channel #3 for a time period of 50 ms to perform the energy scan for each of the channels.

The communication device processor 1801 further sends a second channel scan information 1805 to the second radiohead 1803. The second channel scan information 1805 includes a channel scan information in accordance with various aspects of this disclosure. In an example, the second channel scan information 1805 may include an indication for the second radiohead 1803 to schedule an energy scan for channel #4, channel #5, and channel #6 for a time period of 50 ms to perform the energy scan for each of the channels.

After sending the first channel information and the second channel information, the communication device processor 1801 begins 1806 to operate in low power mode. In an example, the communication device processor 1801 also controls 1806 the communication interface which provides communication between the communication device processor 1801, the first radiohead 1802, and the second radiohead 1803 to operate in low power mode as well.

The first radiohead 1802 receives the first channel scan information 1804 and performs 1807 the energy scan based on the first channel scan information 1804. The first radiohead 1802 performs 1807 an energy scan for channel #1, channel #2, and channel #3. The first radiohead 1802 generates 1807 a first activity information based on the energy scan for channel #1, channel #2, and channel #3. In response to the generation of the first activity information, the first radiohead 1802 identifies 1807 that at least one of the communication interface or the communication device processor 1801 operates in the low power mode.

Accordingly, the first radiohead 1802 sends a wake-up signal 1808 to wake up at least one of the communication interface or the communication device processor 1801 from the low power mode. After sending the wake-up signal, the first radiohead 1802 further sends the activity information 1809 to the communication device processor 1801.

The second radiohead 1803 receives the second channel scan information 1805 and performs 1810 the energy scan based on the second channel scan information 1805. The second radiohead 1803 performs 1810 an energy scan for channel #4, channel #5, and channel #6. The second radiohead 1803 generates 1810 a second activity information based on the energy scan for channel #4, channel #5, and channel #6.

In response to the generation of the second activity information, the second radiohead 1803 does not identify 1810 that at least one of the communication interface or the communication device processor 1801 operates in the low power mode, because the first radiohead 1802 had made the at least one of the communication interface or the communication device processor 1801 to operate in normal mode. Accordingly, the second radiohead 1803 further sends the activity information 1811 to the communication device processor 1801.

In an example, a communication device may include a computer-readable medium including instructions stored thereon, that if executed by a processor, implement a method including receiving a channel scan information including information related to a target communication channel to be scanned from a communication device processor; performing an energy scan for detecting an activity of the target communication channel based on the channel scan information; generating an activity information including an information as to whether there is an activity on the target communication channel; and providing the activity information to a communication interface; the communication interface configured to couple the processor to a radiohead circuit-external processor external to the radiohead circuit.

In accordance with various aspects of this disclosure, a device, in particular a communication device may include a memory, and one or more processors, such as processing circuitry 810 and memory 820 referring back to FIG. 8. The memory 820 may be implemented as a computer-readable medium including instructions stored thereon, that if executed by a processor, implement a method including receiving a channel scan information including information related to a target communication channel to be scanned from a communication device processor, performing an energy scan for detecting activity of the target communication channel based on the channel scan information, generating an activity information including an information as to whether there is an activity on the target communication channel, and providing the activity information to a communication interface; the communication interface configured to couple the processor to a radiohead circuit-external processor external to the radiohead circuit.

FIG. 19 shows schematically an example of method steps in accordance with various aspects of this disclosure. The method may include receiving 1901 a channel scan information including information related to target communication channel to be scanned from a communication device processor; performing 1902 an energy scan for detecting an activity of the target communication channel based on the channel scan information; generating 1903 an activity information including at least an information as whether there an activity on the target communication channel; and providing 1904 the activity information to a communication interface; the communication interface configured to couple the processor to a radiohead circuit-external processor external to the radiohead circuit.

In wireless communication, it is important to perform detection to identify potential connection possibilities in the wireless communication environment. The need to identify the potential connection possibilities begins from detecting and identifying wireless communication networks that can provide a wireless communication service for a communication device. The communication device may need to detect potential wireless communication service providers in the environment to receive a wireless communication service.

Additionally, the circumstances with respect to the provided wireless communication may change. The communication device may have been connected to a wireless access point, but the radio frequency signal conditions may change, or the wireless access point may go offline or stop providing the wireless communication service to the communication device. Alternatively, the wireless access point may change the properties of the radio frequency signal which the wireless access point provides the wireless communication service, or the wireless communication may be disconnected for a reason.

Further, due to the mobility which wireless communication provides, the communication device may travel out of the coverage of the wireless communication service which the wireless access point provides to the communication device. Alternatively, new wireless access points may become online, or the communication device may travel into the coverage of other wireless access points that may provide better, faster, or more stable wireless communication services. Accordingly, there is a further need to continuously scan for other wireless access points or possible connection opportunities.

Various aspects of this disclosure may provide a radiohead which may perform a scan to discover wireless communication networks and/or wireless access points that may provide wireless communication service to the radiohead and/or the communication which includes the radiohead. The radiohead may receive an information, and may perform the scan to discover wireless communication networks and/or wireless access points, and provide information related to the performed scan based on the results of the scan. Various aspects of this disclosure may provide a communication device which may outsource the scan to a radiohead and operate in a low power mode. Various aspects of this disclosure may allow the communication device to schedule scans for a plurality of radioheads. Various aspects of this disclosure may allow the radiohead and/or the communication device to perform a passive scanning.

In an example, the various aspects of this disclosure may be compliant to Wireless Local Area Network (WLAN) which provides communication for a plurality of wireless communication devices using wireless communication to establish a local area network (LAN). The various aspects may, in particular, be compliant to the IEEE 802.11 protocol which is a set of local area network (LAN) protocol that is commonly used for wireless communication systems. In any event, the disclosure and references to the IEEE 802.11 protocol should not be considered as limiting, and the disclosure may apply to the use of the various aspects of this disclosure with any wireless communication technology.

Referring back to FIG. 9, the wireless communication environment may include a plurality of communication devices 901 and a plurality of wireless access points 902. In an example, at least two of the plurality of the wireless access points 902 may form a service set. The term "service set" may refer to a group of wireless communication devices which identifies by the same service set identifier (SSID). The term "service set identifier (SSID)" may refer to a unique identifier to identify the network which the service set identifier (SSID) refers to.

FIG. 20 shows schematically an example of a service set for a wireless communication protocol. The example includes a first wireless access point 2001, and a second wireless access point 2002. The first wireless access point 2001 may communicate with a first plurality of wireless communication devices 2003. The first plurality of wireless communication devices 2003 forms a first basic service set with the first wireless access point 2001, in that they may communicate together. The first basic service set has a first basic service set identifier (BSSID).

Similarly, the second wireless access point may communicate with a second plurality of wireless communication devices 2004. The second plurality of wireless communication devices 2004 forms a second basic set with the second wireless access point, in that they may communicate together. The second basic service set has a second basic service set identifier (BSSID). In an example, each of the basic service set IDs (BSSID) may be a unique 48-bit identifier as a medium access control (MAC) address to identify the basic service set uniquely.

The first basic service set and the second basic service set may form a service set 2005 by using the same service set identifier (SSID). The service set identifier (SSID) can include strings up to 32 bytes, and they include character strings. Further, the service set identifier (SSID) is customizable. The service set 2005 forms a logical network which operates with the same second layer networking parameters. Each of the basic service sets operates with the same physical (PHY) layer medium access characteristics such as operating wireless communication channels, modulation requirements, however, these requirements do not apply for the service set 2005.

A wireless communication device 2006 may be in the coverage of both the first basic service set and the second basic service set. It is common to perform wireless connections via the service set identifier (SSID), hence when the wireless communication device 2006 uses the service set identifier (SSID) to become a part of one of the basic service sets, the wireless communication device 2006 may be a client of the first basic service set, or the second basic service set.

In an example, the wireless protocol may define which of the basic service sets should the wireless communication device 2006 be a part of. In certain examples, the basic service set may be selected based on the signal quality or the signal strength of the wireless communication signals which the communication device receives 2006, and as the wireless communication device 2006 may periodically reconsider the selection by performing scans to determine which of the basic service set should the communication device 2006 connect in order to stay as a client of the service set 2005.

FIG. 21 shows schematically an example of a representation of scanning procedure. In an example, a wireless communication device 2101 may determine to perform a scan to identify whether there is a wireless access point which the wireless communication device 2101 may receive a wireless communication service. In an example, the wireless communication device 2101 selects a wireless communication channel to monitor whether there is a wireless network which the wireless communication device 2101 may establish a connection.

Accordingly, the wireless communication device 2101 selects 2102 the wireless communication channel, configure 2102 its physical layer (PHY) functions for the selected wireless communication channel. Then, the wireless communication device 2101 begins monitoring 2103 the wireless communication channel to identify whether there is a wireless network which the wireless communication device 2101 may establish a connection. In an example, the wireless communication device 2101 may monitor 2103 the selected wireless communication channel for a predefined period of time to identify at least one communication beacon.

In an example, the predefined period of time which the wireless communication channel monitors 2103 the wireless communication channel may be referred to as "dwell time". The term "dwell time" refers to the predefined period of time which the wireless communication device 2101 monitors the wireless communication channel to receive at least one communication beacon. Practically, a longer dwell time may result in occupying the wireless communication device 2101 only for listening, on which the wireless communication device 2101 may not use bandwidth for regular purposes. A shorter dwell time may result in missing a possible communication beacon for the wireless communication channel, which may result to not being able to identify a wireless network which the wireless communication device 2101 may receive a wireless communication service.

Meanwhile, the wireless communication device 2101 may be in a signal coverage area of a wireless access point 2104. The wireless access point 2104 may already provide wireless communication services to other wireless communication devices and may be transmitting 2105 wireless communication signals. Because, the wireless communication device 2101 is not a client of the wireless network which the wireless access point 2104 is a member of, the wireless communication device 2101 may not have access to the wireless communication signals which the wireless access point 2104 transmits.

From time to time, the wireless access point 2104 may issue a beacon frame 2106 to provide certain information related to the wireless network which the wireless access point 2104 is a member. The wireless access point 2104 may provide the beacon frame without any encryption so any wireless communication device within the signal coverage of the wireless access point 2104 may identify the wireless access point 2104 and may connect to the wireless network of the wireless access point 2104. After transmitting the beacon frame, the wireless access point 2104 may return to provide 2107 wireless communication services to other wireless communication devices in the wireless network.

Accordingly, if the predefined period of time of the monitoring which wireless communication device 2101 performs is long enough to overlap the monitoring of the wireless communication channel with the transmission of the beacon frame of the wireless access point 2104, the wireless communication device 2101 may detect the beacon frame, receive the information provided by the beacon frame and join the wireless network of the wireless access point 2104. In an example, the wireless communication device 2101 sends an association request (AR) to the wireless access point 2104 to join the wireless network.

FIG. 22 shows schematically a representation of a beacon frame. According to certain communication protocols, communication beacons may include a beacon frame. In certain examples, a beacon frame may include a medium access control (MAC) header. The medium access control (MAC) header of the beacon frame includes a plurality of information fields. In an example, the medium access control (MAC) header of the beacon frame includes a frame control field 2201 which provides information related to the type of the frame. For example, the frame control field 2201 may include information whether the frame is a beacon frame.

The MAC header also includes a duration field 2202 which may include a duration value based on the type of the frame. The MAC header further includes a destination address field 2203 which the beacon frame is intended for. In an example, the destination address field 2203 of the beacon frame may include an indication that the beacon frame is intended for any receivers. The MAC header further includes a sender address field 2204 which includes the address of the medium access control (MAC) entity of the sender of the beacon frame. The MAC header may also include an information field related to the intended receiver entity of the beacon frame (not shown)

The MAC header further includes a basic service set ID (BSS-ID) field 2205 which may include the basic service set ID of the transmitter entity of the beacon frame. The MAC header includes a sequence control field 2206 which includes information indicating the sequence of the frame. The MAC header includes a frame body field 2207 which will be explained in more detail, and a frame check sequence field 2208 which includes cyclic redundancy check bits.

The frame body field 2207 includes the body of the beacon frame. The frame body field 2207 includes a timestamp field 2209 indicating the timestamp of the beacon frame, a beacon interval field 2210 indicating the number of time units between beacon transmissions. The number of time units between beacon transmissions may be referred as "time units (TUs) between target beacon transmission times (TBTTs).

The frame body field 2207 further includes a capability information field 2211 which includes information indicating which capabilities the transmitting entity of the beacon frame has, a service set identifier (SSID) field 2212 which includes an identifier of the service set, a supported rates field 2213 which includes information indicating the supported rates. The frame body field 2207 further includes many information fields which are optional 2214.

FIG. 23 shows schematically an example of a radiohead in accordance with various aspects of this disclosure. The radiohead 2301 may include an antenna interface 2302. The antenna interface 2302 is coupled to an antenna 2303. The radiohead 2301 further includes a radio frequency front end 2304. In this example, the radio frequency front end 2304 is coupled to one or more processors 2305. In an example, the radio frequency front end 2304 may be coupled to a transceiver chain 2306 in between which includes the one or more processors 2305.

The radiohead 2301 receives a wireless communication signal via the antenna 2303. The antenna 2303 provides the wireless communication signal to the antenna interface 2302. The antenna interface 2302 receives the wireless communication signal from the antenna 2303 and provides the wireless communication signal to the radio frequency front end 2304. In an example, the radio frequency front end 2304 may provide the signal to the transceiver chain 2306.

The transceiver chain 2306 may include a down-converter to down-convert the signal. In an example, the transceiver chain 2306 may include a signal converter to convert the wireless communication signal to a digital signal. In an example, the signal converter may provide the wireless communication signal which is converted to the digital signal to the one or more processors 2305. In an example, the signal converter includes an analog-to-digital converter.

In an example, the one or more processors 2305 may include a medium access control (MAC) layer processing unit which provides at least one function or operation related to the medium access control (MAC) layer. In an example, the one or more processors 2305 may include a physical layer (PHY) processing unit which provides at least one function or operation related to the physical (PHY) layer.

In an example, the one or more processors 2305 are coupled to a communication interface 2307. In an example, the communication interface 2307 couples the one or more processors 2305, to the one or more external processors external to the radiohead 2301. In an example, the one or more external processors external to the radiohead 2301 may include one or more communication device processors of the communication device which the radiohead 2301 is coupled to.

In an example, the communication interface 2307 may include a digital interface. In an example, the communication interface 2307 includes a serial digital interface. In an example, the communication interface 2307 may include a serial time encoded protocol (STEP) interface. In an example, the radiohead 2301 may include one or more processors 2305 to control the communication interface 2307. In an example, the one or more processors 2305 to control the communication interface 2307 include a communication interface module 2308.

In an example, the communication interface 2307 may provide communication between the radiohead 2301 and the one or more communication device processors. In an example, the communication interface module 2308 controls the communication for the radiohead 2301. In an example, the communication interface module 2308 may control the communication interface 2307 based on instructions received from the one or more processors 2305. In an example, the one or more processors 2305 may include the communication interface module 2308.

Accordingly, the one or more processors 2305 may perform at least one processing function in accordance with various aspects of this disclosure, and provide the output signal to the communication interface 2307 to provide to the one or more communication device processors for further processing of the output signal of the one or more processors 2305. In an example, the output signal of the one or more processors 2305 may include a data frame, and the one or more communication device processors may perform one or more processing functions for the data frame.

In an example, the one or more processors 2305 may receive a channel scan information from the communication interface 2307. In an example, the one or more radiohead external processors external to the radiohead 2301 may send the channel scan information to the one or more processors 2305 via the communication interface 2307. In an example, the one or more communication device processors may send the channel scan information to the one or more processors 2305 via the communication interface 2307.

In an example, the channel scan information may include an information related to a target wireless communication channel to be scanned. In an example, the target wireless communication channel may include a plurality of wireless communication channels. In an example, the one or more processors 2305 may receive the channel scan information and select the at least one target wireless communication channel based on the information related to the target channel in the channel scan information.

FIG. 24 shows schematically an example of an information table which a channel scan information may include in accordance with various aspects of this disclosure. In an example, the information related to the at least one target wireless communication channel includes an identifier 2401, 2404 for the at least one target wireless communication channel to identify the at least one target wireless communication channel. In an example, the identifier 2401, 2404 for each of the at least one target wireless communication channel may include an indication for the identification 2401 of the at least one target wireless communication channel, such as channel 1, channel 2, channel 5, and channel 6. In an example, the identifier 2401, 2404 for each of the at least one target wireless communication channel may include channel frequency information 2404 for at least one target wireless communication channel, or a channel band identifier 2401, 2404.

In an example, the channel scan information may include a schedule information 2402, for the scan to be performed. In an example, the schedule information 2402 may relate to a time period to perform a beacon detection for detecting whether at least one communication beacon has been received from at least one target communication channel. In an example, the schedule information 2402 may include a time information indicating the time to perform the beacon detection 2402.

In an example, the time information indicating the time to perform the beacon detection 2402 may refer to an absolute time. In an example, the time information may refer to a time relative to an event. In an example, the event may be the receiving of the channel scan information, performing a scan, receiving and or transmitting a wireless communication signal, and such. In an example, the time information may refer to a repeating event, as in repeat every 500 ms.

In an example, channel scan information may include a time information indicating a predefined period of time 2403 which may include the duration of the beacon detection to be performed 2403. In an example, the predefined period of time 2403 which may include the duration of the beacon detection to be performed 2403 for at least one target wireless communication channel. In an example, the predefined period of time 2403 includes a dwell time for each of the at least one target communication channel. In an example, the time information indicating the duration of the beacon detection to be performed 2403 may include a range.

In an example, the channel scan information may include an information related to how the beacon detection should be performed. In an example, the channel scan information may include a threshold information which refers to the threshold level to be used for the beacon detection. In an example, the threshold information may refer to a dB or dBm metric. In an example, the channel scan information may include a threshold information indicating the threshold level to be used to detect the communication beacon. Further, the channel scan information may include a predefined signal threshold and/or a predefined autocorrelation threshold to detect the communication beacon.

In an example, the radiohead 2301 may perform a beacon detection for detecting an activity of a wireless communication channel. In an example, the radiohead 2301 may perform the beacon detection for detecting whether at least one communication beacon has been received based on the channel scan information. In an example, the radiohead 2301 may include a beacon detecting circuit or a beacon detector 2309 to detect whether at least one communication beacon has been received from at least one target communication channel. In an example, the beacon detector 2309 may detect whether the signal the one or more processors 2305 received fulfils a detection criterion or a plurality of detection criteria.

In an example, the beacon detector 2309 may receive the wireless communication signal which the radio frequency front end 2304 provides to the transceiver chain 2306. In an example, the beacon detector 2309 receives the digital signal which the signal converter of the transceiver 2306 provides. In an example, the one or more processors 2305 may receive the digital signal.

In an example, the one or more processors 2305 may include a physical (PHY) layer processing unit to obtain at least a portion of a physical (PHY) layer data frame which the received wireless communication signal includes. In an example, the one or more processors 2305 may include a medium access control (MAC) layer processing unit to obtain a portion of the data frame from the physical (PHY) layer data frame. In an example, the portion of the data frame which the medium access control (MAC) layer processing unit obtains may include a medium access control (MAC) frame. In an example, the one or more processors 2305 obtain at least the portion of the data frame which includes an identifier indicating that the data frame includes a communication beacon.

In an example, the one or more processors 2305 may include a demodulator to demodulate the digital signal. In an example, the one or more processors 2305 may include an orthogonal frequency division multiplexing (OFDM) demodulator. In an example, the one or more processors 2305 may include a complementary code keying (CCK) demodulator. In an example, the one or more processors 2305 may include a complementary code keying—orthogonal frequency division multiplexing (CCK-OFDM) demodulator. In an example, the one or more processors 2305 may include a demodulator which is configured to demodulate a portion of the received wireless communication signal which an identifier indicating that the data frame includes a communication beacon.

In an example the one or more processors 2305 may obtain the at least a portion of the data frame in accordance with various aspects of this disclosure, and the one or more processors 2305 may provide the at least the portion of the data frame which may include an identifier indicating that the data frame includes a communication beacon to the beacon detector 2309. In an example, the one or more processors 2305 may provide the data frame to the beacon detector 2309. In an example, the beacon detector 2309 may determine whether at least one communication beacon has been received from at least one target communication channel based on the data frame or the portion of the data frame which the beacon detector 2309 receives.

In an example, the data frame which the beacon detector 2309 receives includes a medium access control (MAC) header, and the beacon detector 2309 may identify the frame control field of the data frame which the beacon detector 2309 receives. In an example, the beacon detector 2309 may detect whether the data frame includes a communication beacon based on the frame control field of the data frame. In an example, the beacon detector 2309 may identify the type of the data frame from the frame control field of the data frame.

In an example, the one or more processors 2305 may perform a medium access control (MAC) layer 2 filtering operation to identify an address information from the communication beacon. In an example, the one or more processors 2305 may identify the medium access control (MAC) address which the communication beacon is sent from. In an example, the data frame which the one or more processors 2305 provide to the beacon detector 2309 may include the medium access control (MAC) address which the communication beacon is sent from. In an example, the beacon detector 2309 may determine whether the communication beacon is received based on the medium access control (MAC) address of the data frame.

The beacon detector 2309 receives an input signal and performs a beacon detection to detect whether at least one communication beacon has been received from at least one target communication channel. In an example, the beacon detector 2309 selects a wireless communication channel to perform the beacon detection based on the channel scan information to select the at least one target communication channel.

In an example, the one or more processors 2305 may measure at least one metric of the wireless communication signal received from the selected wireless communication channel to identify the wireless communication signal. In an example, the one or more processors 2305 may determine if the signal strength of the wireless communication signal received from the selected wireless communication channel is above a predefined signal threshold.

In an example, the one or more processors 2305 may calculate an autocorrelation of the wireless communication signal received from the selected wireless communication channel. In an example, the one or more processors 2305 may determine whether the calculated autocorrelation of the wireless communication signal received from the selected wireless communication channel is above a predefined autocorrelation threshold.

In an example, the beacon detector 2309 may generate a beacon information based on the performed beacon detection of whether at least one communication beacon has been received from at least one target communication channel. In an example, the beacon information may include an information indicating whether at least one communication beacon has been received from at least one target communication channel. In an example, the beacon detector 2309 may select a plurality of wireless communication channels to perform the beacon detection, and the beacon detector 2309 may generate the beacon information whether at least one communication beacon has been received from the plurality of the wireless communication channels.

In an example, the beacon detector 2309 may generate the beacon information based on the performed beacon detection, and the beacon information may include information related to the performed beacon detection. In an example, the beacon information may include a bitmap information for the one or more selected wireless communication channels in which the beacon detector 2309 detects a communication beacon. In an example, the beacon information may include a time information indicating the time and/or duration of the performed beacon detection. In an example, the beacon information may include the beacon frame.

The one or more processors 2305 receive the channel scan information and perform the beacon detection based on the channel scan information. In an example, the one or more processors 2305 receive the channel scan information and control the beacon detector 2309 based on the information in the channel scan information. In an example, the one or more processors 2305 may store the channel scan information to a memory.

In an example, the one or more processors 2305 may include a radio frequency sequencer. In an example, the one or more processors 2305 may control the radio frequency sequencer based on the schedule information in the channel scan information to perform the beacon detection according to the schedule information in the channel scan information. In an example, the one or more processors 2305 control the radio frequency front end 2304 based on the channel scan information. In an example, the one or more processors 2305 may control other components of the transceiver chain 2306 based on the channel scan information.

In an example, the one or more processors 2305 may identify that the radio frequency front end 2304 is in an idle mode, at which the radio frequency front end 2304 does not receive wireless communication signals. In an example, the one or more processors 2305 may identify that based on an information that is related to the tasks which the one or more processors 2305 may schedule for the radio frequency front end 2304. In an example, the one or more processors 2305 may detect that the radio frequency front end 2304 is in the idle mode.

In an example, the one or more processors 2305 may perform the beacon detection based on the channel scan information when the radio frequency front end 2304 is in the idle mode. In an example, the channel scan information may include a schedule information indicating to perform the beacon detection at the next idle time, and the one or more processors 2305 may perform the beacon detection at the next idle time for the radio frequency front end 2304, which the radio frequency front end 2304 is in the idle mode.

In an example, the one or more processors 2305 may provide the beacon information for the performed beacon detection based on the channel scan information to the one or more communication device processors of the communication device. In an example, the one or more processors 2305 may provide the beacon information to the communication interface 2307. In an example, the one or more processors 2305 may control the communication interface module 2308 to provide the beacon information to the one or more radiohead external processors. In an example, the one or more radiohead external processors may include the one or more communication device processors which the one or more radiohead processors are coupled to via the communication interface 2307.

In an example, the communication interface 2307 may operate in a low power mode. In an example, the low power mode may include a sleep mode. In this example, the one or more processors 2305 may send an indication to the communication interface 2307 to wake up the communication interface 2307 from the low power mode. In an example, the indication includes a wake-up signal. In an example, the one or more processors 2305 may send the indication after the energy detection module generates the beacon information to provide the beacon information to the one or more communication device processors.

In an example, the one or more radiohead external processors may operate in a low power mode. In an example, the low power mode may include a sleep mode. In this example, the one or more processors 2305 may send an indication to the communication interface 2307 to wake up the one or more radiohead external processors from the low power mode. In an example, the indication may include a wake-up signal. In an example, the one or more processors 2305 may send the indication after the energy detection module generates the beacon information to provide the beacon information to the one or more communication device processors. In an example, the one or more radiohead external processors include the one or more communication device processors which the one or more radiohead processors are coupled to via the communication interface 2307.

FIG. 25 shows schematically an example of a communication device in accordance with various aspects of this disclosure. The communication device 2501 includes one or more communication device processors 2502. The one or more communication device processors 2502 may include a physical (PHY) layer/medium access control (MAC) layer processing unit 2503 which may provide and receive services from a processor of a plurality of radioheads, and which implements one or more medium access control (MAC) layer functions, and one or more physical (PHY) layer functions.

The one or more communication device processors 2502 is connected to a communication interface 2505. In an example, the communication interface 2505 may include a digital interface. In an example, the communication interface 2505 includes a serial digital interface. In an example, the communication interface 2505 may include a serial time encoded protocol (STEP) interface. In an example, the one or more communication device processors 2502 may control the communication interface 2505 via an interface module 2504.

Further, the communication device 2501 includes a plurality of radioheads 2506, 2511, 2516. In an example, the plurality of radioheads 2506, 2511, 2516 may include a plurality of radioheads in accordance with various aspects of this disclosure. In particular, the plurality of radioheads 2506, 2511, 2516 may include a plurality of radiohead in accordance with one of the examples of the radiohead in FIG. 23.

The communication device 2501 includes a first radiohead 2506 which includes an interface module 2507 to control the communication between the first radiohead 2506 and the one or more communication device processors 2502 via the communication interface 2505. The first radiohead 2506 further includes a first processor 2508 and a beacon detector 2509 in accordance with various aspects of this disclosure. In an example, the first processor 2508 may include at least a portion of the beacon detector 2509. In an example, the first processor 2508 may control the beacon detector 2509.

The first radiohead 2506 may further include a first transmit/receive (TX/RX) module 2510 to receive and/or transmit wireless communication signals. In an example, the first TX/RX module 2510 may include an antenna interface and a radio frequency front end. In an example, the first TX/RX module 2510 may also include at least a portion of a transceiver chain. In an example, the first processor 2508 may provide one or more physical (PHY) layer functions and one or more medium access control (MAC) layer functions.

The first radiohead 2506 may be connected to the communication interface 2505, which couples the first processor 2508 to the one or more communication device processors 2502. In an example the first radiohead 2506 includes a radiohead in accordance with various aspects of this disclosure. In an example, the first radiohead 2506 may include a memory to store digital communication signals or the data related to the communication signals. In an example, the data related to the communication signals may include a physical (PHY) layer protocol data unit (PPDU), and/or a medium access control (MAC) layer data units including a medium access control (MAC) layer service data units (MSDUs) and/or a medium access control (MAC) layer protocol data units (MPDUs). In an example, the first radiohead 2506 may include an interface module in accordance with various aspects of this disclosure to control the communication interface 2505.

The communication device 2501 may further include a second radiohead 2511 which includes an interface module 2512 to control the communication between the second radiohead 2511 and the one or more communication device processors 2502 via the communication interface 2505. The second radiohead 2511 further includes a second processor 2513 and a second beacon detector 2514 in accordance with various aspects of this disclosure. In an example, the second processor 2513 may also include at least a portion of the second beacon detector 2514. In an example, the second processor 2513 may control the second beacon detector 2514.

The second radiohead 2511 may further include a second transmit/receive (TX/RX) module 2515 to receive and/or transmit wireless communication signals. In an example, the second TX/RX module 2515 may include an antenna interface, and a radio frequency front end. In an example, the second TX/RX module 2515 may also include at least a portion of a transceiver chain. In an example, the second processor 2513 may provide one or more physical (PHY) layer functions and one or more medium access control (MAC) layer functions.

The second radiohead 2511 may be connected to the communication interface 2505, which couples the second processor 2513 to the one or more communication device processors 2502. In an example the second radiohead 2511 includes a radiohead in accordance with various aspects of this disclosure. In an example, the second radiohead 2511 may include a memory to store digital communication signals or the data related to the communication signals. In an example, the data related to the communication signals may include a physical (PHY) layer protocol data unit (PPDU), and/or a medium access control (MAC) layer data units including a medium access control (MAC) layer service data units (MSDUs) and/or a medium access control (MAC) layer protocol data units (MPDUs). In an example, the second radiohead 2511 may include an interface module in accordance with various aspects of this disclosure to control the communication interface 2505.

The communication device 2501 may further include a third radiohead 2516 which includes an interface module 2517 to control the communication between the third radiohead 2516 and the one or more communication device processors 2502 via the communication interface 2505. The third radiohead 2516 further includes a third processor 2518 and a third beacon detector 2519 in accordance with various aspects of this disclosure. In an example, the third processor 2518 may also include at least a portion of the third beacon detector 2519. In an example, the third processor 2518 may control the third beacon detector 2519.

The third radiohead 2516 may further include a third transmit/receive (TX/RX) module 2520 to receive and/or transmit wireless communication signals. In an example, the third TX/RX module 2520 may include an antenna interface, and a radio frequency front end. In an example, the third TX/RX module 2520 may also include at least a portion of a transceiver chain. In an example, the third processor 2518 may provide one or more physical (PHY) layer functions and one or more medium access control (MAC) layer functions.

The third radiohead 2516 may be connected to the communication interface 2505, which couples the third processor 2518 to the one or more communication device processors 2502. In an example, the third radiohead 2516 includes a radiohead in accordance with various aspects of this disclosure. In an example, the third radiohead 2516 may include a memory to store digital communication signals or the data related to the communication signals. In an example, the data related to the communication signals may include a physical (PHY) layer protocol data unit (PPDU), and/or a MAC layer data units including a medium access control (MAC) layer service data units (MSDUs) and/or a medium access control (MAC) layer protocol data units (MPDUs). In an example, the third radiohead 2516 may include an interface module in accordance with various aspects of this disclosure to control the communication interface 2505.

In an example, the one or more communication device processors 2502 determine to scan some of the wireless communication channels in accordance with various aspects of this disclosure. Accordingly, the one or more communication device processors 2502 may determine the details of the scan to be performed, and generate a first channel scan information for the first radiohead 2506, and a second channel scan information for the second radiohead 2511 to schedule scans for the first radiohead 2506 and the second radiohead 2511. In this example, the one or more communication device processors 2502 do not generate a channel scan information for the third radiohead 2516.

In an example, the one or more communication device processors 2502 do not schedule because the third radiohead 2516 may be a client to a wireless network and may be receiving and transmitting wireless communication signals.

In an example, the one or more communication device processors 2502 may already have scheduled scans for the third radiohead 2516. In an example, the one or more communication device processors 2502 may already have scheduled the third radiohead for an energy scan in accordance with various aspects of this disclosure.

In an example, the one or more communication device processors 2502 starts to operate in a low power mode after providing the first channel scan information to the first radiohead 2506, and the second channel scan information to the second radiohead 2511. In an example, the one or more communication device processors 2502 controls the communication interface 2505 to operate in a low power mode after providing the first channel scan information to the first radiohead 2506, and the second channel scan information to the second radiohead 2511.

FIG. 26A shows an example of the information which a first channel scan information may include in accordance with various aspects of this disclosure. FIG. 26B shows an example of the information which a second channel scan information may include in accordance with various aspects of this disclosure.

The first channel scan information may include for each of a plurality of target communication channels in the first channel scan information, a channel identifier 2601, a time information 2602 which the first radiohead is going to perform the schedule for the respective channel, a predefined period of time to monitor 2603 the respective channel, the frequency band 2604 of the respective channel. Similarly, the second channel scan information may include for each of a plurality of target communication channels in the second channel scan information, a channel identifier 2611, a time information 2612 which the first radiohead is going to perform the schedule for the respective channel, a predefined period of time to monitor 2613 the respective channel, the frequency band 2614 of the respective channel.

Referring back to FIG. 25, the examples may include the first channel scan information including the information schematized in FIG. 26A, and the second channel scan information including the information schematized in FIG. 26B. Accordingly, the one or more communication device processors 2502 generates the first channel scan information according to FIG. 26A, and the second channel scan information according to FIG. 26B.

In an example, the first radiohead 2506 receives the first channel scan information from the one or more communication device processors 2502 via the communication interface 2505. The first processor 2508 may control the first TX/RX module 2510 to receive wireless communication channels from channel #1, and to monitor channel #1 to identify a communication beacon for 80 ms based on the first channel scan information immediately.

In an example, the first processor 2508 may perform a preamble detection by calculating the autocorrelation of the signals received from channel #1. The first processor 2508 does not identify any wireless communication signals according to the preamble detection and finalizes the monitoring of channel #1. In an example, the first processor 2508 may detect that the first TX/RX module 2510 will be idle for 200 ms after 1200 ms. The first processor 2508 schedules the beacon detection for channel #2 to the first idle period which is expected after 1200 ms.

In an example, the first processor 2508 controls the first TX/RX module 2510 to receive wireless communication channels from channel #2 and starts to monitor channel #2 to identify a communication beacon for 120 ms based on the first channel scan information. In an example, the first processor 2508 identifies a wireless communication signal according to the preamble detection during the duration of the monitoring channel #2.

The first processor 2508 may demodulate the received wireless communication signal. In an example, the received wireless communication signal includes a complementary code keying (CCK) modulated header portion. In an example, the first processor 2508 includes a complementary code keying (CCK) demodulator to demodulate the received signal. In an example, the first processor 2508 may perform physical (PHY) layer operations and medium access control layer (MAC) operations to obtain a data frame from the received wireless communication signal. The data frame includes a medium access control (MAC) header.

The first processor 2508 may provide at least the medium access control (MAC) header to the beacon detector 2509. In an example, the first processor 2508 may provide the data frame which includes the medium access control (MAC) header to the beacon detector 2509. Accordingly, the beacon detector 2509 detects if the communication beacon has been received based on whether the signal which the first processor 2508 receives for channel #2 fulfils a detection criterion.

The beacon detector 2509 uses the detection criterion as the frame control field of the medium access control (MAC) header. The beacon detector 2509 receives the medium access control (MAC) header which the first processor 2508 provides and the beacon detector 2509 identifies the frame control field of the medium access control (MAC) header and checks whether the information indicating the type of the data frame refers to a beacon.

In another example, the beacon detector 2509 may use the detection criterion as the address of the sender of the data frame in the medium access control (MAC) header. In this example, the beacon detector 2509 may identify the sender address and may determine whether the data frame comes from a sender which may be a wireless access point. In an example, the beacon detector 2509 may determine whether the data frame comes from a sender which may be a wireless access point from a memory. In an example, the first channel scan information may include an information indicating at least one address of a wireless access point.

The beacon detector 2509 may also identify the sender address in order to filter some of the beacon frames. In this example, the beacon detector 2509 determines whether the sender address is a trusted sender address. The information of at least one trusted sender address may be located in a memory. In an example, the first channel scan information may include an information indicating at least one address of a trusted sender. In this example, the beacon detector 2509 also determines that a list which is in a memory of the first radiohead 2506 includes the sender address of the data frame.

Accordingly, the beacon detector 2509 generates a first beacon information. The first beacon information includes an information that a communication beacon is detected. The first beacon information further includes an information indicating that the beacon has been detected at channel #2. The beacon detector 2509 also includes the beacon frame received from channel #2 to the first beacon information.

Further, the first processor 2508 may control the first TX/RX module 2510 to receive wireless communication channels from channel #6, and to monitor channel #6 after 2 seconds from receiving the first channel scan information to identify a communication beacon for 80 ms based on the first channel scan information. However, the first processor 2508 does not detect a wireless communication signal on channel #6 during the monitoring for 80 ms.

After the first processor 2508 has performed all scans provided in the first channel scan information, the first processor 2508 determines to provide the generated first beacon information to the one or more communication device processors 2502. While the first radiohead 2506 performs the scans based on the first channel scan information, the second radiohead 2511 concurrently performs the scans in a manner similar to the first radiohead 2506 according to the second channel scan information, while, in an example, the third radiohead 2516 receive and transmit wireless communication signals to a wireless network. In an example, after performing similar operations to the first radiohead 2506, the second radiohead 2511 detects the communication beacon on channel #5, and generates a second beacon information based on the detection which includes an information indicating that the beacon has been detected at channel #5 with the beacon frame received from channel #5.

In an example, after providing a generated channel scan information to the respective radioheads, the one or more communication device processors 2502 may operate in a low power mode. In an example, the one or more communication device processors 2502 may control the communication interface 2505 to make the communication interface 2505 operate in a low power mode to reduce power consumption. In an example, operating in the low power mode for the one or more communication device processors 2502 may include providing a control signal to a circuit to power gate the one or more communication device processors 2502, or to power gate the physical (PHY) layer processing unit and the medium access control (MAC) layer unit of the one or more communication device processors 2502.

In an example, in response to the generation of the first beacon information, the first processor 2508 provides a wake-up signal to the one or more communication device processors 2502 in order to wake up the one or more communication device processors 2502. In an example, the interface module 2507 may provide the wake-up signal to the communication interface 2505 in order to wake up the one or more communication device processors 2502. In an example, the interface module 2507 may control the communication interface 2505, and interface module 2507 may wake up the communication interface 2505 in response to the generation of the first beacon information. In an example, the first processor 2508 may provide the first beacon information after the one or more communication device processors 2502 receive the wake-up signal.

In an example, the one or more communication device processors 2502 receive the wake-up signal and start operating in a normal mode which is not the low power mode. In an example, the one or more communication device processors 2502 receive the first beacon information from the first radiohead 2506, and the second beacon information from the second radiohead 2511 after start operating in a normal mode, which is not the low power mode.

In an example, the one or more communication device processors 2502 receive the beacon frame detected on channel #2 from the first radiohead 2506 and perform one or more medium access control (MAC) layer functions with the beacon frame. In an example, the one or more communication device processors 2502 receive the beacon frame detected on channel #5 from the second radiohead 2511 and perform one or more medium access control (MAC) layer functions with the beacon frame.

FIG. 27 shows schematically an example of a communication flow in accordance with the various aspects of this disclosure. The communication flow shows a communication flow between a communication device processor 2701, a first radiohead 2702, and a second radiohead 2703. In an example, the first radiohead 2702 includes a first radiohead processor, and a second radiohead 2703 includes a second radiohead 2703 processor. The first radiohead 2702, and the second radiohead 2703 includes a radiohead in accordance with various aspects of this disclosure, especially the first radiohead 2702 and the second radiohead 2703 referred to in FIG. 25.

In an example, the communication device processor 2701 determines to scan communication channels for a beacon. Based on the determination, the communication device processor 2701 sends a first channel scan information 2704 to the first radiohead 2702. The first channel scan information 2704 includes a channel scan information in accordance with various aspects of this disclosure. In an example, the first channel scan information 2704 may include an indication for the first radiohead 2702 to schedule a passive scan for channel #1, channel #2, and channel #3 for a time period of 100 ms to perform the beacon detection for each of the channels.

The communication device processor 2701 further sends a second channel scan information 2705 to the second radiohead 2703. The second channel scan information 2705 includes a channel scan information in accordance with various aspects of this disclosure. In an example, the second channel scan information 2705 may include an indication for the second radiohead 2703 to schedule a passive scan for channel #4, channel #5, and channel #6 for a time period of 100 ms to perform the beacon detection for each of the channels.

After sending the first channel information and the second channel information, the communication device processor 2701 begins 2706 to operate in low power mode. In an example, the communication device processor 2701 also controls 2706 the communication interface which provides communication between the communication device processor 2701, the first radiohead 2702, and the second radiohead 2703 to operate in low power mode as well.

The first radiohead 2702 receives the first channel scan information 2704 and performs 2707 the active scan based on the first channel scan information 2704. The first radiohead 2702 performs 2707 a beacon detection for channel #1, channel #2, and channel #3. The first radiohead 2702 generates 2707 a first beacon information based on the beacon detection for channel #1, channel #2, and channel #3. In response to the generation of the first beacon information, the first radiohead 2702 identifies 2707 that at least one of the communication interface or the communication device processor 2701 operates in the low power mode.

Accordingly, the first radiohead 2702 sends a wake-up signal 2708 to wake up at least one of the communication interface or the communication device processor 2701 from the low power mode. After sending the wake-up signal, the first radiohead 2702 further sends the beacon information 2709 to the communication device processor 2701.

The second radiohead 2703 receives the second channel scan information 2705 and performs 2710 the passive scan based on the second channel scan information 2705. The second radiohead 2703 performs 2710 a beacon detection for channel #4, channel #5, and channel #6. The second radiohead 2703 generates 2710 a second beacon information based on the beacon detection for channel #4, channel #5, and channel #6.

In response to the generation of the beacon activity information, the second radiohead 2703 does not identify 2710 that at least one of the communication interface or the communication device processor 2701 operates in the low power mode, because the first radiohead 2702 had made the at least one of the communication interface or the communication device processor 2701 to operate in normal mode. Accordingly, the second radiohead 2703 further sends the beacon information 2711 to the communication device processor 2701.

In an example, a communication device may include, a computer-readable medium including instructions stored thereon, that if executed by a processor, implement a method including receiving a channel scan information including information related to target communication channel to be scanned from a communication device processor, monitoring the target communication channel to identify a communication beacon for a predefined period of time based on the channel scan information, detecting if the communication beacon has been received based on whether a signal the processor received from the radio frequency front end during the monitoring of the target communication channel fulfills a detection criterion, generating a beacon information including at least an information as to whether the communication beacon has been received from the target communication channel, providing the beacon information to a communication interface; the communication interface configured to couple the processor to a radiohead circuit-external processor external to the radiohead circuit.

In accordance with various aspects of this disclosure, a device, in particular a communication device may include a memory, and one or more processors, such as processing circuitry 810 and memory 820 referring back to FIG. 8. The memory 820 may be implemented as a computer-readable medium including instructions stored thereon, that if executed by a processor to receive a channel scan information including information related to target communication channel to be scanned from a communication device processor, monitor the target communication channel to identify a communication beacon for a predefined period of time based on the channel scan information, detect if the communication beacon has been received based on whether a signal the processor received from the radio frequency front end during the monitoring of the target communication channel fulfills a detection criterion, generate a beacon information including at least an information as to whether the communication beacon has been received from the target communication channel, provide the beacon information to a communication interface; the communication interface configured to couple the processor to a radiohead circuit-external processor external to the radiohead circuit.

FIG. 28 shows schematically an example of method steps in accordance with various aspects of this disclosure. The method may include receiving a channel scan information including information related to a target communication channel to be scanned from a communication device processor, monitoring the target communication channel to identify a communication beacon for a predefined period of time based on the channel scan information, detecting if the communication beacon has been received based on whether a signal the processor received from the radio frequency front end during the monitoring of the target communication channel fulfills a detection criterion, generating a beacon information including at least an information as to whether the communication beacon has been received from the target communication channel, providing the beacon information to a communication interface; the communication interface configured to couple the processor to a radiohead circuit-external processor external to the radiohead circuit.

Another method to identify and scan potential wireless connection possibilities, and discover nearby wireless networks and access points includes a method referred to as "active scanning". In passive scanning, as provided in various aspects of this disclosure, it depends on a principle for a wireless access point to transmit a communication beacon. In general, the wireless access points are configured to transmit communication beacons in order to advertise themselves to potential clients. The passive scanning principally depends on a wireless access point to transmit communication beacons regularly, so that a wireless communication device may monitor wireless communication channels for a predefined time in order to receive the communication beacon which the wireless access point sends.

Consequentially, a wireless communication device that performs the passive scanning generally has to stop its data communication which the wireless communication device may be performing, tune to a wireless communication channel and monitor the wireless communication channel for a predefined time to detect the communication beacon. During the monitoring, the wireless communication device may not be able to transmit or receive data from other sources. For example, according to certain wireless communication protocols, although this is configurable, a wireless access point by default transmits a communication beacon every 102.4 ms. Accordingly, in this example, the wireless communication device may monitor a communication channel at least 102.4 ms in order to be sure that there is no communication beacon in the communication channel.

It may be considered that with active scanning, the wireless communication device performs a scan with an indication. In active scanning, the wireless communication device transmits an indication, which may be referred to as a probe request signal. The probe request signals indicate to the wireless access points that there is a wireless communication device that performs a scan. In response to a probe request signal, the wireless access point may respond with a response, which may be referred to as a probe response signal.

Practically, the probe response signal may be considered as a communication beacon that the wireless access point transmits in response to the probe request signal, and in fact, a communication beacon and a probe response signal share many common signal fields, including information indicating a basic service set ID (BSSID), service set ID (SSID), channel, channel width, security capabilities and such. Therefore, any subject matter which may relate to, and compatible with passive scanning may also be considered to relate to active scanning. Accordingly, various aspects that may relate to and/or compatible with the concept of passive scanning, such as monitoring the communication channel for a beacon, and detecting beacons may also apply to active scanning in this disclosure.

Various aspects of this disclosure may provide a radiohead which may perform an active scan to discover wireless communication networks and/or wireless access points that may provide wireless communication service to the radiohead and/or the communication which includes the radiohead. The radiohead may receive an information, and may perform the active scan to discover wireless communication networks and/or wireless access points and provide information related to the performed scan based on the results of the scan. Various aspects of this disclosure may provide a communication device which may give a task to perform an active scan to a radiohead and operate in a low power mode. Various aspects of this disclosure may allow the communication device to schedule scans for a plurality of radioheads. Various aspects of this disclosure may allow a radiohead to delegate portions of the active scans to a further radiohead.

In an example, the various aspects of this disclosure may be compliant to Wireless Local Area Network (WLAN) which provides communication for a plurality of wireless communication devices using wireless communication to establish a local area network (LAN). The various aspects may, in particular, be compliant with the IEEE 802.11 protocol which is a set of local area network (LAN) protocol that is commonly used for wireless communication systems. In any event, the disclosure and references to the IEEE 802.11 protocol should not be considered as limiting, and the disclosure may apply to the use of the various aspects of this disclosure with any wireless communication technology.

FIG. 29 shows schematically a representation of a probe request frame. In certain examples, a probe request frame may include a medium access control (MAC) header. The medium access control (MAC) header of the probe request frame includes a plurality of information fields. In an example, the medium access control (MAC) header of the probe request frame includes a frame control field 2901 which provides information related to the type of the frame. For example, the frame control field 2901 may include information whether the frame is a probe request frame.

The MAC header also includes a duration field 2902 which may include a duration value based on the type of the frame. The MAC header further includes a destination address field 2903 which the probe request frame is intended for. In an example, the destination address field 2903 of the probe request frame may include an indication that the probe request frame is intended for a specific communication device. The MAC header further includes a sender address field 2904 which includes the address of the medium access control (MAC) entity of the sender of the probe request frame. The MAC header may also include an information field related to the intended receiver entity of the probe request frame (not shown)

The MAC header further includes a basic service set ID (BSS-ID) field 2905 which may include a wildcard indicating that any station may receive the probe request frame. The MAC header includes a sequence control field 2906 which includes information indicating the sequence of the frame. The MAC header includes a frame body field 2907 which will be explained in more detail, and a frame check sequence field 2908 which includes cyclic redundancy check bits.

The frame body field 2907 includes the body of the probe request frame. The frame body field 2907 includes a service set identifier (SSID) field 2912 which includes an identifier of the service set. The service set identifier (SSID) field 2912 may include a wildcard indicating a request for all wireless access points. Alternatively, the service set identifier (SSID) field 2912 may include information indicating the service set from which a probe response signal is expected. Further, the frame body field 2907 includes a supported rates field 2913 which includes information indicating the supported rates. The frame body field 2907 further includes many information fields which are optional 2914.

FIG. 29 shows schematically a representation of a probe response frame. It is clear for a skilled person that a probe response frame includes mandatory portions which are the same as a beacon frame referred in FIG. 22. In certain examples, a probe response frame may include a medium access control (MAC) header. The medium access control (MAC) header of the probe response frame includes a plurality of information fields. In an example, the medium access control (MAC) header of the probe response frame includes a frame control field 3001 which provides information related to the type of the frame. For example, the frame control field 3001 may include information whether the frame is a probe response frame.

The MAC header also includes a duration field 3002 which may include a duration value based on the type of the frame. The MAC header further includes a destination address field 3003 which the probe response frame is intended for. In an example, the destination address field 3003 of the probe response frame may include an indication that the probe response frame is intended for any receivers. The MAC header further includes a sender address field 3004 which includes the address of the medium access control (MAC) entity of the sender of the probe response frame. The MAC header may also include an information field related to the intended receiver entity of the probe response frame (not shown)

The MAC header further includes a basic service set ID (BSS-ID) field 3005 which may include the basic service set ID of the transmitter entity of the probe response frame. The MAC header includes a sequence control field 3006 which includes information indicating the sequence of the frame. The MAC header includes a frame body field 3007 which will be explained in more detail, and a frame check sequence field 3008 which includes cyclic redundancy check bits.

The frame body field 3007 includes the body of the probe response frame. The frame body field 3007 includes a timestamp field 3009 indicating the timestamp of the probe response frame, a beacon interval field 3010 indicating the number of time units between probe response frame transmissions. The number of time units between probe response transmissions may be referred to as "time units (TUs) between target beacon transmission times (TBTTs).

The frame body field 3007 further includes a capability information field 3011 which includes information indicating which capabilities the transmitting entity of the probe response frame has, a service set identifier (SSID) field 3012 which includes an identifier of the service set, a supported rates field 3013 which includes information indicating the supported rates. The frame body field 3007 further includes many information fields which are optional 3014.

FIG. 31 shows schematically an example of a representation of scanning procedure. In an example, a wireless communication device 3101 may determine to perform a scan to identify whether there is a wireless access point which the wireless communication device 3101 may receive a wireless communication service. In an example, the wireless communication device 3101 selects a wireless communication channel to send a probe request signal to detect whether there is a wireless network at which the wireless communication device 3101 may establish a connection.

Accordingly, the wireless communication device 3101 selects 3102 the wireless communication channel, configure 3102 its physical layer (PHY) functions for the selected wireless communication channel. Then, the wireless communication device 3101 transmits a probe request signal 3103. After the probe request signal 3103, the wireless communication device 3101 begins monitoring 3104 the wireless communication channel to identify whether there is a wireless network which provides a probe response signal. In an example, the wireless communication device 3101 may monitor 3103 the selected wireless communication channel for a predefined period of time to identify at least one probe response signal.

In an example, the predefined period of time which the wireless communication channel monitors 3104 the wireless communication channel may be referred to as "dwell time". The term "dwell time" refers to the predefined period of time in which the wireless communication device 3101 monitors the wireless communication channel to receive at least one probe response frame. Practically, a longer dwell time may result in occupying the wireless communication device 3101 only for listening, on which the wireless communication device 3101 may not use bandwidth for regular purposes. A shorter dwell time may result in missing a possible probe response signal for the wireless communication channel, which may result to not being able to identify a wireless network that the wireless communication device 3101 may receive a wireless communication service.

Meanwhile, the wireless communication device 3101 may be in a signal coverage area of a first wireless access point 3105. The first wireless access point 3105 may already provide wireless communication services to other wireless communication devices and may be transmitting/receiving 3106 wireless communication signals. Because, the wireless communication device 3101 is not a client of the wireless network which the first wireless access point 3105 is a member of, the wireless communication device 3101 may not have access to the wireless communication signals which the first wireless access point 3105 transmits.

The first wireless access point 3105 receives the probe request signal which the wireless communication device 3101 transmits and issues a probe response signal 3107 to provide certain information related to the wireless network which the first wireless access point 3105 is a member. After transmitting the probe response signal, the first wireless access point 3105 may return to provide 3108 wireless communication services to other wireless communication devices in the wireless network. Meanwhile, the wireless communication device 3101 receives 3107a the probe response frame.

Similarly, the wireless communication device 3101 may be in a signal coverage area of a second wireless access point 3109. The second wireless access point 3109 may already provide wireless communication services to other wireless communication devices and may be transmitting/receiving 3110 wireless communication signals. Because, the wireless communication device 3101 is not a client of the wireless network which the second wireless access point 3109 is a member of, the wireless communication device 3101 may not have access to the wireless communication signals which the second wireless access point 3109 transmits.

The second wireless access point 3109 receives the probe request signal which the wireless communication device 3101 transmits and issues a probe response signal 3111 to provide certain information related to the wireless network which the second wireless access point 3109 is a member. After transmitting the probe response signal, the second wireless access point 3109 may return to provide 3112 wireless communication services to other wireless communication devices in the wireless network. Meanwhile, the wireless communication device 3101 receives 3111a the probe response frame.

Accordingly, if the predefined period of time of the monitoring which wireless communication device 3101 performs is long enough to overlap the monitoring of the wireless communication channel with the transmission of the probe response signals of the first wireless access point 3105 and the second wireless access point 3109, the wireless communication device 3101 may receive the probe response signal, receive the information provided by the probe response frame and join the wireless network of one of the wireless access points 3105, 3109. In an example, the wireless communication device 3101 sends an association request (AR) to one of the wireless access points 3105, 3109 to join the wireless network.

FIG. 32 shows schematically an example of a radiohead in accordance with various aspects of this disclosure. The radiohead 3201 may include an antenna interface 3202. The antenna interface 3202 is coupled to an antenna 3203. The radiohead 3201 further includes a radio frequency front end 3204. In this example, the radio frequency front end 3204 is coupled to a transceiver chain 3206 which includes one or more processors 3205, and the one or more processors 3205 control the radio frequency front end 3204. In an example, the radio frequency front end 3204 may be coupled to the one or more processors 3205.

The radiohead 3201 receives a wireless communication signal via the antenna 3203. The antenna 3203 provides the wireless communication signal to the antenna interface 3202. The antenna interface 3202 receives the wireless communication signal from the antenna 3203 and provides the wireless communication signal to the radio frequency front end 3204. In an example, the radio frequency front end 3204 may provide the signal to the transceiver chain 3206.

The transceiver chain 3206 may include a down-converter to down-convert the signal. In an example, the transceiver chain 3206 may include a signal converter to convert the wireless communication signal to a digital signal. In an example, the signal converter may provide the wireless communication signal which is converted to the digital signal to the one or more processors 3205. In an example, the signal converter includes an analog-to-digital converter.

The signal converter includes a digital-to-analog converter which receives digital baseband signals from the one or more processors 3205 and converts to an analog signal. The transceiver chain 3206 may include an up-converter to up-convert the analog signal. The radio frequency front end 3204 may include a power amplifier to amplify the signal to be transmitted which provides the wireless communication signal to the antenna interface 3202. The antenna interface transmits the wireless communication signals via the antenna 3203.

In an example, the one or more processors 3205 may include a medium access control (MAC) layer processing unit which provides at least one function or operation related to the medium access control (MAC) layer. In an example, the one or more processors 3205 may include a physical layer (PHY) processing unit which provides at least one function or operation related to the physical (PHY) layer.

In an example, the one or more processors 3205 are coupled to a communication interface 3207. In an example, the communication interface 3207 couples the one or more processors 3205, to the one or more external processors external to the radiohead 3201. In an example, the one or more external processors external to the radiohead 3201 may include one or more communication device processors of the communication device which the radiohead 3201 is coupled to.

In an example, the communication interface 3207 may include a digital interface. In an example, the communication interface 3207 includes a serial digital interface. In an example, the communication interface 3207 may include a serial time encoded protocol (STEP) interface. In an example, the radiohead 3201 may include one or more processors 3205 to control the communication interface 3207. In an example, the one or more processors 3205 to control the communication interface 3207 include a communication interface module 3208.

In an example, the communication interface 3207 may provide communication between the radiohead 3201 and the one or more communication device processors. In an example, the communication interface module 3208 controls the communication for the radiohead 3201. In an example, the communication interface module 3208 may control the communication interface 3207 based on instructions received from the one or more processors 3205. In an example, the one or more processors 3205 may include the communication interface module 3208.

Accordingly, the one or more processors 3205 may perform at least one processing function in accordance with various aspects of this disclosure, and provide the output signal to the communication interface 3207 to provide to the one or more communication device processors for further processing of the output signal of the one or more processors 3205. In an example, the output signal of the one or more processors 3205 may include a data frame, and the one or more communication device processors may perform one or more processing functions for the data frame.

In an example, the one or more processors 3205 may receive an active scan request information from the communication interface 3207. In an example, the one or more radiohead external processors external to the radiohead 3201 may send the active scan request information to the one or more processors 3205 via the communication interface 3207. In an example, the one or more communication device processors may send the active scan request information to the one or more processors 3205 via the communication interface 3207.

In an example, the active scan request information may include an information related to a target wireless communication channel to transmit a probe request. In an example, the target wireless communication channel may include a plurality of wireless communication channels. In an example, the one or more processors 3205 may receive the active scan request information and select the at least one target wireless communication channel based on the information related to the target channel in the active scan request information.

In an example, the active scan request information may include a schedule information for the active scan to be performed. In an example, the schedule information may relate to a time period to perform the active scan for detecting whether at least one probe response signal has been received from at least one target communication channel. In an example, the schedule information may include a time information indicating the time to perform the active scan or the time to transmit the respective probe request signal.

In an example, the time information indicating the time to perform the active scan may refer to an absolute time. In an example, the time information may refer to a time relative to an event. In an example, the event may be the receiving of the active scan request information, performing an active scan, receiving and or transmitting a wireless communication signal, and such. In an example, the time information may refer to a repeating event, as in repeat every 500 ms.

In an example, active scan request information may include a time information indicating a predefined period of time which may include the duration of the probe response detection to be performed. In an example, the predefined period of time which may include the duration of the probe response detection to be performed for at least one target wireless communication channel. In an example, the predefined period of time includes a dwell time for each of the at least one target communication channel. In an example, the time information indicating the duration of the probe response detection to be performed may include a range.

In an example, the active scan request information may include an information related to how the active scan should be performed. In an example, the active scan request information may include an indication to send a probe request signal for a predefined service set ID (SSID). In an example, the active scan request information may include whether the scan may be delegated to another radiohead. In an example, the active scan information may include whether the communication device wants to receive a probe response frame which the probe response signal includes.

In an example, the radiohead 3201 may perform an active scan for identifying wireless access points nearby. The radiohead 3201 may receive the active scan request information from the communication interface 3207 and transmit a probe request signal including a probe request frame based on the active scan request information. In an example, the one or more processors 3205 receives the active scan request information from the one or more communication device processors. In an example, the one or more communication device processors may generate a probe request frame by performing at least one function for the medium access control (MAC) layer. In an example, the active scan request information includes the probe request frame to be transmitted in a probe request signal.

In an example, the one or more communication device processors may generate a plurality of probe request frames for a plurality of communication channels. In an example, the one or more communication device processors may generate a plurality of probe request frames for a plurality of service set IDs (SSID). In an example, the one or more processors 3205 may receive the active scan request information which includes the plurality of probe request frames for a plurality of wireless communication channels. In an example, the one or more processors 3205 may receive the active scan request information which includes the plurality of probe request frames for a plurality of service set IDs (SSID).

In an example, the one or more processors 3205 may receive the active scan request information and the one or more processors 3205 may generate the probe request frame by performing at least one function for the medium access control (MAC) layer. In an example, the one or more processors 3205 may generate a plurality of probe request frames based on the active scan request information for a plurality of wireless communication channels. In an example, the one or more processors 3205 may generate a plurality of probe request frames based on the active scan request information for a plurality of service set IDs (SSID).

In an example, the one or more processors 3205 controls the radiohead to transmit a probe request signal including a probe request frame based on the active scan request information. In an example, the one or more processors 3205. In an example, the active scan request information includes an indication to initiate an active scan immediately for a communication channel with a dwell time of 50 ms. The one or more processors 3205 accordingly selects the communication channel according to the active scan request information, and controls the up-converter and the radio frequency end to transmit a probe request signal, and transmits the probe request signal which includes the generated probe request frame. After transmitting the probe request signal, the one or more processors 3205 begin to monitor the communication channel in accordance with various aspects of this disclosure to detect a probe response signal for a predefined duration, which is in this example 50 ms.

In an example, the radiohead 3201 may include a probe response detecting circuit or a probe response detector 3209 to detect whether at least one probe response signal has been received from at least one target communication channel in response to the probe request signal when the one or more processors 3205 monitors the communication channel in accordance with various aspects of this disclosure. In an example, the probe response detector 3209 may detect whether the signal the one or more processors 3205 received fulfils a detection criterion or a plurality of detection criteria.

In an example, the one or more processors 3205 may include a physical (PHY) layer processing unit to obtain at least a portion of a physical (PHY) layer data frame which the received wireless communication signal includes. In an example, the one or more processors 3205 may include a medium access control (MAC) layer processing unit to obtain a portion of the data frame from the physical (PHY) layer data frame. In an example, the portion of the data frame which the medium access control (MAC) layer processing unit obtains may include a medium access control (MAC) frame. In an example, the one or more processors 3205 obtain at least the portion of the data frame which includes an identifier indicating that the data frame includes a probe response frame.

In an example, the one or more processors 3205 may include a modulator/demodulator to demodulate the digital signal. In an example, the one or more processors 3205 may include an orthogonal frequency division multiplexing (OFDM) modulator/demodulator. In an example, the one or more processors 3205 may include a complementary code keying (CCK) modulator/demodulator. In an example, the one or more processors 3205 may include a complementary code keying—orthogonal frequency division multiplexing (CCK-OFDM) modulator/demodulator. In an example, the one or more processors 3205 may include a demodulator which is configured to demodulate a portion of the received wireless communication signal which an identifier indicating that the data frame includes a probe response signal.

In an example the one or more processors 3205 may obtain the at least a portion of the data frame in accordance with various aspects of this disclosure from the received wireless communication signal during the monitoring, and the one or more processors 3205 may provide the at least the portion of the data frame which may include an identifier indicating that the data frame includes a probe response signal to the probe response detector 3209. In an example, the one or more processors 3205 may provide the data frame to the probe response detector 3209. In an example, the probe response detector 3209 may determine whether at least one probe response signal has been received from at least one target communication channel based on the data frame or the portion of the data frame which the probe response detector 3209 receives.

In an example, the data frame which the probe response detector 3209 receives includes a medium access control (MAC) header, and the probe response detector 3209 may identify the frame control field of the data frame which the probe response detector 3209 receives. In an example, the probe response detector 3209 may detect whether the data frame includes a probe response signal based on the frame control field of the data frame. In an example, the probe response detector 3209 may identify the type of the data frame from the frame control field of the data frame.

In an example, the medium access control (MAC) header includes an information indicating a service set identifier (SSID) or a basic service set identifier (BSSID), and the probe response detector 3209 may determine whether the medium access control (MAC) header includes a service set identifier/SSID) or a basic service set identifier (BSSID) that the active scan request information includes.

In an example, the one or more processors 3205 may perform a medium access control (MAC) layer 2 filtering operation to identify an address information from the probe response signal. In an example, the one or more processors 3205 may identify the medium access control (MAC) address which the probe response signal is sent from. In an example, the data frame which the one or more processors 3205 provide to the probe response detector 3209 may include the medium access control (MAC) address which the probe response is sent from. In an example, the probe response detector 3209 may determine whether the probe response signal is received based on the medium access control (MAC) address of the data frame.

The probe response detector 3209 receives an input signal and performs a probe response detection to detect whether at least one probe response signal has been received from at least one target communication channel. In an example, the probe response detector 3209 selects a wireless communication channel to perform the probe detection based on the active scan request information to select the at least one target communication channel. In an example, the probe response detector 3209 selects a wireless communication channel to perform the probe response detection based on a received active scan response information from another radiohead. In an example, the probe response detector 3209 selects a wireless communication channel based on a received probe listening request.

In an example, the one or more processors 3205 may measure at least one metric of the wireless communication signal received from the selected wireless communication channel to identify the wireless communication signal. In an example, the one or more processors 3205 may determine if the signal strength of the wireless communication signal received from the selected wireless communication channel is above a predefined signal threshold.

In an example, the one or more processors 3205 may calculate an autocorrelation of the wireless communication signal received from the selected wireless communication channel. In an example, the one or more processors 3205 may determine whether the calculated autocorrelation of the wireless communication signal received from the selected wireless communication channel is above a predefined autocorrelation threshold.

In an example, the one or more processors 3205 may generate an active scan response information. The active scan response information may include information related to the probe request signal. In an example, the active scan response information includes an indication to whether a probe request signal has been transmitted by the radiohead. In an example, the active scan response information includes an indication of a delegation request. In an example, the active scan response information includes an indication to delegate the monitoring for a probe response signal to be received in response to the probe request signal. In an example, the active scan response information includes an identification information to identify a probe response signal to be received in response to the probe request signal.

In an example, the one or more processors 3205 may generate the active scan response information based on the performed probe response detection of whether at least one probe response signal has been received from at least one target communication channel. In an example, the active scan response information may include an information indicating whether at least one probe response signal has been received from at least one target communication channel. In an example, the probe response detector 3209 may select a plurality of wireless communication channels to perform the probe detection, and the probe response detector 3209 may generate the active scan response information whether at least one probe response signal has been received from the plurality of the wireless communication channels.

In an example, the probe response detector 3209 may generate the active scan response information based on the performed probe response detection, and the active scan response information may include information related to the performed probe response detection. In an example, the active scan response information may include a bitmap information for the one or more selected wireless communication channels in which the probe response detector 3209 detects a probe response signal. In an example, the active scan response information may include a time information indicating the time and/or duration of the performed probe response detection. In an example, the active scan response information may include the probe response frame.

The one or more processors 3205 receive the active scan request information and perform the probe response detection based on the active scan request information. In an example, the one or more processors 3205 receive the active scan request information and control the probe response detector 3209 based on the information in the active scan request information. In an example, the one or more processors 3205 may store the active scan request information to a memory.

In an example, the one or more processors 3205 may include a radio frequency sequencer. In an example, the one or more processors 3205 may control the radio frequency sequencer based on the schedule information in the active scan request information to transmit the probe request signal according to the schedule information in the active scan request information. In an example, the one or more processors 3205 control the radio frequency front end 3204 based on the active scan request information. In an example, the one or more processors 3205 may control other components of the transceiver chain 3206 based on the active scan request information.

In an example, the one or more processors 3205 may identify that the radio frequency front end 3204 is in an idle mode, at which the radio frequency front end 3204 does not receive wireless communication signals. In an example, the one or more processors 3205 may identify that based on an information that is related to the tasks which the one or more processors 3205 may schedule for the radio frequency front end 3204. In an example, the one or more processors 3205 may detect that the radio frequency front end 3204 is in the idle mode.

In an example, the one or more processors 3205 may identify that the radio frequency front end 3204 will not be at the idle mode to monitor the communication channel for a probe response signal in response to the probe request signal according to the active scan request information. In response to identifying that the radio frequency front end 3204 will not be in an idle mode at the time which the one or more processors 3205 monitors the communication channel, the one or more processors 3205 may generate an indication to delegate the monitoring of the probe response signal to be received in response to the probe request signal.

In an example, the one or more processors 3205 may transmit the probe request signal based on the active scan request information when the radio frequency front end 3204 is in the idle mode. In an example, the one or more processors 3205 may monitor the wireless communication channel based on the active scan information when the radio frequency front end 3204 is in the idle mode. In an example, the active scan request information may include a schedule information indicating to perform the active scan at the next idle time, and the one or more processors 3205 may perform the active scan at the next idle time for the radio frequency front end 3204, which the radio frequency front end 3204 is in the idle mode.

In an example, the one or more processors 3205 may provide the active scan response information for the probe request signal based on the active scan request information to the one or more communication device processors of the communication device. In an example, the one or more processors 3205 may provide the active scan response information to the communication interface 3207. In an example, the one or more processors 3205 may control the communication interface module 3208 to provide the active scan response information to the one or more radiohead external processors. In an example, the one or more radiohead external processors may include the one or more communication device processors to which the one or more radiohead processors are coupled via the communication interface 3207.

In an example, the communication interface 3207 may operate in a low power mode. In an example, the low power mode may include a sleep mode. In this example, the one or more processors 3205 may send an indication to the communication interface 3207 to wake up the communication interface 3207 from the low power mode. In an example, the indication includes a wake-up signal. In an example, the one or more processors 3205 may send the indication after the energy detection module generates the active scan response information to provide the active scan response information to the one or more communication device processors.

In an example, the one or more radiohead external processors may operate in a low power mode. In an example, the low power mode may include a sleep mode. In this example, the one or more processors 3205 may send an indication to the communication interface 3207 to wake up the one or more radiohead external processors from the low power mode. In an example, the indication may include a wake-up signal. In an example, the one or more processors 3205 may send the indication after the energy detection module generates the active scan response information to provide the active scan response information to the one or more communication device processors. In an example, the one or more radiohead external processors include the one or more communication device processors which the one or more radiohead processors are coupled to via the communication interface 3207.

FIG. 33 shows schematically an example of a communication device. The communication device 3301 includes a communication device processor 3302. The communication device further includes a first radiohead 3303 which includes a first processor 3304 and a transmit/receive module 3305 to transmit and receive wireless communication signals. The communication device 3301 further includes a second radiohead 3306 which includes a second processor 3307 and a transmit/receive module 3308 to transmit and receive wireless communication signals. In an example, the second radiohead 3306 may be referred as a probe response listening radiohead, and the second processor 3307 may be referred to as a probe response listening radiohead processor.

The communication device processor 3302, the first processor 3304, and the second processor 3307 may communicate with each other via the communication interface 3309. In an example, each of the communication device processor 3302, the first processor 3304, and the second processor 3307 may include an interface module to control the communication interface and the communication via a communication interface 3309.

In an example, the communication device processor 3302 determines to make the first radiohead 3303 to perform an active scan for a wireless communication channel. Accordingly, the communication device processor 3302 generates an active scan request information. In an example, the active scan information includes an information indicating a wireless communication channel which the first radiohead 3303 perform the active scan, and a time information indicating the time for the first radiohead 3303 to perform the active scan. The communication device processor 3302 sends the generated active scan request information to the first processor 3304.

In an example, the first radiohead 3303 may be already in communication with a wireless access point and transmitting and receiving wireless communication channel via the transmit/receive module 3308. The first processor 3304 receives the active scan request information and schedules the task of performing the active scan based on the time information indicating the time for the first radiohead 3303 to perform the scan.

In an example, the first radiohead 3303 determines to transmit a probe request signal including a probe request frame according to the active scan request information which the first processor 3304 receives from the communication device processor 3302, but to delegate the task to monitor the wireless communication channel to receive a probe response signal in response to the probe request signal to the second radiohead 3306.

Accordingly, the first radiohead 3303 generates a probe request frame according to the active scan request information. The first radiohead 3303 generates the probe request signal including the probe request frame, selects the wireless communication channel which the active scan request information indicates. Further, the first processor 3304 generates an active scan response information including an identification information to identify a probe response signal to be received in response to the probe request signal.

The active scan response information includes an information indicating the wireless communication channel which the first processor 3304 selected to transmit the probe request signal. In an example, the active scan response information may include the medium access control (MAC) layer address of the first radiohead 3303. Further, the first processor 3304 generates an indication to delegate the monitoring of the probe response signal to be received in response to the probe request signal to the second radiohead 3306. The active scan response information includes the indication to delegate the monitoring of the probe response signal to be received in response to the probe request signal.

Further, the first processor 3304 also generates a scheduling information which indicates a period of time which the first radiohead 3303 is going to transmit the probe request signal, so that the second radiohead 3306 starts to monitor the communication channel based on the scheduling information, and includes the scheduling information into the active scan response information. The first radiohead 3303 provides the active scan response information to the communication interface in order to provide the active scan response information to the second processor.

The first processor 3304 controls the transmit/receive module 3305 to transmit a wireless communication signal at the selected wireless communication channel and to transmit the probe request signal to the selected wireless communication channel. The transmit/receive module 3305 transmits the probe request signal to the selected wireless communication channel.

The second processor receives the active scan response information from the first radiohead 3303 and identifies that the active scan response information includes the indication to delegate the monitoring of the probe response signal to be received in response to the probe request signal. In an example, the active scan response information which the second processor receives from the first radiohead 3303 may be referred to as a probe listening request.

The second processor controls the transmit/receive module 3308 based on the scheduling information at the period of time which the active scan response information includes in order to receive wireless communication signals from the communication channel which the active scan response information indicates, and the second processor monitors the communication channel to detect whether a probe response signal is received in accordance with various aspects of this disclosure.

In an example, the second radiohead 3306 receives a wireless communication signal and the second processor detects the probe response signal which the active scan response information indicates. In an example, the transmit/receive module 3308 of the second radiohead 3306 receives a wireless communication channel and the second processor performs at least one physical layer (PHY) operation and at least one medium access control (MAC) layer operation to obtain a data frame including a medium access control (MAC) frame. The second processor identifies that the medium access control (MAC) frame indicates that the data frame is sent to the first radiohead 3303 according to the medium access control (MAC) address information which the medium access control (MAC) frame includes. In another example, the medium access control (MAC) frame may indicate that the data frame is sent to the communication device 3301.

In an example, the second processor provides the data frame to the communication interface in order to provide the data frame to the communication device processor 3302. In this example, the communication device processor 3302 may also include a medium access control (MAC) layer processing unit to perform at least one medium access control (MAC) operation. In an example, the communication device processor 3302 may also include a physical (MAC) layer processing unit to perform at least one physical (PHY) layer operation. The communication device processor 3302 may obtain the probe response frame by performing at least one medium access control (MAC) operation.

FIG. 34 shows schematically an example of a communication device in accordance with various aspects of this disclosure. The communication device 3401 includes one or more communication device processors 3402. The one or more communication device processors 3402 may include a baseband controller which may control a baseband signal processor of a plurality of radioheads. In an example, the one or more communication device processors 3402 includes a physical layer/medium access control layer (PHY/MAC) processing unit 3403 that includes a medium access control (MAC) layer processing unit which implements one or more medium access control (MAC) layer functions, and a physical (PHY) layer processing unit which implements one or more physical (PHY) layer functions.

The one or more communication device processors 3402 is connected to a communication interface 3405. In an example, the communication interface 3405 may include a digital interface. In an example, the communication interface 3405 includes a serial digital interface. In an example, the communication interface 3405 may include a serial time encoded protocol (STEP) interface. In an example, the one or more communication device processors 3402 may control the communication interface 3405 via an interface module 3404.

Further, the communication device 3401 includes a plurality of radioheads 3406, 3411, 3416. In an example, the plurality of radioheads 3406, 3411, 3416 may include a plurality of radioheads in accordance with various aspects of this disclosure. In particular, the plurality of radioheads 3406, 3411, 3416 may include a plurality of radiohead in accordance with one of the examples of the radiohead in FIG. 32 or FIG. 33.

The communication device 3401 includes a first radiohead 3406 which includes an interface module 3407 to control the communication between the first radiohead 3406 and the one or more communication device processors 3402 via the communication interface 3405. The first radiohead 3406 further includes a first processor 3408 and a probe response detector 3409 in accordance with various aspects of this disclosure. In an example, the first processor 3408 may include at least a portion of the probe response detector 3409. In an example, the first processor 3408 may control the probe response detector 3409.

The first radiohead 3406 may further include a first transmit/receive (TX/RX) module 3410 to receive and/or transmit wireless communication signals. In an example, the first TX/RX module 3410 may include an antenna interface and a radio frequency front end. In an example, the first TX/RX module 3410 may also include at least a portion of a transceiver chain. In an example, the first processor 3408 may provide one or more physical (PHY) layer functions and one or more medium access control (MAC) layer functions.

The first radiohead 3406 may be connected to the communication interface 3405, which couples the first processor 3408 to the one or more communication device processors 3402. In an example, the first radiohead 3406 includes a radiohead in accordance with various aspects of this disclosure. In an example, the first radiohead 3406 may include a memory to store digital communication signals or the data related to the communication signals. In an example, the data related to the communication signals may include a physical (PHY) layer protocol data unit (PPDU), and/or a medium access control (MAC) layer data units including a medium access control (MAC) layer service data units (MSDUs) and/or a medium access control (MAC) layer protocol data units (MPDUs). In an example, the first radiohead 3406 may include an interface module in accordance with various aspects of this disclosure to control the communication interface 3405.

The communication device 3401 may further include a second radiohead 3411 which includes an interface module 3412 to control the communication between the second radiohead 3411 and the one or more communication device processors 3402 via the communication interface 3405. The second radiohead 3411 further includes a second processor 3413 and a second probe response detector 3414 in accordance with various aspects of this disclosure. In an example, the second processor 3413 may also include at least a portion of the second probe response detector 3414. In an example, the second processor 3413 may control the second probe response detector 3414.

The second radiohead 3411 may further include a second transmit/receive (TX/RX) module 3415 to receive and/or transmit wireless communication signals. In an example, the second TX/RX module 3415 may include an antenna interface, and a radio frequency front end. In an example, the second TX/RX module 3415 may also include at least a portion of a transceiver chain. In an example, the second processor 3413 may provide one or more physical (PHY) layer functions and one or more medium access control (MAC) layer functions.

The second radiohead 3411 may be connected to the communication interface 3405, which couples the second processor 3413 to the one or more communication device processors 3402. In an example the second radiohead 3411 includes a radiohead in accordance with various aspects of this disclosure. In an example, the second radiohead 3411 may include a memory to store digital communication signals or the data related to the communication signals. In an example, the data related to the communication signals may include a physical (PHY) layer protocol data unit (PPDU), and/or a medium access control (MAC) layer data units including a medium access control (MAC) layer service data units (MSDUs) and/or a medium access control (MAC) layer protocol data units (MPDUs). In an example, the second radiohead 3411 may include an interface module in accordance with various aspects of this disclosure to control the communication interface 3405.

The communication device 3401 may further include a third radiohead 3416 which includes an interface module 3417 to control the communication between the third radiohead 3416 and the one or more communication device processors 3402 via the communication interface 3405. The third radiohead 3416 further includes a third processor 3418 and a third probe response detector 3419 in accordance with various aspects of this disclosure. In an example, the third processor 3418 may also include at least a portion of the third probe response detector 3419. In an example, the third processor 3418 may control the third probe response detector 3419.

The third radiohead 3416 may further include a third transmit/receive (TX/RX) module 3420 to receive and/or transmit wireless communication signals. In an example, the third TX/RX module 3420 may include an antenna interface, and a radio frequency front end. In an example, the third TX/RX module 3420 may also include at least a portion of a transceiver chain. In an example, the third processor 3418 may provide one or more physical (PHY) layer functions and one or more medium access control (MAC) layer functions.

The third radiohead 3416 may be connected to the communication interface 3405, which couples the third processor 3418 to the one or more communication device processors 3402. In an example, the third radiohead 3416 includes a radiohead in accordance with various aspects of this disclosure. In an example, the third radiohead 3416 may include a memory to store digital communication signals or the data related to the communication signals. In an example, the data related to the communication signals may include a physical (PHY) layer protocol data unit (PPDU), and/or a MAC layer data units including a medium access control (MAC) layer service data units (MSDUs) and/or a medium access control (MAC) layer protocol data units (MPDUs). In an example, the third radiohead 3416 may include an interface module in accordance with various aspects of this disclosure to control the communication interface 3405.

In an example, the communication device processor 3402 determines to make the first radiohead 3406 to perform an active scan for a wireless communication channel. Accordingly, the communication device processor 3402 generates a first active scan request information. In an example, the first active scan information includes an information indicating a plurality of wireless communication channels which the first radiohead 3406 is tasked to perform the active scan, and a time information indicating the time for the first radiohead 3406 to perform the active scan for each of the plurality of wireless communication channels. The communication device processor 3402 sends the first active scan request information to the first processor 3408.

In an example, the communication device processor 3402 determines to make the second radiohead 3411 to perform an active scan for a wireless communication channel. Accordingly, the communication device processor 3402 generates a second active scan request information. In an example, the second active scan information includes an information indicating a plurality of wireless communication channels which the second radiohead 3411 is tasked to perform the active scan, and a time information indicating the time for the second radiohead 3411 to perform the active scan for each of the plurality of wireless communication channels. The communication device processor 3402 sends the second active scan request information to the second processor 3413.

In an example, the one or more communication device processors 3402 do not schedule because the third radiohead 3416 may be a client to a wireless network and may be receiving and transmitting wireless communication signals. In an example, the one or more communication device processors 3402 may already have scheduled scans for the third radiohead 3416. In an example, the one or more communication device processors 3402 may already have scheduled the third radiohead for an energy scan or a passive scan in accordance with various aspects of this disclosure.

In an example, the one or more communication device processors 3402 starts to operate in a low power mode after providing the first active scan request information to the first radiohead 3406, and the second active scan requests information to the second radiohead 3411. In an example, the one or more communication device processors 3402 controls the communication interface 3405 to operate in a low power mode after providing the first active scan request information to the first radiohead 3406, and the second active scan request information to the second radiohead 3411.

FIG. 35A shows an example of the information which a first active scan request information may include in accordance with various aspects of this disclosure. FIG. 35B shows an example of the information which a second active scan request information may include in accordance with various aspects of this disclosure.

The first active scan request information may include for each of a plurality of target communication channels in the first active scan request information, a channel identifier 3501, a time information 3502 which the first radiohead is going to perform the schedule for the respective channel, a predefined period of time to monitor 3503 the respective channel, the frequency band 3504 of the respective channel, and a service set identifier (SSID) information 3505. Similarly, the second active scan request information may include for each of a plurality of target communication channels in the second active scan request information, a channel identifier 3511, a time information 3512 which the first radiohead is going to perform the schedule for the respective channel, a predefined period of time to monitor 3513 the respective channel, the frequency band 3514 of the respective channel, and a service set identifier (SSID) information 3515.

Referring back to FIG. 34, the examples may include the first active scan request information including the information schematized in FIG. 35A, and the second active scan request information including the information schematized in FIG. 35B. Accordingly, the one or more communication device processors 3402 generates the first active scan request information according to FIG. 35A, and the second active scan request information according to FIG. 35B.

In an example, the first radiohead 3406 receives the first active scan request information from the one or more communication device processors 3402 via the communication interface 3405. The first processor 3408 may control the first TX/RX module 3410 to transmit a probe request signal including a probe request frame based on the active scan information on channel #1. In this example, the active scan information includes a plurality of probe request frames for each of the plurality of wireless communication channels. After transmitting the probe request signal, the first processor 3408 instruct the first TX/RX module to receive wireless communication channels from channel #1, and to monitor channel #1 to identify a probe response signal for 40 ms based on the first active scan request information immediately.

In an example, the first processor 3408 may perform a preamble detection by calculating the autocorrelation of the signals received from channel #1. The first processor 3408 does not identify any wireless communication signals according to the preamble detection and finalizes the monitoring of channel #1. In an example, the first processor 3408 may detect that the first TX/RX module 3410 will be idle for 200 ms after 1200 ms. The first processor 3408 schedules the active scan for channel #2 to the first idle period which is expected after 1200 ms.

In an example, the first processor 3408 controls the first TX/RX module 3410 to transmit a probe request signal including a probe request frame based on the active scan information on channel #2. After transmitting the probe request signal, the first processor 3408 instructs the first TX/RX module to receive wireless communication channels from channel #2 and starts to monitor channel #2 to identify a probe response signal for 40 ms based on the first active scan request information. In an example, the first processor 3408 identifies a wireless communication signal according to the preamble detection during the duration of the monitoring channel #2.

The first processor 3408 may demodulate the received wireless communication signal. In an example, the received wireless communication signal includes a complementary code keying (CCK) modulated header portion. In an example, the first processor 3408 includes a complementary code keying (CCK) demodulator to demodulate the received signal. In an example, the first processor 3408 may perform physical (PHY) layer operations and medium access control layer (MAC) operations to obtain a data frame from the received wireless communication signal. The data frame includes a medium access control (MAC) header.

The first processor 3408 may provide at least the medium access control (MAC) header to the probe response detector 3409. In an example, the first processor 3408 may provide the data frame which includes the medium access control (MAC) header to the probe response detector 3409. Accordingly, the probe response detector 3409 detects if the communication probe response has been received based on whether the signal which the first processor 3408 receives for channel #2 fulfils a detection criterion.

The probe response detector 3409 uses the detection criterion as the frame control field of the medium access control (MAC) header. The probe response detector 3409 receives the medium access control (MAC) header which the first processor 3408 provides and the probe response detector 3409 identifies the frame control field of the medium access control (MAC) header and checks whether the information indicating the type of the data frame refers to a probe response signal.

In another example, the probe response detector 3409 may use the detection criterion as the address of the sender of the data frame in the medium access control (MAC) header. In this example, the probe response detector 3409 may identify the sender address and may determine whether the data frame comes from a sender which may be a predefined wireless access point. In an example, the probe response detector 3409 may determine whether the data frame comes from a sender which may be a predefined wireless access point from a memory. In an example, the first active scan request information may include an information indicating at least one address of a wireless access point.

The probe response detector 3409 may also identify the sender address in order to filter some of the probe response frames. In this example, the probe response detector 3409 determines whether the sender address is a trusted sender address. The information of at least one trusted sender address may be located in a memory. In an example, the first active scan request information may include an information indicating at least one address of a trusted sender. In this example, the probe response detector 3409 also determines that a list which is in a memory of the first radiohead 3406 includes the sender address of the data frame.

Accordingly, the probe response detector 3409 generates a first active scan response information. The first active scan response information includes an information that a probe response signal is detected. The first active scan response information further includes an information indicating that the probe response signal has been detected at channel #2. The probe response detector 3409 also includes the probe response frame received from channel #2 to the first active scan response information.

Further, the first processor 3408 may control the first TX/RX module 3410 to transmit a probe request signal and receive wireless communication channels from channel #6, and to monitor channel #6 after 2 seconds from receiving the first active scan request information to identify a communication probe response signal for 40 ms based on the first active scan request information. However, the first processor 3408 does not detect a wireless communication signal on channel #6 during the monitoring for 80 ms.

After the first processor 3408 has performed all scans provided in the first active scan request information, the first processor 3408 determines to provide the generated first active scan response information to the one or more communication device processors 3402. While the first radiohead 3406 performs the scans based on the first active scan request information, the second radiohead 3411 concurrently performs the scans in a manner similar to the first radiohead 3406 according to the second active scan request information, while, in an example, the third radiohead 3416 receive and transmit wireless communication signals to a wireless network. In an example, after performing similar operations to the first radiohead 3406, the second radiohead 3411 detects the communication probe response signal on channel #5, and generates a second active scan response information based on the detection which includes an information indicating that the probe response signal has been detected at channel #5 with the probe response frame received from channel #5.

In an example, after providing a generated active scan request information to the respective radioheads, the one or more communication device processors 3402 may operate in a low power mode. In an example, the one or more communication device processors 3402 may control the communication interface 3405 to make the communication interface 3405 operate in a low power mode to reduce power consumption. In an example, operating in the low power mode for the one or more communication device processors 3402 may include providing a control signal to a circuit to power gate the one or more communication device processors 3402, or to power gate the physical (PHY) layer processing unit and the medium access control (MAC) layer unit of the one or more communication device processors 3402.

In an example, in response to the generation of the first active scan response information, the first processor 3408 provides a wake-up signal to the one or more communication device processors 3402 in order to wake up the one or more communication device processors 3402. In an example, the interface module 3407 may provide the wake-up signal to the communication interface 3405 in order to wake up the one or more communication device processors 3402. In an example, the interface module 3407 may control the communication interface 3405, and interface module 3407 may wake up the communication interface 3405 in response to the generation of the first active scan response information. In an example, the first processor 3408 may provide the first active scan response information after the one or more communication device processors 3402 receive the wake-up signal.

In an example, the one or more communication device processors 3402 receive the wake-up signal and start operating in a normal mode which is not the low power mode. In an example, the one or more communication device processors 3402 receive the first active scan response information from the first radiohead 3406, and the second active scan response information from the second radiohead 3411 after start operating in a normal mode, which is not the low power mode.

In an example, the one or more communication device processors 3402 receive the probe response frame detected on channel #2 from the first radiohead 3406 and perform one or more medium access control (MAC) layer functions with the probe response frame. In an example, the one or more communication device processors 3402 receive the probe response frame detected on channel #5 from the second radiohead 3411 and perform one or more medium access control (MAC) layer functions with the probe response frame.

FIG. 36 shows schematically an example of a communication flow in accordance with the various aspects of this disclosure. The communication flow shows a communication flow between a communication device processor 3601, a first radiohead 3602, and a second radiohead 3603. In an example, the first radiohead 3602 includes a first radiohead processor, and a second radiohead 3603 includes a second radiohead processor. The first radiohead 3602, and the second radiohead 3603 includes a radiohead in accordance with various aspects of this disclosure, especially the first radiohead 3602 and the second radiohead 3603 referred to in FIG. 34.

In an example, the communication device processor 3601 determines to perform an active scan on determined communication channels. Based on the determination, the communication device processor 3601 sends a first active scan request information 3604 to the first radiohead 3602. The first active scan request information 3604 includes an active scan request information in accordance with various aspects of this disclosure. In an example, the first active scan request information 3604 may include an indication for the first radiohead 3602 to schedule an active scan for channel #1, channel #2, and channel #3 for a time period of 40 ms to perform the active scan for each of the channels.

The communication device processor 3601 further sends a second active scan request information 3605 to the second radiohead 3603. The second active scan request information 3605 includes a second active scan request information in accordance with various aspects of this disclosure. In an example, the second active scan request information 3605 may include an indication for the second radiohead 3603 to schedule an active scan for channel #4, channel #5, and channel #6 for a time period of 100 ms to perform the active scan for each of the channels.

After sending the first channel information and the second channel information, the communication device processor 3601 begins 3606 to operate in low power mode. In an example, the communication device processor 3601 also controls 3606 the communication interface which provides communication between the communication device processor 3601, the first radiohead 3602, and the second radiohead 3603 to operate in low power mode as well.

The first radiohead 3602 receives the first active scan request information 3604 and performs 3607 the active scan based on the first active scan request information 3604. The first radiohead 3602 performs 3607 an active scan for channel #1, channel #2, and channel #3. The first radiohead 3602 generates 3607 a first active scan response information based on the active scans for channel #1, channel #2, and channel #3. In response to the generation of the first active scan response information, the first radiohead 3602 identifies 3607 that at least one of the communication interface or the communication device processor 3601 operates in the low power mode.

Accordingly, the first radiohead 3602 sends a wake-up signal 3608 to wake up at least one of the communication interface or the communication device processor 3601 from the low power mode. After sending the wake-up signal, the first radiohead 3602 further sends the active scan response information 3609 to the communication device processor 3601.

The second radiohead 3603 receives the second active scan request information 3605 and performs 3610 the active scan based on the second active scan request information 3605. The second radiohead 3603 performs 3610 active scans for channel #4, channel #5, and channel #6. The second radiohead 3603 generates 3610 a second active scan response information based on the active scans for channel #4, channel #5, and channel #6.

In response, the second radiohead 3603 does not identify 3610 that at least one of the communication interface or the communication device processor 3601 operates in the low power mode, because the first radiohead 3602 had made the at least one of the communication interface or the communication device processor 3601 to operate in normal mode. Accordingly, the second radiohead 3603 further sends the active scan response information 3611 to the communication device processor 3601.

In an example, a communication device may include, a computer-readable medium including instructions stored thereon, that if executed by a processor, implement a method including receiving an active scan request information including at least the probe request frame to be transmitted from a communication device processor; transmitting a probe request signal including the probe request frame received from the communication device processor based on the active scan request information; generating an active scan response information including information related to the probe request signal; providing the active scan response information to a communication interface; the communication interface configured to couple the processor to one or more radiohead circuit-external processors external to the radiohead circuit.

In accordance with various aspects of this disclosure, a device, in particular, a communication device may include a memory, and one or more processors, such as processing circuitry 810 and memory 820 referring back to FIG. 8. The memory 820 may be implemented as a computer-readable medium including instructions stored thereon, that if executed by a processor implement a method including: receiving an active scan request information including at least the probe request frame to be transmitted from a communication device processor; transmitting a probe request signal including the probe request frame received from the communication device processor based on the active scan request information; generating an active scan response information including information related to the probe request signal; providing the active scan response information to a communication interface; the communication interface configured to couple the processor to one or more radiohead circuit-external processors external to the radiohead circuit.

FIG. 37 shows schematically an example of method steps in accordance with various aspects of this disclosure. The method may include receiving an active scan request information including at least the probe request frame to be transmitted from communication device processor; transmitting the probe request signal including the probe request frame received from the communication device processor based on the active scan request information; generating an active scan response information including information related to the probe request signal; providing the active scan response information to a communication interface; the communication interface configured to couple the processor to one or more radiohead circuit-external processors external to the radiohead circuit.

In accordance with various aspects of this disclosure, each radiohead in a communication device may have various voltage and/or electrical current supply needs based on many reasons including the complexity of a radiohead, the features which the radiohead may support in accordance with various aspects of this disclosure, different use cases for each of the radioheads, the wireless communication technologies which the radiohead may support, and the power required to amplify the wireless communication signals which the radiohead receives and/or transmits.

Various aspects of this disclosure may provide a radiohead which may estimate the supply needs of the radiohead, and/or a circuit of the radiohead and provide a supply indication according to the estimated supply needs. Various aspects of this disclosure may provide a radiohead which estimates the supply needs of the radiohead according to a control information to control a receiving and/or transmitting function of the radiohead and estimate the supply needs based on the received control information. Various aspects of this disclosure may provide a radiohead which may provide a supply indication based on the estimated supply needs to receive a supply based on the estimated supply needs.

FIG. 38 shows schematically an example of a radiohead in accordance with various aspects of this disclosure. The radiohead 3801 includes a wireless local area network front end 3802 to receive and/or transmit wireless local area network (WLAN) communication signals, a Wireless Local Area Network (WLAN) transceiver chain 3803 which may include a down-converter to down-convert the received Wireless Local Area Network (WLAN) signal, an up-converter to up-convert a Wireless Local Area Network (WLAN) signal to be transmitted, a signal converter module which may include an analog-to-digital converter to convert down-converted Wireless Local Area Network (WLAN) signal to a digital signal and a digital-to-analog converter to convert a digital signal to provide an analog Wireless Local Area Network (WLAN) signal to the up-converter.

In an example, the radiohead 3801 may include only a portion of the Wireless Local Area Network (WLAN) transceiver chain for transmitting and/or receiving Wireless Local Area Network (WLAN) communication signals, and a communication device to which the radiohead 3801 is coupled may include the complementary portion of the Wireless Local Area Network (WLAN) transceiver chain. The radiohead 3801 further includes a processor 3804 which is coupled to a communication interface 3805. In an example, the communication interface 3805 may couple the processor 3804, to a radiohead external processor which is external to the radiohead 3801.

In an example, the communication interface 3805 may include a digital interface. In an example, the communication interface 3805 includes a serial digital interface. In an example, the communication interface 3805 may include a serial time encoded protocol (STEP) interface. In this example, the processor 3804 controls the communication interface 3805. In an example, the processor 3804 may include a communication interface module to control the communication interface 3805.

The radiohead 3801 may further include a Bluetooth (BT) radio frequency front end 3806 to receive and/or transmit Bluetooth wireless communication signals, a Bluetooth (BT) transceiver chain 3607 which may include a down-converter to down-convert the received Bluetooth (BT) signal, an up-converter to up-convert a Bluetooth (BT) signal to be transmitted, a signal converter module which may include an analog-to-digital converter to convert a down-converted Bluetooth (BT) signal to a digital signal and a digital-to-analog converter to convert a digital signal to provide an analog Bluetooth (BT) signal to the up-converter. The radiohead 3801 further includes a Bluetooth (BT) baseband processor to process baseband Bluetooth (BT) signals.

In an example, each of the modules of the radiohead 3801, including the Wireless Local Area Network (WLAN) radio frequency front end 3802, the Wireless Local Area Network (WLAN) transceiver chain 3803, the processor 3804, the Bluetooth (BT) radio frequency front end 3806, the Bluetooth (BT) transceiver chain 3807, the Bluetooth (BT) baseband processor 3808, includes one or more circuits which may provide operations related to these blocks, and these circuits require an electrical supply to perform.

In an example, the radiohead 3801 may be communicating with a radiohead external processor which is coupled to the processor 3804 via the communication interface. In an example, the radiohead external processor includes a communication device processor of the communication device to which the radiohead 3801 is coupled to. In an example, the communication device processor sends a control information to the radiohead 3801 to control a receiving and/or transmitting of a communication signal via a radio frequency front end.

The processor 3804 receives the control information via the communication interface 3805. In an example, the control information includes an indication related to an instruction from the communication device processor to transmit a Wireless Local Area Network (WLAN) communication signal. In an example, the control information may include a signal power information which provides an indication related to the power of the Wireless Local Area Network (WLAN) communication signal to be transmitted.

In an example, the control information includes an indication that the signal to be transmitted is a Wireless Local Area Network (WLAN) communication signal, which is an indication related to the communication technology of the communication signal to be transmitted. In an example, the control information may include an amplifier configuration information indicating the gain of at least one amplifier which the radiohead 3801 may include. In an example, the at least one amplifier may include a power amplifier of the Wireless Local Area Network (WLAN) radio frequency front end 3802. In an example, the at least one amplifier may include an amplifier of the Wireless Local Area Network (WLAN) transceiver chain 3803.

The processor 3804 receives the control information and performs an estimation related to an electrical supply which the radiohead 3801 may need to perform an action based on the control information. In an example, the processor 3804 performs an estimation to receive and/or transmit a communication signal based on the control information. In an example, the processor 3804 may estimate an electrical current to be provided to one or more circuits which the radiohead 3801 includes. In an example, the processor 3804 may estimate a voltage to be provided to one or more circuits which the radiohead 3801 includes. In an example, the processor 3804 may estimate a power for the one or more circuits. In an example, the processor 3804 may estimate an energy for the one or more circuits. A skilled person would appreciate that any energy or power estimation may refer to an electrical current and/or voltage estimation as well.

In an example, the control information includes an indication for the signal power information related to the power of the signal to be transmitted, and the processor 3804 may perform its estimation for the electrical current and/or voltage to be provided to transmit the communication signal based on the signal power information as well. In an example, the control information includes an information related to the technology of the communication signal to be transmitted. In this example, the control information includes an indication that the communication signal to be transmitted includes a Wireless Local Area Network (WLAN) communication signal.

Accordingly, the processor 3804 may perform the estimation based on the communication technology information. In an example, the processor 3804 may perform the estimation including performing a first mathematical calculation for a Wireless Local Area Network (WLAN) communication signal, and the processor 3804 may perform the estimation including performing a second mathematical calculation for a Bluetooth (BT) communication signal, and the processor 3804 may determine to use which of the mathematical formulas according to the communication technology information which the control information includes.

In an example, the control information includes an amplifier configuration information to configure an amplifier of the radiohead 3801 which may amplify the communication signal. In an example, the processor 3804 may perform the estimation based on the amplifier configuration information related to the configuration of the amplifier.

Accordingly, the processor 3804 performs an estimation related to an electrical supply which the radiohead 3801 may need to perform an action based on the received communication technology information related to the communication signal, which includes the indication that the communication signal to be transmitted includes a Wireless Local Area Network (WLAN) communication signal in the control information. In response to the received control information, the processor 3804 performs an estimation to receive and/or transmit a communication signal which includes a Wireless Local Area Network (WLAN) communication signal.

In this example, the processor 3804 may classify the result of the estimation of an electrical current and/or voltage to be provided to receive and/or transmit the communication signal in two clusters, which are referred to for receiving and/or transmitting a Wireless Local Area Network (WLAN) signal and receiving and/or transmitting a Bluetooth (BT) signal. Accordingly, the processor 3804 identifies that the communication signal to be transmitted includes a Wireless Local Area Network (WLAN) communication signal by using the indication in the control information and perform the estimation of an electrical current and/or voltage to be provided to the radiohead 3801 to receive and/or transmit the Wireless Local Area Network (WLAN) communication signal.

In this example, the processor 3804 selects a supply voltage from two predefined supply voltages as the supply voltage for the radiohead 3801 to estimate the voltage to be provided to the radiohead 3801 to transmit the communication signal which the control information indicates. In response to selecting the supply voltage for transmitting and/or receiving the Wireless Local Area Network (WLAN) communication signal, the processor 3804 generates a supply indication based on the estimated voltage to receive and/or transmit the Wireless Local Area Network (WLAN) communication signal.

In an example, the supply indication may include an indication that the option of Wireless Local Area Network (WLAN) communication signal has been selected from the two predefined supply voltage options. In an example, the processor 3804 generates the supply indication, so that the supply indication includes the information of the amount of the supply voltage to be provided to the radiohead 3801 for transmitting the Wireless Local Area Network (WLAN) communication signal. In this example, based on the estimated voltage, the processor 3804 generates the supply indication, so that the supply indication includes the voltage to be provided for transmitting the Wireless Local Area Network (WLAN) communication signal.

The processor 3804 may include a communication interface module to control the communication between the radiohead 3801 and the radiohead external units. In an example, the radiohead external units may include one or more radiohead external processors external to the radiohead 3801. In an example, the radiohead external units may include a processor of the communication device to which the processor 3804 is coupled via the communication interface 3805.

The communication interface module may be coupled to the communication interface 3805. The communication interface module may include a communication interface module in accordance with various aspects of this disclosure. In an example, the communication interface 3805 may include a digital interface. In an example, the communication interface 3805 includes a serial digital interface. In an example, the communication interface 3805 may include a serial time encoded protocol (STEP) interface.

In an example, the communication interface module may control the communication through the communication interface 3805. In an example, the communication interface module may control the communication between the processor 3804 and the one or more radiohead external processors external to the radiohead 3801. In an example, the communication interface module may control the communication between the processor 3804 and the communication device processor.

The communication interface 3805 may operate in a low power mode. In an example, the communication device processor controls the communication interface 3805 to operate the communication interface 3805 in the low power mode. In an example, the communication interface 3805 has a limited capability to provide communication. In an example, the communication interface module may send an indication to the communication interface 3805 to wake up the communication interface 3805 from the low power mode. In an example, the communication interface 3805 does not provide communication to the radiohead 3801 in the low power mode.

The communication interface module may provide the supply indication which the processor 3804 generates to the communication interface 3805. In an example, the communication interface module may provide the supply indication to the communication interface 3805 to send the supply indication to one or more radiohead external processors. In an example, the one or more radiohead external processors include the communication device processor.

In an example, the communication interface module may receive the supply indication request signal and provide the supply indication from a memory. In an example, the communication interface module may send a request to the processor 3804 to receive the supply indication from the processor 3804. In an example, processor 3804 may provide the supply indication in response to receiving the request from the communication interface module.

Accordingly, after the processor 3804 generates the supply indication which includes the information of the amount of the supply voltage to be provided to the radiohead 3801, the communication interface module provides the generated supply indication to the communication interface 3805 to be sent to the communication device processor which had provided the control information to the processor 3804 to indicate the transmission of the Wireless Local Area Network (WLAN) communication signal.

The communication device processor receives the supply indication from the communication interface 3805, which includes the information of the amount of the supply voltage to be provided to the radiohead 3801. The communication device processor extracts the information of the amount of the supply voltage to be provided to the radiohead 3801 and the communication device processor may further check whether a supply unit of the communication device may provide the supply voltage to be provided to the radiohead 3801. Accordingly, the communication device processor may control the supply unit of the communication device to provide a supply voltage to the radiohead 3801 at the mount of the supply voltage which the supply indication indicates.

FIG. 39 shows schematically an example of a radiohead in accordance with various aspects of this disclosure. The radiohead 3901 includes an antenna interface which may be coupled to an antenna 3903. In an example, the radiohead 3901 further includes a switch circuit 3902 to provide switching between the transmitting portion of the radiohead for the transmitting function, and the receiving portion of the radiohead 3901 for the receiving function. The switch circuit 3902 switches a plurality of circuits which the transmitting portion and the receiving portion include to couple the plurality of circuits to an input supply voltage. The radiohead 3901 uses the transmitting portion in a transmitting mode and the receiving portion in a receiving mode.

Accordingly, the switch circuit 3902 may decouple the transmitting portion of the radiohead 3901 from the input supply voltage. In an example, the switch circuit 3902 may decouple the transmitting portion of the radiohead 3901 from the input supply voltage when the radiohead 3901 is in the receiving mode. Further, the switch circuit 3902 may decouple the receiving portion of the radiohead 3901 from the input supply voltage. In an example, the switch circuit 3902 may decouple the receiving portion of the radiohead 3901 from the input supply voltage when the radiohead 3901 is in the transmitting mode.

The antenna interface may include an antenna port. The antenna port may couple the antenna 3903 to the antenna interface. The radiohead 3901 further includes a radio frequency front end portion 3904. The radio frequency front end 3904 may include an amplifier 3905 and a band-pass filter 3906 in the receiving portion to be used in the receiving mode. The radio frequency front end 3904 may further include a power amplifier 3907, and a band-pass filter 3908 for the transmitting function.

The radiohead 3901 further includes a portion of the transceiver chain 3909 which may be coupled to the other portion of the transceiver chain external to the radiohead 3901. In an example, the transceiver chain 3909 may include elements from the physical (PHY) layer portion and the other portion of the transceiver chain external to the radiohead 3901 may include the medium access control (MAC) layer portion.

In this example, the receiving portion of the transceiver chain 3909 includes a down-converter including a mixer 3910, an amplifier 3912, and an analog-to-digital converter 3913 to output digital communication signals to one or more processors 3914. In an example, the one or more processors 3914 may include a physical (PHY) layer unit. The transmitting portion of the transceiver chain 3909 may include a digital-to-analog converter 3916 to convert the digital signals which the digital-to-analog converter 3916 receives from the one or more processors 3914. The transceiver chain 3909 may also include an amplifier 3917 and an up-converter which may include another mixer 3918.

In this example, the up-converter and the down-converter use the same local oscillator 3911 to provide the reference signal to the respective mixers. In an example, the transceiver chain 3909 may further include another local oscillator. Accordingly, the local oscillator 3911 may be coupled to the input supply voltage for both the transmitting mode and the receiving mode of the radiohead 3901.

Further, the one or more processors 3914 may include a communication interface module 3919 which connects the one or more processors 3914 of the radiohead 3901 to one or more external radiohead processors external to the radiohead 3901 via a communication interface 3920. In an example, the one or more external radiohead processors may include one or more processors of a communication device which the radiohead 3901 is coupled to. In an example, the one or more external radiohead processors include a medium access control (MAC) layer portion which is coupled to the physical (PHY) layer portion of the radiohead 3901.

In an example, the one or more processors 3914 may also include a control module to control the physical (PHY) layer portion in the radiohead 3901. In an example, the one or more processors 3914 are coupled to the antenna interface to control the antenna. In an example, the one or more processors 3914 are coupled to the at least one of the amplifiers 3905, 3907, 3912, 3917 to change the configuration of the amplifier. In an example, the one or more processors 3914 are coupled to the band filters 3906 and 3908 to provide equalization.

In an example, the one or more processors 3914 are coupled to the local oscillator 3911 to change the frequency of the reference signal which the local oscillator 3911 provides to the mixers 3910, 3918. In an example, the one or more processors 3914 are coupled to the switch circuit 3902 to switch between the transmitting mode and the receiving mode of the radiohead 3901. In an example, the one or more processors 3914 control the physical (PHY) layer processing unit 3915.

In an example, the one or more processors 3914 may further include a timing block to schedule the control signals to be sent to the elements of the physical (PHY) layer portion. In an example, the one or more processors 3914 receives a scheduling instruction from one or more radiohead external processors in order to schedule the control of the physical (PHY) layer portion. In an example, the one or more processors 3914 schedule control signals to be sent to the elements of the physical (PHY) layer portion based on the received scheduling instruction. In an example, the one or more processors 3914 receive the scheduling instruction and provide a control signal to the respective element based on the received scheduling instruction.

In an example, the scheduling instruction may include an instruction related to a task. In an example, a task may be considered as a function to be performed by the radiohead 3901. In an example, the task may include a control of one element of the physical (PHY) layer portion, such as providing a determined configuration to one of the amplifiers. In an example, the task may include a control of a plurality of elements, such as changing the communication channel.

In an example, the scheduling instruction may include a configuration information to configure the radiohead 3901. In an example, the configuration information may include an indication for the one or more processors 3914 to configure at least one element of the physical (PHY) layer portion. In an example, the configuration information includes a configuration related to the task which the one or more processors 3914 receives. In response to the configuration information, the one or more processors 3914 may configure the at least one element of the physical (PHY) layer portion which the task may relate to.

In an example, the one or more processors 3914 receives a scheduling instruction from the communication interface 3920. The scheduling instruction may include a task which may include to transmit wireless communication signals, and the configuration information may include a first set of communication settings which may include a carrier frequency and/or at least one filter equalization parameter and/or at least one amplifier configuration, and/or at least one symbol rate, and/or a timing information to perform the task.

Accordingly, the one or more processors 3914 controls the related elements of the physical (PHY) layer portion for the task based on the received scheduling instruction. In an example, the one or more processors 3914 controls the local oscillator 3911 to generate a reference signal at the provided carrier frequency. In an example, the one or more processors 3914 controls the at least one filter 3908 based on the received equalization parameter.

In an example, the one or more processors 3914 controls the at least one amplifier 3907, 3917 based on the received amplifier configuration. In an example, the one or more processors 3914 provide digital modulation with the received symbol rate. In an example, the one or more processors 3914 performs at least one of the controls based on the received timing information.

In an example, the one or more processors 3914 sends a control signal to control at least one of the related elements of the physical (PHY) layer portion for the task to control the at least one of the related elements of the physical (PHY) layer portion for the task. In an example, the one or more processors 3914 sends a plurality of control signals to control at least one of the related elements of the physical (PHY) layer portion to control the at least one of the related elements of the physical (PHY) layer portion for the task.

In an example, the scheduling instruction may include a task which may include receiving wireless communication signals, and the configuration information may include a first set of communication settings which may include a carrier frequency and/or at least one filter equalization parameter and/or at least one amplifier configuration, and/or at least one symbol rate, and/or a timing information to perform the task.

Accordingly, the one or more processors 3914 controls the related elements of the physical (PHY) layer portion for the task based on the received scheduling instruction. In an example, the one or more processors 3914 controls the local oscillator 3911 to generate a reference signal at the provided carrier frequency. In an example, the one or more processors 3914 controls the at least one filter 3906 based on the received equalization parameter.

In an example, the one or more processors 3914 controls the at least one amplifier 3905, 3912 based on the received amplifier configuration. In an example, the one or more processors 3914 provide digital demodulation with the received symbol rate. In an example, the one or more processors 3914 performs at least one of the controls based on the received timing information.

In an example, the one or more processors 3914 sends a control signal to control at least one of the related elements of the physical (PHY) layer portion for the task to control the at least one of the related elements of the physical (PHY) layer portion for the task. In an example, the one or more processors 3914 sends a plurality of control signals to control at least one of the related elements of the physical (PHY) layer portion for the task to control the at least one of the related elements of the physical (PHY) layer portion for the task.

In an example, the one or more processors 3914 provides a response signal to the communication interface 3920 related to the task based on the received scheduling instruction. In an example, the response signal may include an information related to the task based on the received scheduling instruction. In an example, the response signal may include a confirmation indication to confirm that the task to be scheduled by the one or more processors 3914.

In an example, the response signal may include a failure indication to indicate that the task could not be scheduled by the one or more processors 3914. In an example, the response signal may also include an indication to indicate the reason for the failure of the task being scheduled. In an example, the response signal may include a success indication to indicate that the task based on the received scheduling instruction has been performed. In an example, the response signal may include an output data related to the performed task.

In an example, the output data may include a data related to the performed task. For example, the task of the received scheduling instruction may relate to a measurement of the communication channel and the data may include at least one metric related to the communication channel. Alternatively, the task of the received scheduling instruction may relate to a measurement of the quality of the received wireless communication signal, and the data may include information related to the signal quality.

In an example, the information related to the signal quality may include at least one of the following: reference signal received power (RSRP, Reference Signal Received Power), signal to interference plus noise ratio (SINR, Signal to Interference plus Noise Ratio), and Receive Signal Strength Indicator (RSSI, Received Signal Strength Indicator), Reference Signal Received Quality (RSRQ, Reference Signal Received Quality).

In an example, the one or more processors 3914 may receive a second scheduling instruction in response to the response signal provided to the one or more radiohead external processors via the communication interface 3920. In an example, the one or more radiohead external processors may include the one or more communication device processors. In an example, the one or more communication device processors may include a medium access control (MAC) layer processing unit. In an example, the one or more communication device processors may implement at least one or more medium access control (medium access control (MAC) layer) functions, and the one or more medium access control (MAC) functions determine the task which the one or more processors 3914 receives from the scheduling instruction.

In this example, the scheduling instruction includes a control information which indicates a task of receiving a communication signal. The one or more processors 3914 receives the scheduling instruction which includes the control information indicating the task of receiving a communication signal and schedules a task to control the radiohead 3901 to receive a communication signal via the radio frequency front end 3904. The control information further includes an amplifier configuration information for configuration of the amplifier 3912 in the transceiver chain 3909. In an example, the amplifier configuration information includes an automatic gain control setting for the amplifier 3912.

The one or more processors 3914 receive the scheduling instruction including the control information in accordance with various aspects of this disclosure and schedule the task of receiving the wireless communication signal based on the scheduling instruction. Further, the one or more processors 3914 estimate an electrical current and/or voltage to be provided to the circuits based on the scheduling instruction including the control information.

The one or more processors 3914 may select one of a plurality of predefined supply voltage amounts which corresponds to a required voltage to supply voltage only to the receiving portion of the radiohead 3901. Further, the one or more processors 3914 may perform a calculation to calculate the required amount of a supply voltage to be provided to the amplifier 3912 based on the received amplifier configuration information. Based on the performed calculation for the amplifier supply voltage, and for the receiving portion of the radiohead 3901 in general, the one or more processors 3914 estimate a supply voltage amount for the radiohead 3901 and generate a supply indication based on the performed estimation to receive the wireless communication signal.

The one or more processors 3901 controls the communication interface module 3919 to send the generated supply indication which includes the estimated amount of the supply voltage to the one or more communication device processors via the communication interface. The one or more communication device processors receive the supply indication which includes the estimated amount of the supply voltage for the radiohead 3901. Accordingly, the one or more communication device processors provide a control signal to the voltage supply unit to provide a supply voltage to the radiohead 3901 according to the supply indication.

FIG. 40 shows schematically an example of a communication device in accordance with various aspects of this disclosure. The communication device 4001 includes a communication device processor 4002, and a power supply unit 4003 to provide an electrical current and/or voltage for the circuits and components of the communication device 4001. The communication device 4001 includes a radiohead 4004 in accordance with various aspects of this disclosure.

The radiohead 4004 includes a processor 4005 and a memory 4006. The radiohead 4004 further includes a switch circuit 4007 which is coupled to a first circuit 4008, a second circuit, and a third circuit. In an example, the first circuit 4008, the second circuit 4009, and the third circuit 4010 of the radiohead 4004 may represent a circuit which is used when transmitting and/or receiving a communication signal.

The power supply unit 4003 is coupled to the radiohead 4004 and provides the electrical supply to the radiohead 4004. The communication device processor 4002 controls the power supply unit 4003. The communication device processor 4002 is coupled to the processor 4005 of the radiohead 4004 via a communication interface 4011 in accordance with various aspects of this disclosure. The switch circuit 4007 is coupled to the power supply unit 4003 and provides switching to couple and decouple each of the first circuit 4008, the second circuit 4009, and the third circuit 4010 to the electrical voltage and/or electrical current which the power supply 4003 provides.

The communication device processor 4002 provides a control information to the processor 4005 of the radiohead 4004 to control the radiohead 4004 to transmit a wireless communication channel. The control information which the communication device processor 4002 provides includes an indication to transmit a wireless communication channel, and a signal power information, related to a power of the communication signal to be transmitted. The communication device processor 4002 provides the control information to the processor 4005 via the communication interface 4011.

The processor 4005 receives the control information and estimates an electrical current/and or voltage to be provided to the radiohead 4004 to transmit the wireless communication channel according to the control information. The processor 4005 identifies which of the first circuit 4008, the second circuit 4009, and/or the third circuit 4010 may be used to transmit the wireless communication channel based on the control information.

In an example, the memory 4006 includes a look-up table indicating one or more circuits the radiohead 4004 provides a supply voltage based on an information according to the control information. In an example, the look-up table further includes information indicating a required electrical supply for a circuit in use for the one or more circuits. In an example, the information indicating the required electrical supply includes an amount of an input electrical current for the one or more circuits. In an example, the information indicating the required electrical supply includes an amount of an input voltage for the one or more circuits.

In this example, the processor 4005 receives the control information indicating an instruction from the communication device processor 4002 to transmit a wireless communication channel. The processor 4005 estimates an electrical current signal by identifying which of the first circuit 4008, the second circuit 4009, and/or the third circuit 4010 the radiohead 4004 uses to transmit the wireless communication channel, and by calculating an electrical current required for the circuits by performing calculations with the information which the look-up table provides related to the required input electrical current for each of the first circuit 4008, the second circuit 4009, and the third circuit 4010. In this example, the processor 4005 identifies that the radiohead 4004 uses the first circuit 4008 and the second circuit 4009 to transmit the wireless communication signal based on the received control information. Accordingly, the processor 4005 identifies the required input electrical current for the first circuit 4008 and the second circuit from the look-up table.

Further, the processor 4005 calculates a further electrical current based on the signal power information which the control information includes. In an example, the look-up table which the memory 4006 stores may further include a plurality of electrical current values and a plurality of signal power levels corresponding to the plurality of electrical current values. Accordingly, the processor 4005 may select an electrical current value from the plurality of electrical current values according to the signal power information which the processor 4005 receives from the control information.

Accordingly, the processor 4005 may calculate a demand electrical current which indicates the total amount of the electrical current which the radiohead 4004 needs to transmit the wireless communication signal according to the control information by consolidating the calculated electrical currents. The processor 4005 generates a supply indication. The supply indication includes an information indicating the demand electrical current. The supply indication further includes a time information indicating a time which the radiohead 4004 is going to transmit the wireless communication signal according to the control information. The processor 4005 provides the supply indication to the communication device processor 4002 via the communication interface 4011.

The communication device processor 4002 receives the supply indication and schedules to send a control signal to the power supply unit 4003 at the time which the radiohead 4004 is going to transmit the wireless communication signal according to the control information to adjust the supply electrical current and/or voltage to the radiohead 4004. Meanwhile, the processor 4005 controls the switch circuit 4007 to couple the circuits which the processor 4005 has identified that the radiohead 4004 uses to transmit the communication signal. Accordingly, the processor 4005 controls the switch circuit 4007 to couple the first circuit 4008, and the second circuit 4009 to the power supply unit 4003, while decoupling the third circuit 4010 from the power supply unit 4003.

Therefore, the radiohead 4004 starts transmitting the wireless communication signal using a portion of the radiohead 4004 which may include at least a portion of the radio frequency front end while the power supply unit 4003 providing its supply to the radiohead 4004 according to the supply indication which the radiohead 4004 provides to the communication device processor 4002 via the communication device interface 4011 using the first circuit 4008 and the second circuit 4009.

FIG. 41 shows schematically an example of a communication device in accordance with various aspects of this disclosure. The communication device 4101 includes a communication device processor 4102, a first power supply unit 4103*a*, a second power supply unit 4103*b*, a power supply switch circuit 4104, and a radiohead 4105. The radiohead 4105 includes a processor 4106, a supply interface to receive the electrical supply from the first power supply unit 4103*a* and/or the second supply unit.

The radiohead 4105 further includes a Wireless Local Area Network transmit/receive unit (WLAN TX/RX) 4108 to receive and/or transmit Wireless Local Area Network (WLAN) communication signals, a Bluetooth transmit/receive unit (BT TX/RX) 4109 to receive and/or transmit Bluetooth communication signals, a Bluetooth baseband processor 4110. The radiohead 4105 further includes a switch circuit 4111 to provide switching to couple the Wireless Local Area Network transmit/receive unit (WLAN TX/RX) 4108 or the group of the Bluetooth transmit/receive unit (BT TX/RX) 4109 and the Bluetooth baseband processor 4110 to an input electrical supply of the radiohead 4105. The processor 4106 is coupled to the switch circuit 4111.

The processor 4106 is further coupled to the communication device processor 4102 via a communication interface 4112. In an example, the communication interface 4112 may include a digital interface. In an example, the communication interface 4112 includes a serial digital interface. In an example, the communication interface 4112 may include a serial time encoded protocol (STEP) interface. In an example, the communication device processor 4102 may control the communication interface 4112.

The communication device processor 4102 generates a control information for the radiohead 4105 including an indication to receive a Wireless Local Area Network (WLAN) communication signal, and send the control information to the processor 4106 of the radiohead 4105 via the communication interface. The processor 4106 receives the control information which includes the indication to receive the Wireless Local Area Network (WLAN) communication signal. In response to the received control information, the processor 4106 estimates an electrical current and/or voltage to be provided based on the control information and a performance metric for the radiohead 4105 to receive the Wireless Local Area Network (WLAN) communication signal.

In an example, the performance metric may include the configuration of an amplifier in the Bluetooth transmit/receive unit (BT TX/RX) 4109 or the Wireless Local Area Network transmit/receive unit (WLAN TX/RX) 4108. In an example the performance metric may include an estimated amount of power to receive the Wireless Local Area Network (WLAN) communication signal at an electrical current instance. In this example, the processor 4106 performs at least one measurement related to a consumption of electrical supply of the radiohead 4105 for the performance metric.

Further, the processor 4106 identify which of the Bluetooth transmit/receive unit (BT TX/RX) 4109 or the Wireless Local Area Network transmit/receive unit (WLAN TX/RX) 4108 will be used for the task provided by the control information, and include a predefined electrical current amount of the Wireless Local Area Network transmit/receive unit (WLAN TX/RX) 4108 in the estimation. Accordingly, in this example, the processor 4106 estimates a first demand electrical current for the radiohead 4105 based on the information in the received control information and at least one measurement related to a power consumption of the radiohead 4105.

The processor 4106 accordingly generates a first supply indication indicating the estimated first demand electrical current and provides the estimated first demand electrical current to the supply interface 4107. The processor 4106 further provides the first supply indication to the communication device processor via the communication interface 4112. The communication device processor 4102 receives the first supply indication and provides a supply signal to the first power supply unit 4103*a* to adjust the voltage which the first power supply unit 4103*a* provides to the radiohead 4105 based on the first supply indication which includes the first demand electrical current. The processor 4106 sends a control signal to the switch circuit to couple the Wireless Local Area Network transmit/receive unit (WLAN TX/RX) 4108 to the input supply voltage of the radiohead 4105 which the first power supply unit 4103*a* provides, and the radiohead 4105 begins to receive the Wireless Local Area Network (WLAN) communication signal.

Meanwhile, the communication device processor 4102 sends a second control information to the processor 4106 with an indication to transmit a Bluetooth (BT) communication signal to the processor 4106. The processor 4106 receives the second control information to transmit a Bluetooth (BT) communication signal. The processor 4106 estimates a second demand electrical current based on at least one measurement related to the consumption of electrical supply of the radiohead 4105 as the performance metric, and the indication to receive the Bluetooth (BT) communication signal. The processor 4106 generates a second supply indication based on the estimation, and the processor 4106 provides the second supply indication to the supply interface 4107 and to the communication device processor 4102 via the communication interface.

The communication device processor 4102 receives the second supply indication which includes the second demand electrical current. The communication device processor 4102 controls the power supply switch circuit 4104 to couple the second power supply unit 4103*b* to the radiohead 4105. Meanwhile, the processor 4106 also controls the switch circuit 4111 to couple the group of the Bluetooth transmit/receive unit (BT TX/RX) 4109 and the Bluetooth baseband processor 4110 to the supply interface 4107 to receive the voltage which the second power supply unit 4103*b* provides to the radiohead 4105, and to decouple the Wireless Local Area Network transmit/receive unit (WLAN TX/RX) 4108 from the supply interface 4107.

In an example, the processor 4106 provides a plurality of supply indications for a control information which to processor 4106 receives. In an example, the processor 4106 performs a plurality of estimations based on the control information in order to continuously provide a supply indication based on an adjusting performance metric to the communication device processor 4102, and accordingly, the communication device processor 4102 may send a control signal to a power supply unit 4103*a*, 4103*b* to adjust the electrical supply which the power supply provides to the radiohead 4105.

In an example, a communication device may include, a computer-readable medium including instructions stored thereon, that if executed by a processor, implement a method including receiving a control information to control a receiving and/or transmitting of a communication signal via a radio frequency front end, receiving and/or transmitting the communication signal based on the received control information, estimating an electrical current and/or voltage to be provided to receive and/or transmit the communication signal based on the control information; and providing a supply indication based on the estimated electrical current and/or voltage to receive and/or transmit the communication signal.

In accordance with various aspects of this disclosure, a device, in particular, a communication device may include a memory, and one or more processors, such as processing circuitry 810 and memory 820 referring back to FIG. 8. The memory 820 may be implemented as a computer-readable medium including instructions stored thereon, that if executed by a processor implement a method including: receiving a control information to control a receiving and/or transmitting of a communication signal via a radio frequency front end, receiving and/or transmitting the communication signal based on the received control information; estimating an electrical current and/or voltage to be provided to receive and/or transmit the communication signal based on the control information; and providing a supply indication based on the estimated electrical current and/or voltage to receive and/or transmit the communication signal.

FIG. 42 shows schematically an example of method steps in accordance with various aspects of this disclosure. The method may include receiving a control information to control a receiving and/or transmitting of the communication signal via a radio frequency front end, receiving and/or transmitting the communication signal based on the received control information, estimating an electrical current and/or voltage to be provided to receive and/or transmit the communication signal based on the control information, and providing a supply indication based on the estimated electrical current and/or voltage to receive and/or transmit the communication signal.

In example 1A, the subject matter is a radiohead circuit including: an antenna interface; a radio frequency front end configured to receive a wireless communication signal via the antenna interface; a processor configured to receive a channel scan information including information related to a target communication channel to be scanned from a communication device processor; perform an energy scan for detecting activity of the target communication channel based on the channel scan information; generate an activity information including an information as to whether there is an activity on the target communication channel; and provide the activity information to a communication interface; the communication interface configured to couple the processor to a radiohead circuit-external processor external to the radiohead circuit.

In example 2A, the subject matter of example 1A, may further include that the processor is configured to perform an energy detection (ED) to detect the energy level of the target communication channel for a predefined time period; and to compare the detected energy level with a predefined energy detection threshold for the target communication channel. In example 3A, the subject matter of any one of examples 1A or 2A, may further include that the channel scan information includes an identification information related to the target communication channel to identify the target communication channel.

In example 4A, the subject matter of any one of examples 1A to 3A, may further include that the channel scan information includes a schedule information related to a time period to perform the energy scan for detecting activity of the target communication channel; and may further include that the processor is configured to schedule the energy scan to be performed for the target communication channel based on the schedule information.

In example 5A, the subject matter of any one of examples 1A to 4A, may further include that the channel scan information includes information related to the predefined time period, and/or the predefined energy threshold. In example 6A, the subject matter of any one of examples 1A to 5A, may further include that the processor is further configured to generate the activity information based on the performed energy scan; and may further include that the activity information includes a bit map information for the target communication channel which the processor has detected the activity.

In example 7A, the subject matter of example 1A to 6A, may further include that the activity information based on the performed energy scan includes information related to the energy level for the target communication channel. In example 8A, the subject matter of any one of examples 1A to 7A, may further include that the target communication channel includes a plurality of communication channels.

In example 9A, the subject matter of any one of examples 1A to 8A, may further include that the processor is configured to provide a wake-up signal to the communication device processor based on the activity detected at the performed energy scan. In example 10A, the subject matter of example 9A, may further include that the processor is configured to receive a service from the communication device processor in response to the wake-up signal.

In example 11A, the subject matter of any one of examples 1A to 10A, may further include that the processor is configured to identify that the radio frequency front end is in an idle mode, at which the radio frequency front end does not receive wireless communication signals; and to schedule the energy scan to be performed based on the channel scan information when the radio frequency front end is not scheduled to receive wireless communication signals.

In example 12A, the subject matter of any one of examples 1A to 11A, may further include an RF sequencer configured to control the radio frequency front end based on the channel scan information. In example 13A, the subject matter of any one of examples 1A to 12A, may further include an energy detector circuit and/or an accumulator configured to detect the activity of the target communication channel based on the channel scan information.

In example 14A, the subject matter is a communication device including: a plurality of radiohead circuits of any one of examples 1 to 13A, including a first radiohead circuit, and a second radiohead circuit; and the communication device processor configured to send a first channel scan information including information related to a first communication channel to be scanned to the first radiohead circuit; and send a second channel scan information including information related to a second communication channel to be scanned to the second radiohead circuit.

In example 15A, the subject matter of example 14A, may further include that the communication device processor is configured to operate in a low power mode; and to wake up from the low power mode in response to at least one of the wake-up signal received from the first radiohead circuit or the wake-up signal received from the second radiohead circuit. In example 16A, the subject matter of any one of examples 14A or 15 may further include that the communication device processor includes a medium control access control layer (MAC) portion configured to perform operations for a medium access control (MAC) layer, and the medium control access layer (MAC) portion is configured to operate in the low power mode based on the scheduled energy scans for the first radiohead circuit and the second radiohead circuit.

In example 17A, the subject matter of example 16A, may further include that the communication device processor is configured to power gate the medium control access layer (MAC) portion in the low power mode. In example 18A, the subject matter of any one of examples 16A or 17A, may further include that the medium control access layer (MAC) portion of the communication device processor is configured to provide a service to the first radiohead circuit and/or the second radiohead circuit.

In example 19A, the subject matter is a computer-readable medium including instructions stored thereon, that if executed by a processor, implement a method including: receiving a channel scan information including information related to a target communication channel to be scanned from a communication device processor; performing an energy scan for detecting an activity of the target communication channel based on the channel scan information; and generating an activity information including an information as to whether there is an activity on the target communication channel; and providing the activity information to a communication interface; the communication interface configured to couple the processor to a radiohead circuit-external processor external to the radiohead circuit.

In example 20A, the subject matter of example 19A, may further include that the method may further include performing an energy detection (ED) to detect the energy level of the target communication channel for a predefined time period; and comparing the detected energy level with a predefined energy detection threshold for each of the target communication channel. In example 21A, the subject matter of any one of examples 19A or 20A, may further include that the channel scan information includes an identification information related to the target communication channel to identify the target communication channel.

In example 22A, the subject matter of any one of examples 19A to 21A, may further include that the channel scan information includes a schedule information related to a time period to perform the energy scan for detecting activity of the target communication channel; and may further include that the method may further include scheduling the energy scan to be performed for the target communication channel based on the schedule information. In example 23A, the subject matter of any one of examples 19A to 22A, may further include that the channel scan information includes information related to the predefined time period, and/or the predefined energy threshold.

In example 24A, the subject matter of any one of examples 19A to 23A, may further include that the method may further include generating the activity information based on the performed energy scan. In example 25A, the subject matter of example 24A, may further include that the method may further include generating the activity information based on the performed energy scan; and may further include that the activity information includes the bit map information for the target communication channel which the processor has detected the activity.

In example 26A, the subject matter of any one of examples 19A to 26A, may further include that the activity information based on the performed energy scan includes the energy level for each of the target communication channel. In example 27A, the subject matter of any one of examples 19A to 26A, may further include that the method may further include providing a wake-up signal to the communication device processor based on the activity detected at the performed energy scan.

In example 28A, the subject matter of example 27A, may further include that the method may further include receiving a service from the communication device processor in response to the wake-up signal. In example 29A, the subject matter of any one of examples 19A to 28A, may further include that the method may further include identifying that the radio frequency front end is in an idle mode, at which the radio frequency front end does not receive wireless communication signals; and scheduling the energy scan to be performed based on the channel scan information when the radio frequency front end is not scheduled to receive wireless communication signals.

In example 30A, the subject matter of any one of examples 19A to 29A, may further include that the method may further include sending a first channel scan information including information related to a first communication channel to be scanned to a first radiohead circuit; and sending a second channel scan information including information related to a second communication channel to be scanned to a second radiohead circuit. In example 31A, the subject matter of example 30A, may further include that the method may further include operating in a low power mode; and waking up from the low power mode in response to a receipt of the wake-up signal from the first radiohead circuit, and/or a receipt of the wake-up signal from the second radiohead circuit.

In example 32A, the subject matter of any one of examples 30A or 31A, may further include that the processor includes a medium control access layer (MAC) portion configured to perform operations for a medium access control (MAC) layer; and may further include that the method may further include operating the medium control access layer (MAC) portion in the low power mode based on the scheduled energy scans of the first radiohead circuit and the second radiohead circuit. In example 33A, the subject matter of example 32A, may further include that the method may further include power gating the medium control access layer (MAC) portion in the low power mode.

In example 34A, the subject matter of any one examples 32A or 33A, may further include that the method may further include providing, by the medium control access layer (MAC) of the processor, a service to the first radiohead circuit and/or the second radiohead circuit.

In example 35A, the subject matter is a method of performing an energy scan by a radiohead circuit including: receiving a channel scan information including information related to target communication channel to be scanned from a communication device processor; performing an energy scan for detecting an activity of the target communication channel based on the channel scan information; and generating an activity information including an information as whether there an activity on the target communication channel; and providing the activity information to a communication interface; the communication interface configured to couple the processor to a radiohead circuit-external processor external to the radiohead circuit.

In example 36A, the method of example 35A including: sending a first channel scan information including information related to a first communication channel to be scanned to a first radiohead circuit; and sending a second channel scan information including information related to a second communication channel to be scanned to a second radiohead circuit.

In example 37A, the subject matter is a radiohead circuit including: an antenna interface; a radio frequency front end for receiving a wireless communication signal via the antenna interface; a processing means for receiving a channel scan information including information related to a target communication channel to be scanned from one or more communication device processing means; performing an energy scan for detecting activity of the target communication channel based on the channel scan information; and generating an activity information including an information as whether there an activity on the target communication channel; providing the activity information to a communication interface; the communication interface configured to couple the processor to a radiohead circuit-external processor external to the radiohead circuit.

In example 38A, the subject matter is a communication device including: a plurality of radiohead circuits of example 37A, including a first radiohead circuit, and a second radiohead circuit; and the communication device processing means for sending a first channel scan information including information related to a first communication channel to be scanned to the first radiohead circuit; and sending a second channel scan information including information related to a second communication channel to be scanned to the second radiohead circuit.

In example 1B, the subject matter includes a radiohead circuit including: an antenna interface; a radio frequency front end configured to receive a wireless communication signal via the antenna interface; a processor configured to receive a channel scan information including information related to a target communication channel to be scanned from a communication device processor; monitor the target communication channel to identify a communication beacon for a predefined period of time based on the channel scan information; detect if the communication beacon has been received based on whether a signal the processor received from the radio frequency front end during the monitoring of the target communication channel fulfills a detection criterion; generate a beacon information including an information as to whether the communication beacon has been received from the target communication channel; provide the beacon information to a communication interface; the communication interface configured to couple the processor to a radiohead circuit-external processor external to the radiohead circuit.

In example 2B, the subject matter of claim 1B, may further include that the channel scan information includes information related to a plurality of target communication channels to be scanned. In example 3B, the subject matter of any one of claims 1B or 2B, may further include that the processor is configured to calculate an autocorrelation of the signal the processor received from the radio frequency front end is above a predefined autocorrelation threshold.

In example 4B, the subject matter of any one of claims 1B to 3B, may further include that the radio frequency front end includes an orthogonal frequency division multiplexing (OFDM) and/or complementary code keying/orthogonal frequency division multiplexing (CCK/OFDM) demodulator. In example 5B, the subject matter of any one of claims 1B to 4B, may further include that the channel scan information includes an identification information related to the target communication channel to identify the target communication channel.

In example 6B, the subject matter of any one of claims 1B to 5B, may further include that the channel scan information includes a schedule information related to a time period to monitor the target communication channel; and may further include that the processor is configured to schedule to monitor the target communication channel based on the schedule information. In example 7B, the subject matter of any one of claims 1B to 6B, may further include that the channel scan information includes an information related to the predefined period of time, and/or the predefined signal threshold and/or the predefined autocorrelation threshold.

In example 8B, the subject matter of any one of claims 1B to 7B, may further include that the processor is configured to provide a wake-up signal to the communication device processor based on the detection of the communication beacon and/or the generation of the beacon information. In example 9B, the subject matter of any one of claims 1B to 7B, may further include that the processor is configured to perform a medium access control (MAC) layer filtering operation to identify the MAC address which the communication beacon is sent from; and to provide a wake-up signal to the communication device processor based on the medium access control (MAC) layer filtering operation.

In example 10B, the subject matter of claim 9B, may further include that the processor is configured to provide the beacon information to the communication device processor to receive a service from the communication device processor. In example 11B, the subject matter of any one of claims 1B to 10B, may further include that the processor is configured to identify that the radio frequency front end is in an idle mode, at which the radio frequency front end does not receive a wireless communication signal; and to monitor of the target communication channel based on the channel scan information when the radio frequency front end is in idle mode.

In example 12B, the subject matter includes a communication device including: a plurality of radiohead circuits of any one of claims 1B to 11B, including a first radiohead circuit, and a second radiohead circuit; and the communication device processor configured to send a first channel scan information including information related to a first communication channel to be scanned to the first radiohead circuit; and send a second channel scan information including information related to a second communication channel to be scanned to the second radiohead circuit. In example 13B, the communication device of example 12B, may further include that the communication device processor is configured to operate in a low power mode and wake up from the low power mode in response to a wake-up signal received from the first radiohead circuit, and/or a wake-up signal received from the second radiohead circuit.

In example 14B, the communication device of any one of examples 12B or 13B, may further include that the communication device processor includes a physical layer (PHY) portion configured to perform operations for a physical layer (PHY), and a medium control access layer (MAC) portion configured to perform operations for a medium access control (MAC) layer, and the physical layer (PHY) portion and the medium control access layer (MAC) portion are configured to operate in the low power mode. In example 15B, the communication device of example 14B, may further include that the communication device processor is configured to power gate the physical layer (PHY) portion and the medium control access layer (MAC) portion in the low power mode.

In example 16B, the communication device of any one of examples 14B or 15B, may further include that the physical layer (PHY) portion and the medium control access layer (MAC) portion of the communication device processor is configured to provide a service to the first radiohead circuit and/or the second radiohead circuit. In example 17B, the communication device of any one of examples 12B to 16B, may further include that the communication device processor is configured to receive the beacon information from the first radiohead circuit, may further include that the beacon information includes a beacon frame of the communication beacon received from the target communication channel based on the channel scan information sent to the first radiohead circuit; and/or the second radiohead circuit.

In example 18B, the subject matter includes a computer-readable medium including instructions stored thereon, that if executed by a processor, implement a method including: receiving a channel scan information including information related to a target communication channel to be scanned from a communication device processor; monitoring the target communication channel to identify a communication beacon for a predefined period of time based on the channel scan information; detecting if the communication beacon has been received based on whether a signal the processor received from the radio frequency front end during the monitoring of the target communication channel fulfills a detection criterion; generating a beacon information including an information as to whether the communication beacon has been received from the target communication channel; providing the beacon information to a communication interface; the communication interface configured to couple the processor to a radiohead circuit-external processor external to the radiohead circuit.

In example 19B, the subject matter of example 18B, may further include that the method may further include: receiving the channel scan information including information related to a plurality of communication channels. In example 20B, the subject matter of any one of examples 18B or 19B, may further include that the method may further include: calculating an autocorrelation of the signal the processor received from the radio frequency front end is above a predefined autocorrelation threshold to detect if the communication beacon has been received.

In example 21B, the subject matter of any one of examples 18B to 20B, may further include that the channel scan information includes an identification information related to the target communication channel to identify the target communication channel. In example 22B, the subject matter of any one of examples 18B to 21B, may further include that the channel scan information includes a schedule information related to a time period to monitor the target communication channel; and the method may further include scheduling to monitor the target communication channel based on the schedule information.

In example 23B, the subject matter of any one of examples 18B to 22B, may further include that the channel scan information includes an information related to the predefined period of time, and/or the predefined signal threshold and/or the predefined autocorrelation threshold. In example 24B, the subject matter of any one of examples 18B to 23B, at which the method may further include: providing a wake-up signal to the communication device processor based on the detection of the communication beacon and/or the generation of the beacon information.

In example 25B, the subject matter of any one of examples 18B to 24B, at which the method may further include: performing a medium access control (MAC) layer filtering operation to identify the MAC address which the communication beacon is sent from; and providing a wake-up signal to the communication device processor based on the medium access control (MAC) layer filtering operation. In example 26B, the computer-readable medium of example 25B, at which the method may further include: providing the beacon information to the communication device processor to receive the service from the communication device processor.

In example 27B, the subject matter of any one of examples 18B to 26B, at which the method may further include: identifying that the radio frequency front end is in an idle mode, at which the radio frequency front end does not receive wireless communication signals; and monitoring of the target communication channel based on the channel scan information when the radio frequency front end is in idle mode. In example 28B, the subject matter of any one of examples 18B to 27B, at which the method may further include: sending a first channel scan information including information related to a first communication channel to be scanned to a first radiohead circuit; and sending a second channel scan information including information related to a second communication channel to be scanned to a second radiohead circuit.

In example 29B, the subject matter of example 28B, at which the method may further include: operating in a low power mode; and waking up from the low power mode in response to the wake-up signal received from the first radiohead circuit, and/or a receipt of the wake-up signal received from the second radiohead circuit. In example 30B, the subject matter of any one of examples 28B or 29B, may further include that the communication device processor includes a physical layer (PHY) portion configured to perform operations for a physical layer (PHY), and a medium control access layer (MAC) portion configured to perform operations for a medium access control (MAC) layer; and the method may further include: operating the physical layer (PHY) portion and the medium control access layer (MAC) portion in the low power mode.

In example 31B, the subject matter of example 30B, at which the method may further include: power gating the physical layer (PHY) portion and the medium control access layer (MAC) portion in the low power mode. In example 32B, the subject matter of any one of examples 30B or 31B, at which the method may further include: providing, by the physical layer (PHY) portion and the medium control access layer (MAC) portion of the communication device processor, a service to the first radiohead circuit and/or the second radiohead circuit.

In example 33B, the subject matter of any one of examples 28B or 32B, at which the method may further include: receiving the beacon information from of the first radiohead circuit, may further include that the beacon information includes a beacon frame of the communication beacon received from the target communication channel based on the channel scan information sent to the first radiohead circuit; and/or the second radiohead circuit, may further include that the beacon information includes a beacon frame of the communication beacon received from the target communication channel based on the channel scan information sent to the second radiohead circuit.

In example 34B, the subject matter includes a method of scanning wireless communication channels, including: receiving a channel scan information including information related to a target communication channel to be scanned from a communication device processor; monitoring the target communication channel to identify a communication beacon for a predefined period of time based on the channel scan information; detecting if the communication beacon has been received based on whether a signal the processor received from the radio frequency front end during the monitoring of the target communication channel fulfills a detection criterion; generating a beacon information including an information as to whether the communication beacon has been received from the target communication channel; providing the beacon information to a communication interface; the communication interface configured to couple the processor to a radiohead circuit-external processor external to the radiohead circuit.

In example 35B, the subject matter of example 34B, may further include: sending a first channel scan information including information related to a first communication channel to be scanned to a first radiohead circuit; and sending a second channel scan information including information related to a second communication channel to be scanned to a second radiohead circuit.

In example 36B, the subject matter includes a radiohead circuit including: an antenna interface; a radio frequency front end for receiving a wireless communication signal via the antenna interface; a processing means for receiving a channel scan information including information related to target communication channel to be scanned from a communication device processor; monitoring the target communication channel to identify a communication beacon for a predefined period of time based on the channel scan information; detecting if the communication beacon has been received based on whether a signal the processor received from the radio frequency front end during the monitoring of the target communication channel fulfills a detection criterion; generating a beacon information including an information as to whether the communication beacon has been received from the target communication channel; providing the beacon information to a communication interface; the communication interface configured to couple the processor to a radiohead circuit-external processor external to the radiohead circuit.

In example 37B, the subject matter includes a communication device including: a plurality of radiohead circuits of example 36B, including a first radiohead circuit, and a second radiohead circuit; and the communication device processing means for sending a first channel scan information including information related to a first communication channel to be scanned to the first radiohead circuit; and sending a second channel scan information including information related to a second communication channel to be scanned to the second radiohead circuit.

In example 1C, the subject matter includes a radiohead circuit including: an antenna interface; a radio frequency front end configured to transmit wireless communication signals via the antenna interface; a processor configured to receive an active scan request information including an indication to perform an active scan from a communication device processor; transmit a probe request signal including a probe request frame based on the active scan request information; generate an active scan response information including information related to the probe request signal; provide the active scan response information to a communication interface; the communication interface configured to couple the processor to a radiohead circuit-external processor external to the radiohead circuit.

In example 2C, the subject matter of example 1C, may further include that the active scan response information includes an identification information to identify a probe response signal to be received in response to the probe request signal. In example 3C, the subject matter of any one of examples 1C or 2C, may further include that the radio frequency front end is configured to receive wireless communication signals via the antenna interface. In example 4C, the subject matter of example 3C, may further include an orthogonal frequency division multiplexing (OFDM) and/or complementary code keying/orthogonal frequency division multiplexing (CCK/OFDM) demodulator.

In example 5C, the subject matter of any one of examples 1C to 4C, may further include that the processor is configured to provide a wake-up signal to the communication device processor based on the probe response signal received in response to the probe request signal. In example 6C, the subject matter of example 5C, may further include that the processor is configured to perform a medium access control (MAC) layer filtering operation to identify the MAC address which the probe response signal is sent from; and to provide a wake-up signal to the communication device processor based on the medium access control (MAC) layer filtering operation to receive a service from the communication device processor.

In example 7C, the subject matter of example 6C, may further include that the processor is configured to provide a probe response frame received from the probe response signal to the communication device processor to receive a service from the communication device processor. In example 8C, the subject matter of any one of examples 3C to 7C, may further include that the processor is configured to identify that the radio frequency front end is in an idle mode, at which the radio frequency front end does not transmit or receive a wireless communication signal; and to schedule the monitor of a communication channel for the probe response signal for a time period that the radio frequency front end is in idle mode.

In example 9C, the subject matter of any one of examples 1C to 8C, may further include that the processor is configured to generate an indication to delegate the monitoring of the probe response signal; and may further include that the active scan response information includes the indication to delegate the monitoring of the probe response signal. In example 10C, the subject matter of example 9C, may further include that the processor is configured to identify that the radio frequency front end will not be in an idle mode, at which the radio frequency front end does not receive a wireless communication signal; and to generate the indication to delegate the monitoring of the probe response signal to be received in response to the probe request signal.

In example 11C, the subject matter includes a communication device including: a first probe request initiating radiohead circuit including the subject matter of any one of examples 1C to 10C, In example 12C, the subject matter of example 11C, may further include: a probe response listening radiohead circuit including: a probe response listening radiohead circuit antenna interface; a probe response listening radiohead circuit radio frequency front end configured to receive a wireless communication signal via the antenna interface; a probe response listening radiohead circuit processor configured to receive a probe listening request information including information related to the probe request signal; and to monitor a communication channel for a response to the probe request signal based on the probe listening request information.

In example 13C, the subject matter of example 12C, may further include that the probe listening request information includes an identification information related to the probe request signal. In example 14C, the subject matter of example 13C, may further include that the identification information includes an information to indicate the communication channel; and may further include that the probe response listening radiohead circuit processor is configured to monitor the communication channel for the probe response signal based on the probe listening request information.

In example 15C, the subject matter of example 14C, may further include that the probe listening request information includes a scheduling information to schedule the monitoring of the communication channel for the probe response signal in response to the probe request signal; and may further include that the probe response listening radiohead circuit processor is configured to monitor the communication channel for the probe response signal based on the scheduling information.

In example 16C, the subject matter of any one of examples 12C to 15C, may further include that the probe response listening radiohead circuit processor is configured to receive the probe listening request information from the first probe request initiating radiohead circuit, may further include that the probe listening request information includes the active scan response information of the first probe request initiating radiohead circuit, may further include that the active scan response information includes the indication to delegate the monitoring of the probe response signal in response to the probe request signal.

In example 17C, the subject matter of example 16C, may further include that the probe response listening radiohead circuit processor is configured to monitor the communication channel for the probe response signal based on the probe listening request information, in case the probe listening request information includes the indication to delegate the monitoring of the probe response signal in response to the probe request signal.

In example 18C, the subject matter of any one of examples 12C to 17C, including: a second probe request initiating radiohead circuit including the subject matter of any one of examples 1C to 10C; the communication device processor configured to provide a first active scan request information including a first probe request frame to be transmitted to the first probe request initiating radiohead circuit; and provide a second active scan request information including a second probe request frame to be transmitted to the second probe request initiating radiohead circuit.

In example 19C, the subject matter of example 18C, may further include that the first active scan request information includes information related to a plurality of first communication channels, and the second active scan request information includes information related to a plurality of second communication channels. In example 20C, the subject matter of any one of examples 18C or 19C, may further include that the communication device processor is configured to receive the active scan response information including the indication to delegate the monitoring of the probe response signal in response to the probe request signal from the first probe request initiating radiohead circuit; and provide the probe listening request information based on the active scan response information of the first probe request initiating radiohead circuit to the probe response listening radiohead circuit.

In example 21C, the subject matter includes a computer-readable medium including instructions stored thereon, that if executed by a processor, implement a method including: receiving an active scan request information including a probe request frame to be transmitted from a communication device processor; transmitting a probe request signal including the probe request frame received from the communication device processor based on the active scan request information; generating an active scan response information including information related to the probe request signal; providing the active scan response information to a communication interface; the communication interface configured to couple the processor to a radiohead circuit-external processor external to the radiohead circuit.

In example 22C, the subject matter of example 21C, may further include that the active scan response information includes an identification information to identify a probe response signal in response to the probe request signal. In example 23C, the subject matter of any one of examples 21C or 22C, may further include that a radio frequency front end is configured to receive wireless communication signals via the antenna interface; and may further include that the radio frequency front end includes an orthogonal frequency division multiplexing (OFDM) and/or complementary code keying/orthogonal frequency division multiplexing (CCK/OFDM) demodulator to demodulate the received wireless communication signal.

In example 24C, the subject matter of any one of examples 21C to 23C, the method may further include: providing a wake-up signal to the communication device processor based on the receipt of the probe response signal in response to the probe request signal. In example 25C, the subject matter of any one of examples 21C to 24C, the method may further include: performing a medium access control (MAC) layer filtering operation to identify the MAC address which the probe response signal is sent from; and providing a wake-up signal to the communication device processor based on the medium access control (MAC) layer filtering operation to receive a service from the communication device processor.

In example 26C, the subject matter of example 25C, the method may further include: providing the probe response frame received from the probe response signal to the communication device processor to receive the service from the communication device processor. In example 27C, the subject matter of any one of examples 23C to 26C, the method may further include: identifying that the radio frequency front end is in an idle mode, at which the radio frequency front end does not transmit or receive a wireless communication signal; and scheduling the monitor of a communication channel for the probe response signal for a time period that the radio frequency front end is in idle mode.

In example 28C, the subject matter of any one of examples 21C to 27C, the method may further include: generating an indication to delegate the monitoring of a response signal in response to the probe request signal; may further include that the active scan response information includes the indication to delegate the monitoring of a probe response signal in response to the probe request signal. In example 29C, the subject matter of any one of examples 21C to 27C, the method may further include: identifying that the radio frequency front end will not be in an idle mode, at which the radio frequency front end does not receive a wireless communication signal; and generating an indication to delegate the monitoring of a response signal in response to the probe request signal; may further include that the active scan response information includes the indication to delegate the monitoring of a probe response signal in response to the probe request signal.

In example 30C, the subject matter of any one of examples 21C to 29C, the method may further include: receiving a probe listening request information including information related to the probe request signal; and monitoring the communication channel for a response to the probe request signal based on the probe listening request information. In example 31C, the subject matter of example 30C, may further include that the probe listening request information includes an identification information related to the probe request signal.

In example 32C, the subject matter of any one of examples 30C or 31C, may further include that the probe listening request information includes an identification information to identify the communication channel; and the method may further include: monitoring the communication channel for the probe response signal in response to the probe request signal based on the probe listening request information. In example 33C, the subject matter of any one of examples 30C to 32C, may further include that the probe listening request information includes a scheduling information to schedule the monitoring of a communication channel for the probe response signal in response to the probe request signal; and the method may further include: monitoring the communication channel for the response to the probe request signal based on the scheduling information.

In example 34C, the subject matter of any one of examples 30C to 33C, the method may further include: receiving the probe listening request information from the first probe request initiating radiohead circuit, may further include that the probe listening request information includes the active scan response information of the first probe request initiating radiohead circuit, may further include that the active scan response information includes the indication to delegate the monitoring of a probe response signal in response to the probe request signal.

In example 35C, the subject matter of 34, the method may further include: monitoring the communication channel for the probe request signal based on the probe listening request information, in case the probe listening request information includes the indication to delegate the monitoring of a probe response signal in response to the probe request signal. In example 36C, the subject matter of any one of examples 30C to 35C, the method may further include: providing a first active scan request information including a first probe request frame to be transmitted to the first probe request initiating radiohead circuit; and providing a second active scan request information including a second probe request frame to be transmitted to the second probe request initiating radiohead circuit.

In example 37C, the subject matter of example 36C, may further include that the first active scan request information includes information related to a plurality of first communication channels, and the second active scan request information includes information related to a plurality of second communication channels. In example 38C, the subject matter of any one of examples 36C or 37C, the method may further include: receiving the active scan response information including the indication to delegate the monitoring of a probe response signal in response to the probe request signal from the first probe request initiating radiohead circuit; and providing the probe listening request information based on the active scan response information of the first probe request initiating radiohead circuit to the probe response listening radiohead circuit.

In example 39C, the subject matter includes a method of transmitting a probe request signal including: receiving an active scan request information including a probe request frame to be transmitted from communication device processor; transmitting the probe request signal including the probe request frame received from the communication device processor based on the active scan request information; generating an active scan response information including information related to the probe request signal; providing the active scan response information to a communication interface; the communication interface configured to couple the processor to a radiohead circuit-external processor external to the radiohead circuit.

In example 40C, the subject matter includes a radiohead circuit including: an antenna interface; a radio frequency front end for transmitting wireless communication signals via the antenna interface; a processing means for receiving an active scan request information including a probe request frame to be transmitted from communication device processor; transmitting a probe request signal including the probe request frame received from the communication device processor based on the active scan request information; generating an active scan response information including information related to the probe request signal; providing the active scan response information to a communication interface; the communication interface configured to couple the processor to a radiohead circuit-external processor external to the radiohead circuit.

In example 41C, the subject matter includes a communication device including: a first probe request initiating radiohead circuit including the subject matter of example In example 40C, In example 42C, the subject matter of example 41C, may further include: a probe response listening radiohead circuit including: a probe response listening radiohead circuit antenna interface; a probe response listening radiohead circuit radio frequency front end for receiving a wireless communication signal via the antenna interface; a probe response listening radiohead circuit processing means for receiving a probe listening request information including information related to the probe request signal; and for monitoring the communication channel for a response to the probe request signal based on the probe listening request information.

In example 43C, the subject matter of any one of examples 41C or 42C, including: a second probe request initiating radiohead circuit including the subject matter of example 40C; the communication device processing means for providing a first active scan request information including a first probe request frame to be transmitted to the first probe request initiating radiohead circuit; and providing a second active scan request information including a second probe request frame to be transmitted to the second probe request initiating radiohead circuit.

In example 1D, the subject matter includes a radiohead circuit including; a radio frequency front end; a radiohead circuit processor configured to receive a control information to control a receiving and/or transmitting of a communication signal via the radio frequency front end; receive and/or transmit the communication signal based on the received control information; estimate a current and/or voltage to be provided to receive and/or transmit the communication signal based on the control information; and provide a supply indication based on the estimated current and/or voltage to receive and/or transmit the communication signal.

In example 2D, the subject matter of example 1D, may further include that the control information includes a signal power information related to the power of the of the communication signal to be transmitted; and may further include that the radiohead circuit processor is configured to estimate the current and/or voltage to be provided to transmit the communication signal based on the signal power information related to the power of the signal to be transmitted.

In example 3D, the subject matter of any one of examples 1D or 2D, may further include that the control information includes a communication technology information related to the communication signal; and may further include that the radiohead circuit processor is configured to estimate the current and/or voltage to be provided to receive and/or transmit the communication signal based on the communication technology information related to the communication signal.

In example 4D, the subject matter of any one of examples 1D to 3D, may further include that the control information includes an amplifier configuration information related to a configuration of an amplifier; may further include that the radiohead circuit processor is configured to estimate the current and/or voltage to be provided to receive and/or transmit the communication signal based on the amplifier configuration information related to the configuration of the amplifier.

In example 5D, the subject matter of any one of examples 1D to 4D, may further include a plurality of circuits and a switch circuit to switch the plurality of circuits to couple to an input supply voltage; and may further include that the radiohead circuit processor is configured to control the switch circuit based on the control information. In example 6D, the subject matter of example 5D, may further include that the radiohead circuit processor is configured to identify a circuit from the plurality of circuits that is used to transmit and/or receive the communication signal based on the control information.

In example 7D, the subject matter of example 6D, may further include that the radiohead circuit processor is configured to estimate the current and/or voltage to be provided to receive and/or transmit the communication signal based on the identification of the circuit from the plurality of circuits that is used to transmit and/or receive the communication signal based on the control information. In example 8D, the subject matter of any one of examples 6D or 7D, may further include that the radiohead circuit processor is configured to control the switch circuit to couple the circuit from the plurality of circuits to the input supply voltage based on the identification of the circuit from the plurality of circuits that is used to transmit and/or receive the communication signal based on the control information.

In example 9D, the subject matter of any one of examples 1D to 8D, may further include that the supply indication includes information related to the estimated current and/or voltage to receive and/or transmit the communication signal; may further include that the radiohead circuit processor is configured to provide the supply indication to a communication interface; may further include that the communication interface is configured to couple the radiohead circuit processor to a radiohead circuit-external processor external to the radiohead circuit.

In example 10D, the subject matter includes a communication device including: a radiohead circuit of any one of examples 1D to 9D; a communication device processor configured to provide the control information to the radiohead circuit. In example 11D, the subject matter of example 10D, may further include that the communication device processor is configured to adjust a supply voltage provided to the radiohead circuit based on the supply indication received from the radiohead circuit.

In example 12D, the subject matter of any one of examples 10D or 11D, may further include that the communication device processor is configured to adjust a supply current provided to the radiohead circuit based on the supply indication received from the radiohead circuit. In example 13D, the subject matter of any one of examples 10D to 12D, may further include: a plurality of supply units and a communication device supply unit switch circuit; may further include that the communication device processor is configured to control the communication device supply unit switch circuit based on the supply indication received from the radiohead circuit.

In example 14D, the subject matter of example 11D, may further include that the plurality of supply units includes a plurality of voltage sources. In example 15D, the subject matter of any one of examples 11D to 14D, may further include that the supply indication includes a time information related to the period of time which the radio frequency front end of the radiohead circuit is scheduled to transmit and/or receive the communication signal; and may further include that the communication device processor is configured to adjust the supply current and/or the supply voltage based on the time information.

In example 16D, the subject matter includes a computer-readable medium including instructions stored thereon, that if executed by a processor, implement a method including: receiving a control information to control a receiving and/or transmitting of a communication signal via a radio frequency front end; receiving and/or transmitting the communication signal based on the received control information; estimating a current and/or voltage to be provided to receive and/or transmit the communication signal based on the control information; and providing a supply indication based on the estimated current and/or voltage to receive and/or transmit the communication signal.

In example 17D, the subject matter of example 16D, may further include that the control information includes a signal power information related to the power of the of the communication signal to be transmitted; and the method including: estimating the current and/or voltage to be provided to transmit the communication signal based on the signal power information related to the power of the signal to be transmitted. In example 18D, the subject matter of any one of examples 16D or 17D, may further include that the control information includes a communication technology information related to the communication signal; and the method may further include: estimating the current and/or voltage to be provided to receive and/or transmit the communication signal based on the communication technology information related to the communication signal.

In example 19D, the subject matter of any one of examples 16D to 18D, may further include that the control information includes an amplifier configuration information related to a configuration of an amplifier; the method may further include: estimating the current and/or voltage to be provided to receive and/or transmit the communication signal based on the amplifier configuration information related to the configuration of the amplifier.

In example 20D, the subject matter of any one of examples 16D to 19D, may further include that the radio frequency front end includes a plurality of circuits and a switch circuit to switch the plurality of circuits to couple to an input supply voltage; and the method may further include: controlling the switch circuit based on the control information. In example 21D, the subject matter of example 20D, the method may further include: identifying a circuit from the plurality of circuits that is used to transmit and/or receive the communication signal based on the control information.

In example 22D, the subject matter of example 21D, the method may further include: estimating the current and/or voltage to be provided to receive and/or transmit the communication signal based on the identification of the circuit from the plurality of circuits that is used to transmit and/or receive the communication signal based on the control information. In example 23D, the subject matter of any one of examples 21D or 22D, the method may further include: controlling the switch circuit to couple the circuit from the plurality of circuits to the input supply voltage based on the identification of the circuit from the plurality of circuits that is used to transmit and/or receive the communication signal based on the control information. In example 24D, the subject matter of any one of examples 16D to 23D, may further include that the supply indication includes information related to the estimated current and/or voltage to receive and/or transmit the communication signal; the method may further include: providing the supply indication to a communication interface.

In example 25D, the subject matter of any one of examples 16D to 24D, the method may further include: providing the control information to a radiohead circuit. In example 26D, the subject matter of any one of examples 16D to 25D, the method may further include: adjusting a supply voltage provided to the radiohead circuit based on the supply indication received from the radiohead circuit. In example 27D, the subject matter of any one of examples 25D or 26D, the method may further include: adjusting a supply current provided to the radiohead circuit based on the supply indication received from the radiohead circuit.

In example 28D, the subject matter of any one of examples 25D to 27D, may further include: controlling a communication device supply unit switch circuit based on the supply indication received from the radiohead circuit. In example 29D, the subject matter of example 28D, may further include that the plurality of supply units includes a plurality of voltage sources. In example 30D, the subject matter of any one of examples 26D to 29D, may further include that the supply indication includes a time information related to the period of time which the radio frequency front end of the radiohead circuit is scheduled to transmit and/or receive the communication signal; and; the method may further include: adjusting the supply current and/or the supply voltage based on the time information.

In example 31D, the subject matter includes a method for receiving and/or transmitting a communication signal, including: receiving a control information to control a receiving and/or transmitting of the communication signal via a radio frequency front end; receiving and/or transmitting the communication signal based on the received control information; estimating a current and/or voltage to be provided to receive and/or transmit the communication signal based on the control information; and providing a supply indication based on the estimated current and/or voltage to receive and/or transmit the communication signal.

In example 32D, the subject matter of example 31D, may further include that the control information includes a signal power information related to the power of the of the communication signal to be transmitted; and the method including: estimating the current and/or voltage to be provided to transmit the communication signal based on the signal power information related to the power of the signal to be transmitted.

In example 33D, the subject matter of any one of examples 31D or 32D, may further include that the control information includes a communication technology information related to the communication signal; and the method may further include: estimating the current and/or voltage to be provided to receive and/or transmit the communication signal based on the communication technology information related to the communication signal.

In example 34D, the subject matter of any one of examples 31D to 33D, may further include that the control information includes an amplifier configuration information related to a configuration of an amplifier; the method may further include: estimating the current and/or voltage to be provided to receive and/or transmit the communication signal based on the amplifier configuration information related to the configuration of the amplifier.

In example 35D, the subject matter of any one of examples 31D to 34D, may further include that the radio frequency front end includes a plurality of circuits and a switch circuit to switch the plurality of circuits to couple to an input supply voltage; and the method may further include: controlling the switch circuit based on the control information. In example 36D, the subject matter of example 35D, may further include: identifying a circuit from the plurality of circuits that is used to transmit and/or receive the communication signal based on the control information.

In example 37D, the subject matter of example 36D, may further include: estimating the current and/or voltage to be provided to receive and/or transmit the communication signal based on the identification of the circuit from the plurality of circuits that is used to transmit and/or receive the communication signal based on the control information. In example 38D, the subject matter of any one of examples 36D or 37D, may further include: controlling the switch circuit to couple the circuit from the plurality of circuits to the input supply voltage based on the identification of the circuit from the plurality of circuits that is used to transmit and/or receive the communication signal based on the control information.

In example 39D, the subject matter of any one of examples 31D to 38D, may further include that the supply indication includes information related to the estimated current and/or voltage to receive and/or transmit the communication signal; the method may further include: providing the supply indication to a communication interface. In example 40D, the subject matter of any one of examples 31D to 39D, may further include: providing the control information to a radiohead circuit.

In example 41D, the subject matter of any one of examples 31D to 40D, may further include: adjusting a supply voltage provided to the radiohead circuit based on the supply indication received from the radiohead circuit. In example 42D, the subject matter of any one of examples 40D or 41D, may further include: adjusting a supply current provided to the radiohead circuit based on the supply indication received from the radiohead circuit. In example 43D, the subject matter of any one of examples 40D to 42D, may further include: controlling a communication device supply unit switch circuit based on the supply indication received from the radiohead circuit.

In example 44D, the subject matter of example 43D, may further include that the plurality of supply units includes a plurality of voltage sources. In example 45D, the subject matter of any one of examples 41D to 44D, may further include that the supply indication includes a time information related to the period of time which the radio frequency front end of the radiohead circuit is scheduled to transmit and/or receive the communication signal; and; the method may further include: adjusting the supply current and/or the supply voltage based on the time information.

In example 46D, the subject matter includes a radiohead circuit including; a radio frequency front end; a radiohead circuit processing means for receiving a control information to control a receiving and/or transmitting of a communication signal via the radio frequency front end; receiving and/or transmit the communication signal based on the received control information; estimating a current and/or voltage to be provided to receive and/or transmit the communication signal based on the control information; and providing a supply indication based on the estimated current and/or voltage to receive and/or transmit the communication signal.

In example 47D, the subject matter includes a communication device including: a radiohead circuit of example 46D; a communication device processing means for providing the control information to the radiohead circuit.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors", as in "one or more processors," one or more radiohead processors", "one or more external radiohead processors", "one or more communication device processors", are intended to refer to a processor or a controller. The one or more processors may include one processor or a plurality of processors. The terms are simply used as an alternative to the "processor" or "controller".

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "antenna" or "antenna structure", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "calibration" as used herein may describe a process in which a device or a component of a device (e.g., a radiohead circuit, a transceiver chain, a component of a transceiver chain, and the like) is calibrated. Illustratively, the term calibration may describe a process in which one or more deviations of a behavior of a device or of one of its components from an expected or desired (e.g., target) behavior are corrected. Further illustratively, the term calibration may describe a process in which the operation of a device or of one of its components is aligned with a predefined or desired (e.g., target) operation of the device or of the component. By way of example, a calibration may describe a process in which nonlinearities are eliminated and/or in which mismatches are eliminated. In some aspects, a calibration may be understood as the process through which transmission (TX) and/or reception (RX) parameters and/or circuitry may be tuned to optimize TX power and signal integrity (e.g., EVM) and RX signal quality (e.g., RSSI, or signal-to-interference-plus-noise-ratio SINR).

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A communication device comprising:
a communication device processor;
a communication interface; and
a plurality of radiohead circuits comprising a first radiohead circuit, and a second radiohead circuit, wherein each of the radiohead circuits comprises:
a processor configured to:
  receive from the communication device processor a channel scan information comprising an information related to a target communication channel to be scanned;
  perform an energy scan for detecting an activity of the target communication channel based on the channel scan information;
  generate based on the energy scan an activity information comprising an indication as to whether there is an activity on the target communication channel; and
  provide the activity information to the communication interface, wherein the communication interface is configured to couple the processor of the radiohead circuit to the communication device processor,
wherein the communication device processor is configured to:
send to the first radiohead circuit a first channel scan information comprising information related to a first communication channel to be scanned by the first radiohead circuit at a predefined time period, wherein the target communication channel of the first radiohead circuit comprises the first communication channel; and
send to the second radiohead circuit a second channel scan information comprising information related to a second communication channel to be scanned by the first radiohead circuit concurrent with the first radiohead circuit at the predefined time period, wherein the target communication channel of the second radiohead circuit comprises the second communication channel.

2. The communication device of claim 1,
wherein the communication device processor is configured to operate in a low power mode during the predefined time period and to wake-up from the low power mode in response a wake-up signal received from the first radiohead circuit or the second radiohead circuit, wherein the first radiohead circuit or the second radiohead circuit is configured to provide the wake-up signal to the communication device processor after the predefined time period when the activity information indicates the activity on the first communication channel or the second communication channel.

3. The communication device of claim 2,
wherein the communication device processor comprises a medium control access control layer (MAC) portion configured to perform operations for a medium access control (MAC) layer, and
wherein the medium control access layer (MAC) portion is configured to operate in the low power mode during the predefined time period of the energy scans for the first radiohead circuit and the second radiohead circuit.

4. The communication device of claim 3,
wherein the communication device processor is configured to power gate the medium control access layer (MAC) portion in the low power mode.

5. The communication device of claim 1, wherein the processor of each of the plurality of radiohead circuits is further configured to:
perform an energy detection (ED) to detect an energy level of the target communication channel during the predefined time period; and
compare the detected energy level with a predefined energy detection threshold for the target communication channel.

6. The communication device of claim 5, wherein the channel scan information comprises the predefined energy detection threshold.

7. The communication device of claim 1, wherein the channel scan information comprises an identification information that identifies the target communication channel.

8. The communication device of claim 1, wherein the channel scan information comprises a schedule information related to the predefined time period for performing the energy scan, wherein the processor of each of the plurality of radiohead circuits is configured to schedule the energy scan based on the schedule information.

9. The communication device of claim 1, wherein the activity information comprises a bitmap information for the target communication channel on which the activity was detected.

10. The communication device of claim 1, wherein the activity information comprises information related to an energy level on the target communication channel.

11. The communication device of claim 1, wherein the target communication channel comprises a plurality of communication channels.

12. The communication device of claim 1, wherein the processor of each of the plurality of radiohead circuits is configured to provide a wake-up signal to the communication device processor based on the activity detected by the energy scan.

13. The communication device of claim 12, wherein the processor of each of the plurality of radiohead circuits is configured to receive a service from the communication device processor in response to the wake-up signal.

14. The communication device of claim 1, wherein the processor of each radiohead of the plurality of radiohead circuits is further configured to:
identify whether the each radiohead is in an idle mode, wherein the idle mode defines idle times at which the each radiohead is not scheduled to receive wireless communication signals; and
schedule the energy scan for the each radiohead based on the idle times.

15. The communication device of claim 1, further comprising an RF sequencer configured to control each radiohead circuit of the plurality of radioheads based on the channel scan information.

16. A radiohead circuit comprising:
a radio frequency front end configured to receive a wireless communication signal; and
a processor configured to:
  receive from a communication device processor a channel scan information comprising information related to a target communication channel to be scanned at a predetermined time period that is concurrent to a time period at which a second radiohead circuit is to scan a communication channel different from the target communication channel;

monitor the target communication channel to identify a signal indicative of a communication beacon for a predefined period of time based on the channel scan information;
detect if the communication beacon has been received based on whether the signal fulfills a detection criterion;
generate a beacon information comprising an information as to whether the communication beacon has been received from the target communication channel; and
provide the beacon information to a communication interface, wherein the communication interface is configured to couple the processor to the communication device processor.

17. The radiohead circuit of claim 16,
wherein the channel scan information comprises information related to a plurality of target communication channels to be scanned.

18. The radiohead circuit of claim 16,
wherein the radio frequency front end comprises an orthogonal frequency division multiplexing (OFDM) and/or complementary code keying/orthogonal frequency division multiplexing (CCK/OFDM) demodulator.

* * * * *